(12) United States Patent
Quinones

(10) Patent No.: US 6,904,449 B1
(45) Date of Patent: Jun. 7, 2005

(54) SYSTEM AND METHOD FOR AN APPLICATION PROVIDER FRAMEWORK

(75) Inventor: David B. Quinones, Holliston, MA (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/483,062

(22) Filed: Jan. 14, 2000

(51) Int. Cl.$^7$ .............................................. G06F 15/16
(52) U.S. Cl. ...................... 709/203; 709/217; 709/219; 709/223; 709/225; 709/250
(58) Field of Search ................................ 709/203, 217, 709/219, 223, 225, 250

(56) References Cited

U.S. PATENT DOCUMENTS

| | | | |
|---|---|---|---|
| 5,809,282 A | | 9/1998 | Cooper et al. |
| 6,151,643 A | * | 11/2000 | Cheng et al. .................. 710/36 |
| 6,240,550 B1 | * | 5/2001 | Nathan et al. ............... 717/169 |
| 6,266,774 B1 | * | 7/2001 | Sampath et al. ............. 713/201 |
| 6,266,810 B1 | * | 7/2001 | Tanaka et al. .............. 717/173 |
| 6,327,617 B1 | * | 12/2001 | Fawcett ....................... 709/219 |
| 6,353,926 B1 | * | 3/2002 | Parthesarathy et al. ..... 717/170 |

OTHER PUBLICATIONS

U.S. Appl. No. 09/483,486, Enhancing an Application Framework, filed Jan. 14, 2000.
U.S. Appl. No. 09/483,593, A Knowledge Based Software Upgrade System, filed Jan. 14, 2000.
Mansfield, G. et al., "An SNMP–based expert Network Management System for a Large–Scale OSI–based Campus Network"; Proceedings of the Annual International Phoenix Conference on Computers and Communications. Scottsdale, Apr. 1–3, 1992, New York, IEEE, US, vol. Conf. 11, pp. 695–700, XP000302635, ISBN: 0–7803–0605–8.

"Advisor Window for IBM LAN Netview Start and Other Network Configuration Programs"; IBM Technical Disclosure Bulletin, IBM Corp. New York, US, vol. 37, No. 2B, Feb. 1, 1994, pp. 173–174, XP000433799, ISSN: 018–8689.

* cited by examiner

*Primary Examiner*—Nabil El-Hady
(74) *Attorney, Agent, or Firm*—Oppenheimer Wolff & Donnelly LLP

(57) ABSTRACT

A system and method are provided for improving an existing application infrastructure of an application service provider. First, a user is prompted to identify at least one aspect of an existing application infrastructure of an application service provider utilizing a network. Next, the identification of the aspect of the existing application infrastructure is received utilizing the network, and the aspect is translated into a common structure such that the structure is stored in a knowledge base. Such common structure is subsequently analyzed using a spreadsheet stored in a database, and the spreadsheet includes predefined rules that are used to identify upgrades to the existing applications infrastructure. Further, upgrades the existing application infrastructure are suggested and displayed based on the analysis utilizing the network.

18 Claims, 41 Drawing Sheets

SYSTEM AND METHOD FOR AN APPLICATION PROVIDER FRAMEWORK

FIELD OF THE INVENTION

The present invention relates to application service providers (ASPs) and more particularly to improving existing application infrastructures of ASPs.

BACKGROUND OF THE INVENTION

An important use of computers is the transfer of information over a network. Currently, the largest computer network in existence is the Internet. The Internet is a worldwide interconnection of computer networks that communicate using a common protocol. Millions of computers, from low end personal computers to high-end super computers are coupled to the Internet.

The Internet grew out of work funded in the 1960s by the U.S. Defense Department's Advanced Research Projects Agency. For a long time, Internet was used by researchers in universities and national laboratories to share information. As the existence of the Internet became more widely known, many users outside of the academic/research community (e.g., employees of large corporations) started to use Internet to carry electronic mail.

In 1989, a new type of information system known as the World-Wide-Web ("the Web") was introduced to the Internet. Early development of the Web took place at CERN, the European Particle Physics Laboratory. The Web is a wide-area hypermedia information retrieval system aimed to give wide access to a large universe of documents. At that time, the Web was known to and used by the academic/research community only. There was no easily available tool which allows a technically untrained person to access the Web.

In 1993, researchers at the National Center for Supercomputing Applications (NCSA) released a Web browser called "Mosaic" that implemented a graphical user interface (GUI). Mosaic's graphical user interface was simple to learn yet powerful. The Mosaic browser allows a user to retrieve documents from the World-Wide-Web using simple point-and-click commands. Because the user does not have to be technically trained and the browser is pleasant to use, it has the potential of opening up the Internet to the masses.

The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers communicate using a protocol called "HyperText Transfer Protocol" (HTTP). A browser opens a connection to a server and initiates a request for a document. The server delivers the requested document, typically in the form of a text document coded in a standard Hypertext Markup Language (HTML) format, and when the connection is closed in the above interaction, the server serves a passive role, i.e., it accepts commands from the client and cannot request the client to perform any action.

The communication model under the conventional Web environment provides a very limited level of interaction between clients and servers. In many systems, increasing the level of interaction between components in the systems often makes the systems more robust, but increasing the interaction increases the complexity of the interaction and typically slows the rate of the interaction. Thus, the conventional Web environment provides less complex, faster interactions because of the Web's level of interaction between clients and servers.

SUMMARY OF THE INVENTION

A system, method and article of manufacture are provided for improving an existing application infrastructure of an application service provider. First, a user is prompted to identify at least one aspect of an existing application infrastructure of an application service provider utilizing a network. Next, the identification of the aspect of the existing application infrastructure is received utilizing the network, and the aspect is translated into a common structure such that the structure is stored in a knowledge base. Such common structure is subsequently analyzed using a spreadsheet stored in a database, and the spreadsheet includes predefined rules that are used to identify upgrades to the existing application infrastructure. Further, upgrades to the existing application infrastructure are suggested and displayed based on the analysis utilizing the network.

In one embodiment of the present invention, the aspect of the existing application infrastructure includes an ability of the application service provider to deliver applications over the network. As an option, results of the analysis may be assessed after which the assessment may be provided the user with the assessment.

In another embodiment of the present invention, the user may be prompted to identify the aspect of the existing application infrastructure by querying the user. Further, the upgrades may include adding components of the existing application infrastructure that are currently missing.

BRIEF DESCRIPTION OF DRAWINGS

The invention will be better understood when consideration is given to the following detailed description thereof. Such description makes reference to the annexed drawings wherein.

DISCLOSURE OF THE PREFERRED EMBODIMENTS

Figure 1:
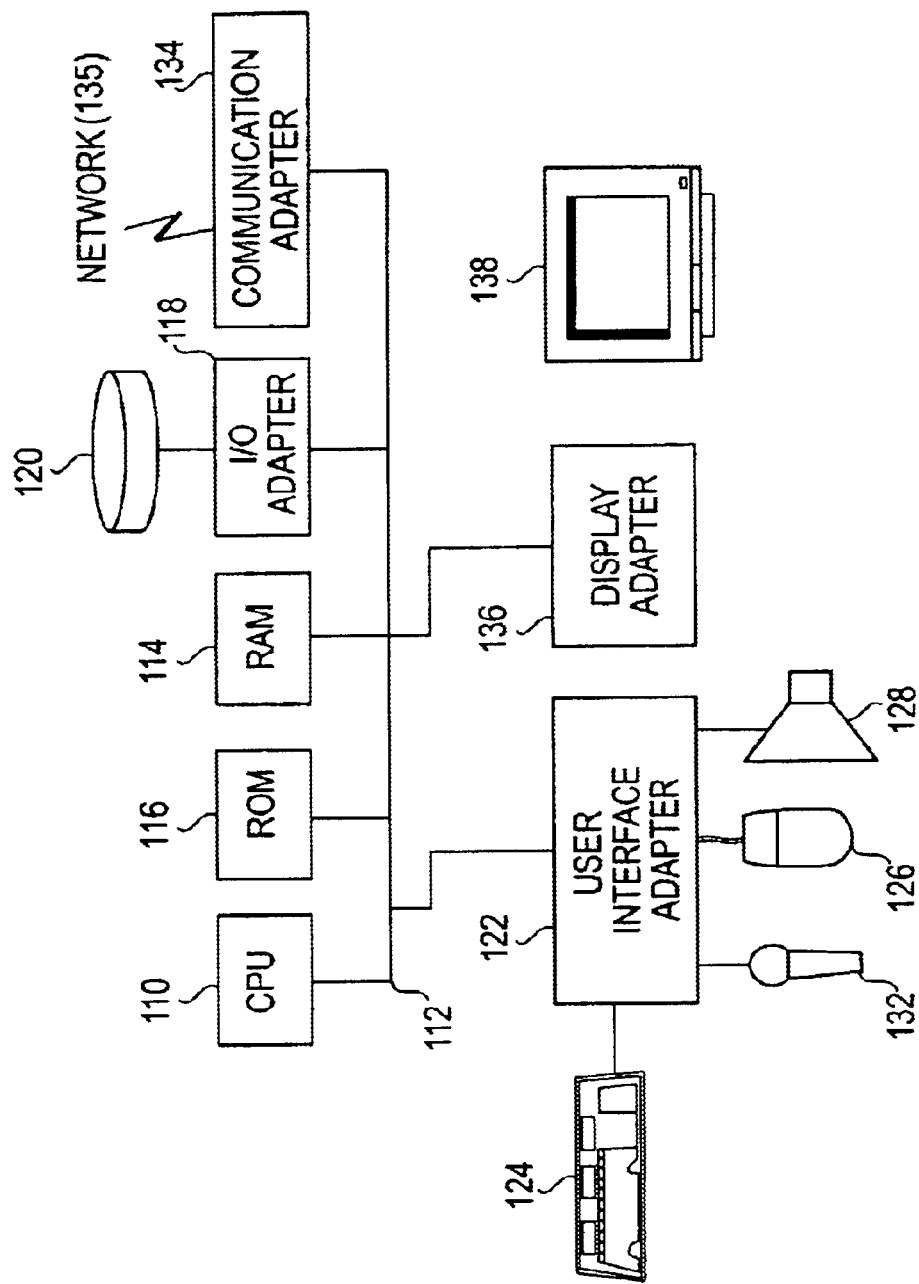
FIG. 1 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided. OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that can call when those individual behaviors are desired in the program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with fireworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's® Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator®) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi®, Microsoft® Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Overview

The present invention addresses the potential impacts of the emerging Application Service Provider (ASP) industry on the operations of traditional packaged application software providers. This industry will have a significant impact on the majority of new and existing software providers, raising new opportunites while simultaneously bringing additional challenges.

The research associated with the present invention is a part of a broader effort to develop a market offering for players in the ASP value chain (Network Services, Managed Services, Hardware and Software Infrastructure, and Applications) and is incorporated into the offering initial diagnostic. The discussion of business capabilities software companies need to develop to compete in this space is also applicable to other participants in the ASP value chain that are working or aligning with software providers.

Potential impacts will be examined across three primary business capability areas:

Build Applications
Sell Applications
Serve Customer

The Build Applications area concentrates on the characteristics application software needs to have to be successfully used and delivered through the ASP channel. It addresses the primary question: What software capabilities are required for an application to be successfully delivered through the ASP channel? Architectural characteristics are addressed at a high level, but coverage of specific technical details is covered in the Infrastructure portion of the diagnostic.

The Sell Applications and Serve Customer areas address the question: "What is the impact of the emerging ASP channel on traditional software providers?"

Build Application

While many of todays packages can be already be delivered through an ASP channel, they are not optimized for netsourced operations. As ASP's become larger customers, software vendors increasingly need to consider architectural and functional changes that ease operation of their products in the ASP's environments.

The Build Application capability is subdivided into three main areas:
Execution Architecture
Operations Architecture
Business Process Functionality The technical architecture-related sections include Execution and Operations. The Development architecture will be set forth hereinafter during reference to FIGS. 2–45.

Business logic/functionality considerations are covered yet another area, Business Process Functionality.

Running business software and content over the Internet can require a change in software architecture to enable efficient delivery. Most major categories of business applications and supporting products were not designed to be utilized over the Internet. While newer products are starting to address this, and the use of thin client technologies like Citrix can provide a workaround for existing products, many of today's packages are still not optimized for use in this environment.

Ensuring applications have a thin client option is the first step. Most applications delivered through ASP's should not require proprietary code to be manually installed on client machines. Client logic or other supporting applications should be delivered at point of need on a machine independent basis.

This needs to be accomplished while still providing personalization and configuration options users have grown accustomed to. Examples include customized entry screens or transaction flows and saved queries or reports.

While most users will operate with a thin client, offerings also need to account for users that require standalone operations (sales representatives on client calls) or tight integration with desktop applications (power users or financial analysts). These situations are likely to require installation of software on client machines for the users to function effectively.

From an internal standpoint, cost effective delivery of these options implies use of a toolset that can generate multiple styles of client interfaces from a single set of business specifications.

In summary, when considering the client-side architecture, a single customer can have different usage needs depending on the portion of the workforce utilizing the software. Thus, the key message is actually a "flexible client architecture" rather than "thin or no client architecture".

In order to allow an ASP to effectively charge for the use of the software, applications need to be able to track software usage in order to enable usage-based pricing. While the most popular method of ASP pricing is based on named or concurrent users, as the market matures, different pricing combinations will be sought by both the ASP and the end customer. This implies the software must be able to capture data needed to support multiple billing options.

The software needs to have a metering engine that captures key usage metrics. Potential items include:
Transactions processed (by number or dollar volume)
Seats in use (by number, time and type of user)
Automated processes executed
External applications interfaced The metering engine captures the information with logging and/or counting functions, support billable event reporting, and produce usage files that can be interfaced into the ASPs billing application. Given the variety of emerging pricing models that are being experimented with in the marketplace, flexibility is essential.

In this context, security has two primary dimensions—ensuring only valid users have access to the application itself, then ensuring that once they get there, they can only perform authorized functions.

The connection from the customer site to the ASP needs to be tightly secured. Security may also need to be managed across several complementary applications (i.e. ERP, CRM, and HR.) As ASP's begin to offer application software bundles, software packages must provide hooks into third party security/authentication packages to allow the ASPs to manage application access at a "solution" level rather than a software level. An additional layer of complexity is added if the infrastructure is shared (i.e., there is a many to one ratio of customers to applications/servers). Running applications in a multi-company environment leads to two additional security concerns.

In many applications security is a "global" function, used to manage users and assign access rights throughout the system. In a multi-company environment, security functions also need to be segmented at the customer level. Direct user access to the application's database for reporting, custom functions must be restricted. Secured APIs or "data marts" allowing access to only a single customer's data must be provided by software or ASP extensions.

A key differentiation point for ASP's is the ability to offer solution "bundles" and to tie these bundles into clients existing applications. Current ASP's tend to offer only single vendor solutions, with limited options for interfacing external systems. Bundled offerings from ASPs need to leverage existing application APIs and middleware applications to provide integration to other packages or systems. In addition to connecting to additional applications, with the rise of trading communities, back office software applications will also need to interface easily into web-based marketplaces such as AribaNetwork and Commerce One's MarketSite.

Multi-company processing is the ability to run multiple companies' on a single installation of an application (and by default, on a single server). ASP's can configure the infrastructure for their customers in one of two ways:

Dedicated Infrastructure—Companies with significant security and availability concerns or those will high transaction processing volumes or large numbers of users may require own server and instance of the application. These companies are likely to absorb a higher monthly fee for ASP service to have their own dedicated service.

Shared Infrastructure—Other companies may be willing to accept shared application service due to less complex business organization (not necessarily less complex business processes) or the desire of a lower priced service.

In the first situation, multi-company support is less important, because each company's instance of an application service resides on dedicated infrastructure. However, in the second situation, the ability to support multi-company processing delivers economies of scale from a system administration and infrastructure set-up and maintenance perspective. Leveraging economies of scale at this level is critical for ASP's that target the mid to small-sized business market.

Running multiple companies on a single installation of a software application raises significant additional software requirements. To enable a shared application service model, the software must have several enabling capabilities: Every data entity/object in the application must have a foreign key identifying the customer's organizational entity. This includes configuration tables and other tables controlling application processing and parameters.

Application logic must:
  Maintain the "organizational entity" column with all transactions
  Incorporate access control functions around the "organizational entity" (both data and process functions)
  Trigger metering and logging functions for billing and SLA reporting Utilizing existing company or business unit fields already provided in the application provides a workaround for some of these items. However, existing business functionality that is driven across these fields is then likely to be impacted. As an example, for the accounting function, many systems automate the generation of intercompany transactions using the software's company or business unit field. If these existing fields are used to separate and secure physical customers, this business logic is not accessible to those customers who actually have the need to operate "Scalability is an attribute of a software system that characterizes the degree to which an application can support an increase in processing volume or in number of users." In the ASP market space, software must be scalable to both the items mentioned in the statement above: transaction volume and number of users. In a shared infrastructure, the system must also be scalable for several companies to use at once.

Scalability, for the most, part resides within the infrastructure. There are two main perspectives of how to address scalabilities from a hardware perspective: one big box vs. many smaller boxes. The "one big box" model provides better economies of scale in regards to the cost and simpler sharing of resources. The "many smaller boxes" model is more expensive, but it allows more flexibility to serve the customer. For example, if a problem occurs in the second model, then only a sub-set of the end user population is affected instead of multiple customer. In addition, having several servers available allow system administrators to be prepared with "hot swappable" servers that can be brought up when another goes down.

While the infrastructure is at the forefront for scalability, it does affect how the software is designed. This is especially true within a shared application services or "one big box" model. The underlying architecture of the application must be able to be tuned for efficient processing with multiple business organizations running on it, and batch processes must be able to execute concurrently for multiple companies.

The ASPs may be managing several applications for one end customer, brining together several applications. However, integration with other business applications is only one part of the "integration" necessary to deliver a solution. It is also critical that the application has standard hooks into systems administration software and tools covering areas such as:
  Monitoring, Scheduling and Performance Management tools
  Directory Service technologies (i.e., Lightweight Directory Access Protocol)
  Business Process Functionality
  Rapid Configuration ASPs sell fast and functional implementations of leading software products. In order to assist in delivering on that promise, the configuration of the software itself needs to be accelerated. Toolsets that ease the process of identifying and making configuration decisions and in establishing baseline processes are critical to achieving this goal.

An additional step in this direction is the creation of industry or process templates. In order to deliver these templates, the software vendor must have deep understanding of industry based business processes. While this may not be an issue for larger, more established vendors, attracting the needed business expertise could be a challenge for smaller companies.

An example of the latter innovation is SAP's mySAP.com business scenarios. These business scenarios provide pre-configured process templates for various industries and relationships, each of which can be customized to meet the needs of the organization. The functionality needed to execute tasks for each business scenario resides in discrete SAP and non-SAP software and service components, all of which are available through the mySAP.com Workplace.

Most major software vendors have incorporated international functionality into their products, such as multi-currency, different payment methods, and language set-up. However, regulations and business practices unique to individual countries or regions are often not included in the "global" release of the software, forcing the end customer to purchase a separate license of the country or region specific release software. This creates the need to have several instances of the software, which in turn makes it more difficult and complex to maintain and to consolidate information at an enterprise-wide level.

As the ASP channel grows and attracts companies with multi-national or global operations, software applications must be able to handle the processing for these companies out of a single installation of the software, and avoid the need for the ASP to license country-specific releases of the software in addition to the global release. Without this consideration, the cost of the ASP services to these customers will be higher, and the sales through this channel may be effected.

Sell Applications

The ability to market and sell the application is equally as important as the building of the application. Software vendors must have a clear understanding of the evolving business models in this market space. Absorbing these business models into their organization, targeting the appropriate channels, pricing effectively, and implementing the channel plans is essential to exploiting the ASP channel.

The ASP market causes a paradigm shift in how software is sold and distributed. The emergence of ASPs introduces another sales channel for software vendors and could eventually turn the use of application software into a commodity-like business, with the ASP as the prime distributor of the product.

Today, most software vendors see ASPs as an incremental sales channel, as in their current form, most ASP sales are not cannibalizing sales from vendor's other channels. In addition, the software vendor still retains firm control over the customer, with the broad market still seeing choice of software provider as a key element of the IT and business strategy.

However, if the ASP market expands as predicted, the ASPs that emerge from the initial wave of entrants could vie for control of the customer channel. Just as RDBMS vendors took control from the hardware vendors in the 80's, and software vendor's took control from the RDBMS vendors in the 90's, ASP's may enter in the 00's.

While some software vendors may welcome the opportunity to focus on the core competency of software development, others will certainly resist loss of control.

Three possible strategies for working with ASPs can be considered:

Commodity: Focus on product development, let the ASPs do the sales and customer facing activity Leverage the ASP channel to provide majority of the sales, service and support function; allowing software providers to concentrate on software development. A key differentiator in the post-Y2K world will be the add-on functionality on top of the core product. For emerging or resource constrained providers, this strategy focuses the organization on product development and process expertise. However, this strategy also assumes a robust ASP sales channel, which does not exist today.

Dedicated Channel: Utilize ASP as additional channel for software and services sales Utilize the ASP channel to extend reach into untapped markets or to provide existing customers additional options. In this model, the ASP channel is simply an additional channel for the vendors products, but not one that is necessarily more important than the other channels. Currently this is the predominant strategy. A key challenge for software companies adopting this strategy is managing inevitable channel conflict as the ASP market grows.

Do it All: Sell and Host the Application

Continue to build the software and provide the hosting and operations capabilities. These companies will attempt to control the channel, from software to customer to hosting. Note that this does not imply that the software providers provide all the required services themselves, only that they arrange and consolidate provision of those services, and market directly to the end customer. Today, most software providers have adopted the dedicated channel strategy.

Like any manufacturer facing a new distribution channel, software providers will need to decide how to embrace the ASP and its role in the value chain.

Software vendors need to revise pricing models to better meet the needs of ASPs and their customers. Traditional software pricing models are designed around a one-time payment for licenses with an additional maintenance fee each year. However customers purchasing from ASPs look for a more even spread out, stable payment flow based on predictable measures of usage.

During the recent first wave of activity, ASPs were (some continue to) paying software vendors in "bulk", buying licenses up front at a discount, and then renting or leasing those licenses on a per use basis (i.e., monthly rate, access time, transaction based, automated processes) to the end customer. This model is advantageous to the software vendor, but is very capital intensive for the ASP, who is at financial and operating risk by not being able to match expenses with revenues.

However, as the market continues to evolve, ASPs need to be able to adjust their revenue/expense flow and match the payments to the software vendor with their customer receipts. If the ASP channel grows as expected, it is likely that the market will begin to force the new model, and the software vendors will then need to continue adapting their business and pricing approach to reflect this demand.

In addition, the software vendor must prepare for this model to spread to their traditional customer base. When the uptake for the new pricing model occurs in the ASP market space, the customers who buy licenses via the traditional channel will begin to demand alternative pricing models as well. Software vendors must be ready for this shift.

Out of the large software vendors, SAP has recently made some interesting moves in this direction, proposing a mixed pricing model for mySAP.com based on a blend of user-types, transactions processed and access to SAP by external systems. They have also recently introduced a rental pricing option, where customers can rent the software over a contract period of 12–36 months. SAP indicated this move was driven mainly by demand from public sector clients and SAP's outsourcing/ASP partners.

While in the long term shifts to these types of pricing models increases the visibility of the revenue flow, in the short term analysts have said the transition period may make it harder to make forecasts.

Closely related to selecting a strategy for utilizing the ASP channel is the need determine how to implement this strategy. Activities involved around this strategy could include: creating an ASP channel-specific marketing plan, dedicating portions of the sales force to address this channel, forming strategic alliances with certain ASPs to help gain control the market space, and communicate ASP strategy and actions clearly to the market. The largest potential issue revolves around the sales force. While today it is believed competition between the traditional sales and ASP channels is minimal, if ASPs begin to appeal to a broader range of customers, vendors need to manage the inevitable conflict between their ASP channel partners and their internal sales forces.

Serve Customer

The ASP channel also impacts how software vendors support their customers. Adding to the already complex process of managing a customer base, the ASPs not only add additional customers for the software vendor to manage and serve, but they are also intertwined with the end customers creating complex customer relationships.

Software vendors often have a consulting or professional services unit to assist in delivering value to their customers. Software vendors need to address the ASP marketplace like any other type of customer.

One of the key pillars that this channel stands on is the reduced time of implementation compared to "traditional" installations. To be an effective consultant for the ASP, the software vendor must have a deeply skilled consulting force in their product line to enable fast implementations of the product. Alternatively, vendors need to plan for capability enablement programs to effectively train ASP staff.

The addition of another customer set for the software vendor does add complexity and burden to their services workforce. However, if the vendor can deliver excellent consulting service, the result can be twice as valuable: success for the ASP means success for the end customer.

The software vendor now has an additional set of customers that it must be able to serve from a Help Desk. In addition, they must have a technical capability to understand the configuration and challenges of an ASP's infrastructure. The additional layer of help desk customers also complicates the SLA agreements. Questions arise as to who should support the software: the vendor or the ASP?

Vendors must develop a clear strategy for structuring service agreements in this environment.

One object of the present invention is to provide an overview of the ASP Diagnostic, the organization and focus of the Diagnostic, insight into the unique capabilities required by ASPs, and reference to AC assets that can be leveraged for more detailed information.

This may be accomplished via an ASP Diagnostic including a Process Component, Infrastructure Component, Organization Component, and an ASP Diagnostic Checklist Overview.

The purpose of the ASP Diagnostic is to assist an ASP in understanding the breadth and depth of the capabilities needed to successfully compete in the ASP marketplace identify the gaps that exist relative to the ASP's current capabilities. The ASP Diagnostic is comprised of three assets used to address this phase:

1. ASP Framework: Spans the organization, infrastructure, and business process competencies that an ASP must develop in order to be successful.
2. ASP Diagnostic: Defines the key components of the ASP business model, highlights ASP relevant insights, and references assets that can be leveraged when performing the diagnostic.
3. ASP Diagnostic Worksheet: Organized into categories based on the ASP Framework, this worksheet identifies ASP relevant questions that help to identify possible gaps in an ASP's current capabilities.

Figure 1A:
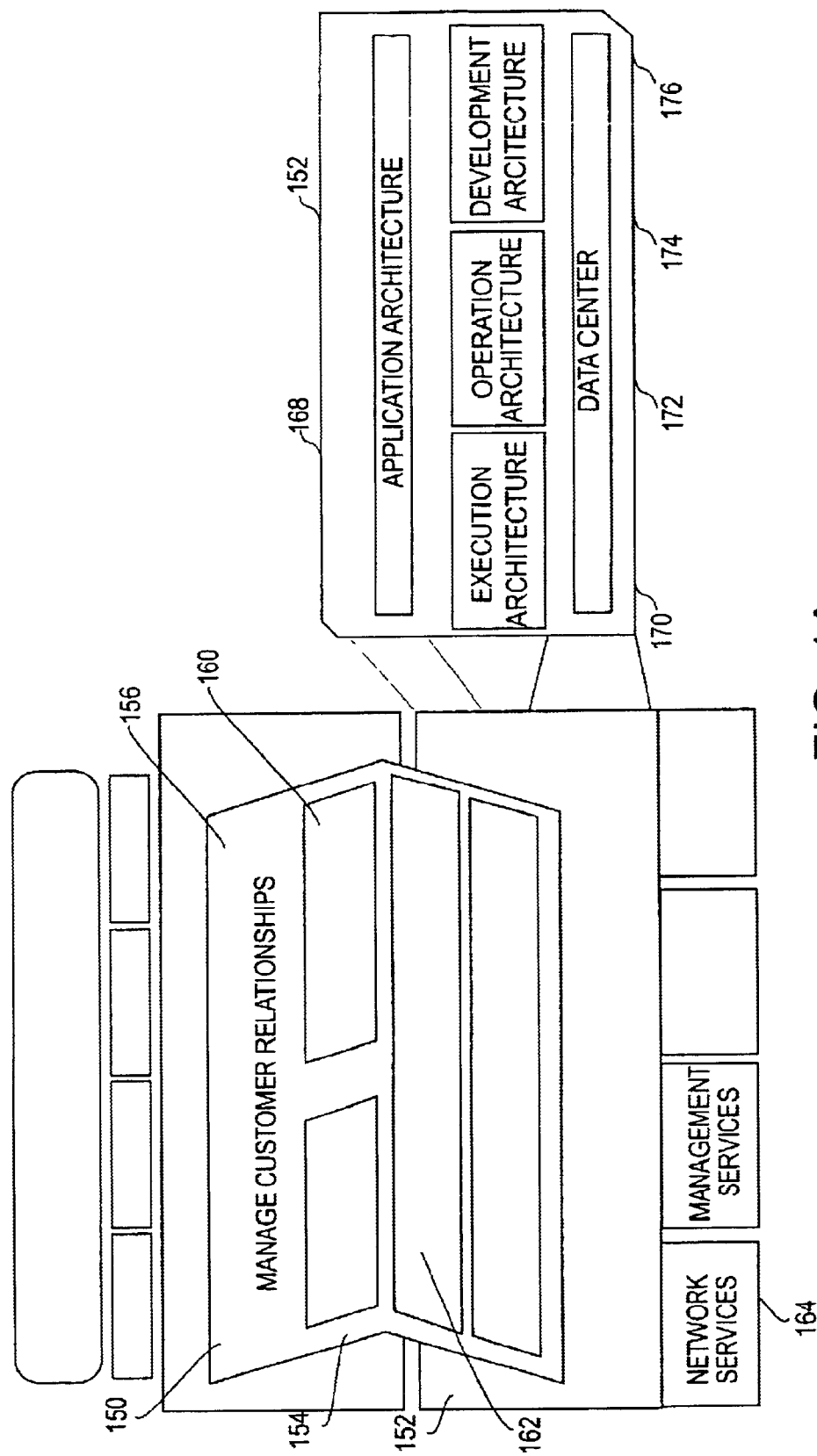
FIG. 1A illustrates the ASP framework components associated with the present invention along with the subcomponents of the infrastructure sub-component.

ASP Critical Success Factors
  Developing a customer-centric product strategy
  Maintaining a single point of contact for the customer
  The customer care component of an organization will become the key differentiator for an ASP
Managing Alliance Partnerships
  Channel strategies and pricing models must be clearly defined
  Complex Service Level Agreements and Operating Level Agreements must be managed
Speed to Market
  Customers that decide to buy outsourced apps or services are generally driven by the speed of implementation
  Industry consolidation and product maturation is forcing software development organizations to develop into service organizations
  Product differentiation is becoming increasingly difficult in an aggressive marketplace FIG. 1A illustrates the ASP framework components associated with the present invention. Each component of the framework is comprised of questions, ideas, and points of view that are intended to help diagnose an ASP's capabilities. Each component can be further broken down into components that define the capabilities required.

As shown, an organization component 150 includes organizational model and skills needed for the ASP to serve its customers, retain its employees, and perform in a fast moving and evolving marketplace.

Also shown is an infrastructure component 152 which includes network, data center, and environment characteristics necessary for the ASP to serve a large customer base, maintain security, and ensure high-availability.

Also provided is a process component 154 including processes, alliances, and governance controls necessary for the ASP to develop focused products, sell to the customer, serve the customer, and manage its enterprise. The process component 154 has a plurality of subcomponents including:

Manage Customer Relationships (156)
  Creating customer-centric processes
  Resolving channel conflicts
Develop & Manage Products & Services (158)
  Identifying value proposition
  Defining pricing model
Fulfill Product & Service Demand (160)
  Developing application provisioning efficiency
  Managing service change and disruption
Plan & Manage the Enterprise (162)
  Monitoring business performance
  Monitoring place in value chain
Alliance Management (164)
  Governing and managing partner relationships
  Ensuring integrated service management Within the process component 154 of the ASP business model, there are several "points of view" that either identify expected changes in the ASP business model or ideas that will be particularly important in shaping the success of the ASP. Such points of view are as follows: Delivering Service Level Agreements
  Detailed SLAs and performance data for customers will be differentiator
  Near real-time performance data from partners vital to managing SLAs
Developing Customer-centric Processes
  Help desks need access to customer specific data as individual service levels will be the norm
  Minimize number of alliance partner contacts needed to close deal
Defining Pricing Model & Processing Billable Events
  Per-transaction or per-use pricing plans will be desired by many ASP customers
  Network and system capability needed to capture and rate transaction-based data
Providing Integrated Service Management
  ASP should be single point of contact for customer
  Warm transfer processes to partners must be explicitly defined
Managing Applications & Infrastructure
  Immediate turnaround time required for admin requests (new account, new password)

One process within the process component is. Below is a list of several in depth sub-process elements that need to be evaluated for potential gaps.
Develop sales & channel strategy
Develop help desk processes
Manage service level agreements
Provide proactive customer service
Develop integrated service plan
Process billable events
Define organizational structure
Develop desired skillsets When interacting with customers, it is vitally important that an ASP present a unified message and a single point of contact across all of the partners that help market, sell, and service the product ASPs must determine what channels to employ to sell to customers and identify how to leverage alliance partners for sales leads.

Another process within the process component is Develop and Manage Products and Services 158. Below is a list of several in depth sub-process elements that need to be evaluated for potential gaps.
Key Components
Understand market & technology
Define target customer Define channel strategy
Identify alliance structure
Develop product/service portfolio
Create pricing model
Define organizational structure
Develop desired skillsets Successful ASPs must define their value proposition (price-driven, value-driven, service-driven), based on the application packages and level of integration/customization they wish to support. When defining service offerings, ASPs must determine what components of the offering can be supported in-house vs. sourced to a partner.

Still another process within the process component is Fulfill Product and Service Demand 160. Below is a list of several in depth sub-process elements that need to be evaluated for potential gaps.
Key Components
Manage service change
Monitor operation level agreements
Manage application implementation
Monitoring value chain position
Manage network capability
Monitor & improve provisioning
Define organizational structure
Develop desired skillsets Managing initial application implementation and subsequent moves/adds/changes, will be critical to ASP customer satisfaction. ASPs must become skilled at managing service changes and upgrades in order to minimize disruption to the customer.

Still yet another process within the process component is Plan and Manage the Enterprise 162. Below is a list of several in depth sub-process elements that need to be evaluated for potential gaps.
Key Components
Monitor & improve business performance
Manage knowledge capital
Refine vision & strategy
Manage settlements
Define organizational structure
Recruit & develop desired skillsets Successful ASPs master the management of the enterprise so that knowledge capital is used to continuously improve customer service and business performance.

Still yet another process within the process component is Managing Alliances 164. Below is a list of several in depth sub-process elements that need to be evaluated for potential gaps.
Key Components
Launching alliance partnership
Managing & operating alliances
Governing portfolio of alliances
Define alliance organizational structure Management of alliance and supplier partners will be critical to all ASPs as none are expected to develop capabilities across the entire digital value chain. Identifying the right partners and acting quickly to bring the joint offering to market is critical.

There are several assets that can be leveraged for more information on particular business process capabilities. Such assets are as follows:
Optimizing Customer Operations Market Offering
   Customer Service Call Handling Business Capability Package
   Trouble Management Call Handling Business Capability Package
   Call Handling Simulation Tool
   Call Center Cross Industry Best Practices
   Business Capability Definition Documents
   Network Transformation Market Offering
   Operations Maturity Model Diagnostic Tool
CRM Practice Aid
   Sales Effectiveness Best Practices
eProcess Reference Guide
   Business Practices
   Business Architecture Blueprints
   Value Network Model
Alliance Capability Diagnostic Survey
PartnerShape Market Offering
Partnership Value Assessment Prospective ASPs should use the following process accelerators to expedite the time to market.
Application-specific knowledge repositories
Call-Center-In-A-Box Market Offering
Implementation Templates ("Solutions-in-a-box")
SLA templates
Industry standard business infrastructure applications
Alliance partner assessment tool
Application Jump Start Within the infrastructure component 152 of the ASP business model, there are several "points of view" that highlight characteristics of the infrastructure that will be particularly important in shaping the success of the ASP. There are as follows:
Operations Environment
   Operations environment becomes part of product offering in ASP business model
   Operation management tool and people become customer facing
Architecture Sourcing
   Inefficient for an ASP to provide all aspects of the infrastructure. Therefore, infrastructure partnerships will be critical
Development Environment
   ASP could offer development environment as a product that clients use to create, customize, and test applications
Infrastructure Design
   Quality requirements such as scalability, flexibility, performance, and reliability should be considered in the design phase to avoid future complexity and cost factors
   An ASP should consider the risks associated with renting infrastructure components vs. the benefits of owning in regard to maintaining SLAs
   An ASP should strive to reduce infrastructure complexity to avoid spreading itself too thin by trying to support every type of application The Application Architecture component 168 contains items specific to common application components and services for integrating these components, independent of specific application implementations. They are as follows:
Coupling
Encapsulation
Cohesion
Separation of Concern The Application Architecture component 168 supports the ability to leverage an instance of the application across multiple customers, possesses modules whose function is to perform one and only one activity, and incorporates the application architecture tiers with the infrastructure.

The Execution Architecture component 170 is a unified collection of run-time services and control structures that provide an environment in which business applications are executed. Some key components are listed below:

IP Network
Web Services
Hardware & Operation Systems
Middleware
Information Management
Security With these components, the Execution Architecture component 170 is adapted to support middleware that provides integration with legacy systems, multiple applications, and web access, and manage access to the applications while maintaining the proper customer authorization within the application.

The Operations Architecture component 172 is a combination of tools and support services required to keep a production system up and running efficiently. Some key components of the Operations Architecture component 172 are listed below.

Systems Management
Service Management
Configuration Management

Application AvailabilityThe Operations Architecture component 172 provides the ASP with the method of delivering products to the customer, and must be sensitive, responsive, and proactive to customer needs and events that impact customer service The Development Architecture component 174 is a combination of standards, procedures and tools, which define an application design, construction and maintenance environment including, but not limited to Policies and Procedures, and Tools.

In operation, the Development Architecture component 174 balances requirements of software standardization vs. customization and supports multiple, simultaneous, and inter-related efforts.

The Data Center 176 is the physical site and support of the hardware and software required to operate the application.

Facilities
Disaster Prevention
Disaster Recovery
Network Proximity
Operations Center The Data Center 176 must maintain operability. If the Data Center fails, all service to the customer is lost. Further, the Data Center 176 offers the greatest opportunity for ventures and alliances.

Figure 1B:
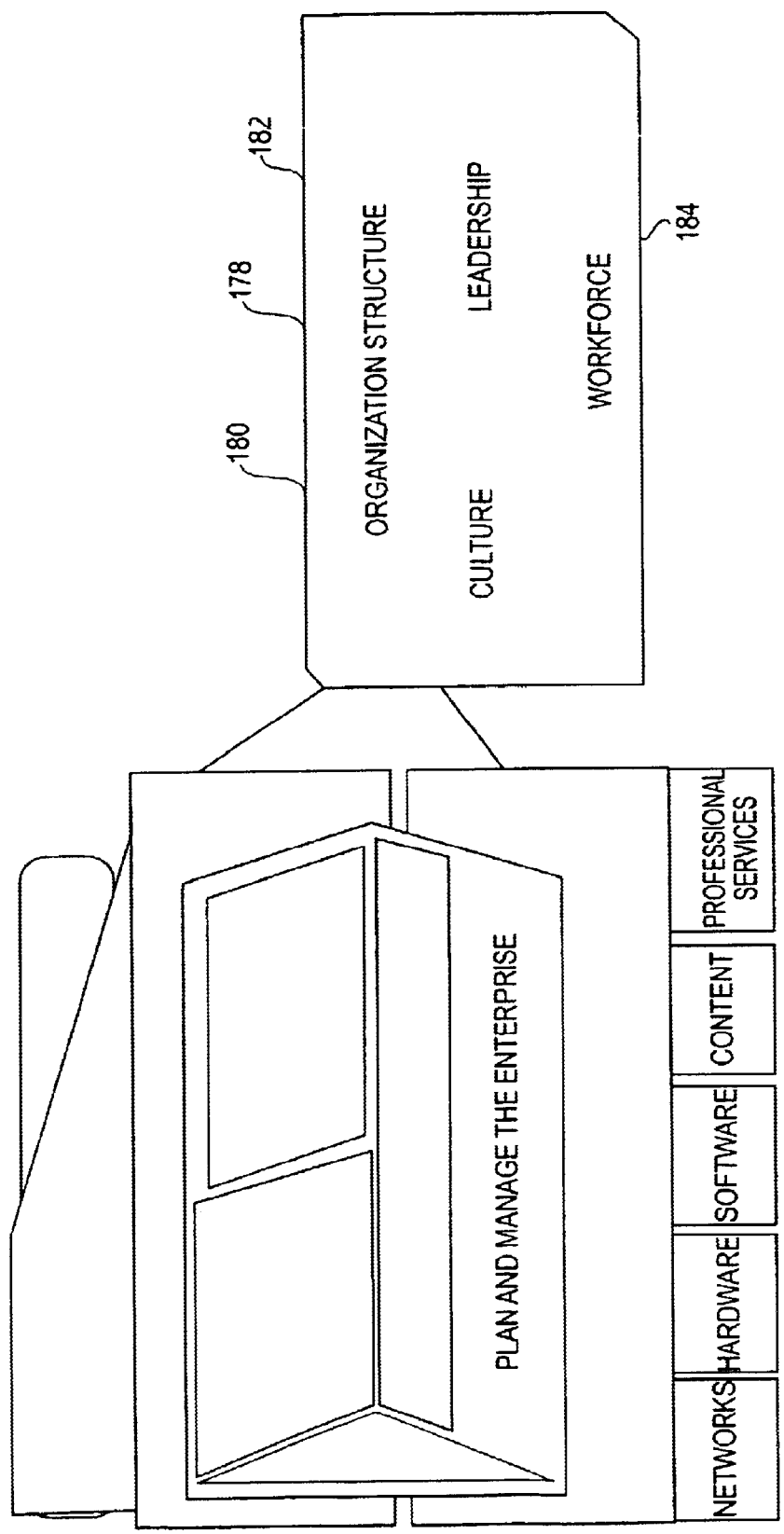
FIG. 1B illustrates various subcomponents of the ASP Organization component of FIG. 1A.

The market challenges introduced by ASPs will fundamentally change how clients approach the development of their people and organization as a whole. FIG. 1B illustrates various subcomponents of the ASP Organization component 150. They are listed as follows:

Organization Structure (178)—ASP organizations must be customer-centric

Organization Culture (180)—ASP cultures will be meshed/absorbed due to alliance partnerships Leadership (182)—ASP leaders must be collaborative in order to work with virtual, cross-functional teams Workforce (184)—the ASP workforce must be highly "connected" and empowered The ASP Organization component 150 include various points-of-views including:

Managing Customer Care

Maintaining a single point of contact for the customer to deliver seamless solutions in an organization with multiple vendors and alliances Customized vs. standardized application packages/offerings will determine the level(s) of customer service provided by the ASP Determining the amount of service offered to the customer Managing Alliance Partnerships Absorbing the values, norms, and behaviors of alliance partners may prove to be difficult Assessing and selecting appropriate alliance partners will be key to the integration of cultures and the overall success of the ASP Coordinating is key to managing alliance partners to clearly define transfer and handoff procedures Balancing defined governance structures with a flexible culture Clearly define roles and recruit skilled employees to manage Service Level Agreements and Operating Level Agreements Managing Traditional Mindsets Companies are finding not all employees can survive in an unstructured, nimble environment Must create mechanisms (communication, training, mentoring) to address this issue Speed to Market ASP organizations must balance risk versus rewards in the marketplace Empower workforce to make quick decisions Research reveals that a specific set of core organization capabilities are required for a successful ASP business. The organization structure component 178 identifies participants and their hierarchical relationships which defines functional categories and relationships to each other, and who will be responsible for performance of work tasks. Various organization factors of the organization structure component 178 that are relevant to ASP's are as follows:

Real time decision makingAlliance partnerships, outsourcing and customer demand will drive ASP organizations to make more decisions in a virtual environment Connected, decentralized decision-making structures require the maximum amount of communication Aggressive knowledge management strategies Absorbing and managing significant new amounts of data across many channels/medium Translating data into knowledge and fostering collaboration among the many processes at all levels that use it in a coordinated fashion Promoting knowledge sharing in order to provide seamless support Customer-centric organization Understanding and responding to customer needs by quickly reacting to market changes and customer feedback Excelling at customer relationship management by ensuring that ASP employees have the necessary skills through the selection/recruitment process and enabling CSRs to make timely decisions at point of need Identify account management roles in the organization to provide single communication and support channels to the customer The culture component 180 of an ASP is embodied in the values, beliefs, and behaviors of the organization. An organization's culture is the common bond among their processes, structure, and people.

Various organization factors of the culture component 180 that are relevant to ASP's are as follows:

High Capacity for Change
  Nimble organization structure
  Strategy shifts may be frequent
  Evolving services/software industry requires constant change
  Ability to deal with ambiguity
  Capacity to adopt and proactively explore new technology and skills
Creativity
  Risk seekers are rewarded
  Product/service must be constantly innovative and differentiated
  Respect for diversity
Customer Focus
  All activity focuses on the customer—the customer drives the business
  Organization structure focused is customer-centric
Knowledge Worker is Empowered
  Flat organization structure
  Cross functional, team-based environment due to alliances
  Succinct and fluid decision making processes
  Highly "connected" workforce
  Employee has a personal stake in the success of the company
  Ability to translate benefits of technology into customer value
  Promoting knowledge sharing
Willingness to Work Openly with Alliance Partners
  Alliance structure mandates cooperation
  Outsourcing is prevalent
  Acceptance of alliances requires absorption of other cultures Leaders of the ASP organization must exhibit a unique set of competencies to succeed in a world moving at Internet speed. A leader is the person who drives the organization to achieve success. Various organization factors of the leader component 182 that are relevant to ASP's are as follows:

Risk Taking: Ability to constantly make decisions quickly and take calculated risks
Collaboration: Ability to work with alliances and cross-functional teams to meet customer needs
Partner Integration: Ability to quickly and clearly understand customers and alliances, and create a role for both on teams
Design Creativity: Ability to design organization around which skills are built within and bought externally
Global and Virtual Reach: Ability to establish/sustain relationships without interpersonal contact, organize virtual teams by workflow or process, global leadership, and local accountability
Technical Awareness: Develop widespread ability to use the right ASP technology to solve a specific problem as well as widespread awareness of new ASP technical concepts
Communication: Constant display of charisma, energy, and accessibility to all levels of the organization
Team Building: Ability to treat coworkers as partners, not competitors. Empowering employees to make decisions.
Alliance Building: Proactively seeks and reactively responds to alliances through industry connections. Creates a network of relationships that helps get things done.

Hiring and retaining the "right people" for an ASP organization may present a major challenge. The workforce is the people, talents, and skills comprising an organization. Various challenges and implications of the workforce component 184 that are relevant to ASP's are as follows:

Challenges
Employees demanding increased autonomy
Techies' desire to work autonomously
Traditional customer relationships are transformed
Rapid Strategy ShiftsOrganization structure mandates cross-functional skills
Cross training workforce in multiple skills and applications
Scarce talent resources
Implications
Loss of control for management, greater uncertainty for the individual
Clashes with the need for a team-based organization
Eliminate functional departments—everyone is responsible for customer relationship building
Employee development and training takes a "back seat"
Recruiting for the person, and not so much the position
Need both breadth and depth in training and technical skills
Need to constantly and aggressively attract skilled workers Examples of questions associated with the various sub-components of the process component 154 of the present invention are shown below in Table 1.

TABLE 1

| Understand Market | |
|---|---|
| 1) Does the ASP have experience with enterprise applications? | Significant enterprise application experience is necessary to be a competitive ASP. Customers need application specific service and support. |
| 2) Does the ASP have experience with networks and/or data centers? | Best of breed ASPs are adopting a business model in which they outsource the network and data center operations to an infrastructure alliance partner. |
| 3) Has the ASP defined its customer value proposition? Will the ASP provide low cost, generic applications or will it offer best of breed applications with the option for customization or extension? | ASP offerings are currently on the entire spectrum of low-cost to expensive. However, very few ASPs offer customization or extension services. There is no indication yet as to whether or not an ASP can make money customizing. |
| 4) What components of the Digital Value Chain does the hoster want to own vs. buy or borrow? | The more components offered in house allow for higher service levels and an easier ability to present a "single face" to the customer. |
| 5) What is the proposed time to market? | The ASP marketplace is evolving rapidly. The target timeframe will help drive scope of offferings and how they will be delivered. |
| Determine Target Customer | |
| 1) Will the ASP target small, mid, or large companies? | Mid-size companies are currently considered the target customers for ASP offerings. |
| 2) Will the ASP target "growth" or "traditional" companies? | Growth companies are currently considered the target for ASP offerings as these companies 1) don't want to devote capital to back-office infrastructure and 2) need IT capabilities very quickly. |
| 3) What functions will the hoster offer (e.g., full ERP Suite, CRM, Purchasing....) | |
| Design Products & Services | |
| 1) Does the ASP offer one integrated application or many enterprise applications? | Competitive ASPs offer several best of breed enterprise applications, typically one per business process (i.e. CRM, |

TABLE 1-continued

| | |
|---|---|
| 2) Has the ASP "productized" its offerings? | Procurement, Financial Management, etc.) "Productized" offerings are preferred. In this case, the ASP is adding value beyond a simple outsourced application solution by providing integration, training, and implementation services. |
| 3) Based on the answer to "Has the ASP defined its value proposition" above, the ASP should decide whether it will develop products price, service, product, or value driven. | If the ASP is price driven, then its product portfolio should consist of offerings that are "out of the box" with little customization using low-cost applications. If service driven, the products may offer some flexibility or configurations. If product driven, the ASP should identify the best of breed applications that it thinks will attract the most revenue. If value driven, the ASP should offer functionality rich applications and the ability to customize or extend some portion of the application. |
| Plan & Manage Network/Data Center Capability | |
| 1) How does the ASP evaluate its network and data center capacity? Plan & Manage Alliance Capability | |
| 1) See Alliance Management section below for specific checklist items. Develop Product Capability | |
| 1) How will the offerings be built? | Consultant/specialist resources can be used to rapidly develop the offering at the expense of building in house skills. |
| 2) How will custom elements be provided? | |
| 3) What is the methodology for developing and delivering the product capability? | ASPs need to have a full-cycle methodology that included implementatio and ongoing operatio and improvement of the application in order to lower cost and risk. |
| Perform Technical & Market Trial Rollout Product to Market Monitor/Maintain Product Portfolio | |
| 1) Are service offerings routinely reviewed to determine profit optimization and sufficient market coverage? Develop & Support Channels | |
| 1) What sales channels are being used to pursue ASP customers? 2) Does the ASP employ alliance partners for sales leads? Develop Advertising & Promotional Programs | |
| 1) What media outlets is the ASP using to advertise its service offerings? 2) Does the ASP jointly advertise with any of its suppliers or alliance partners? Develop Pricing Model | |
| 1) What type of competitive pricing analysis has the ASP performed? 2) Is the ASP pursuing a per-user or per-transaction model? 3) Will the hoster own the software licenses or will the customer? | Most ASPs are currently offering only flat rate, per-user pricing plans. However, this is expected to change as more companies transition to a usage-based model. The hoster aggregate customers and purchase licenses at a lower cost, but customers prefer to own the license and avoid being "locked in" to their ASP by the cost of changing applications. |
| Create Marketing Plan Determine skills, capabilities and resource requirements needed to support the product and services function. | |
| 1) What skills do the product and service employees currently require? 2) What training do these employees currently go through? 3) What specific skills have helped the product and service employees succeed/fail? Determine an organizational structure which supports this function. | |
| 1) How is the product and services area currently organized? Select Target Customer | |
| 1) Does the ASP's sales force rate opportunities and prioritize call frequencies? | All other things being equal, sales forces should devote more attention to new opportunities than recurring or replacement opportunites. |
| 2) Does the ASP's sales force evaluate competitor's involvement with target customers? Generate Demand & Attract Customers | |
| 1) How does the ASP forecast market demand? 2) What plan does the ASP have to offset competition from traditional software companies? Design Customer Solution | |
| 1) Does the ASP have design capabilities to accommodate customized solutions or only "out of the box" solutions? 2) How will new customer requirements be prioritized and delivered? Negotiate Sale | |
| 1) Does the sales force have the flexibility and capability to negotiate "one-off" deals? Set-up & Maintain Relationship | |
| 1) How does the ASP plan to manage its customer relationship, via an account team, via the web, via customer service reps, etc.? 2) Is the ASP's senior management engaged with senior management from high-value customers? | Create a relationship matrix in which executives from the ASP are assigned periodic account management activities |
| 3) Does the ASP manage its sales force based on end-to-end relationship management or just sales management? Manage Order Activate Service Fulfill Sale Manage Contacts | |
| 1) When a prospective customer contact is received, how is it processed? Is a reply e-mail sent immediately? Is the prospect telephoned within a day? | |

TABLE 1-continued

2) What tools are used to track customer contacts and who within the ASP has access to these tools?
Process Customer Requests
Perform Proactive Contact 1) Does the ASP proactively send messages about new service offerings?
2) Does the ASP proactively send messages about potential service downtime?
3) Does the ASP periodically survey its customers to determine their level of satisfaction?
Manage Customer SLAs 1) Are service level agreements generic across all customers or developed specifically for each customer?
1) What processes are in place to manage customer service level agreements?
2) How does the ASP capture data to measure service agreements? Does the ASP have the ability to capture these metrics?
3) Does the ASP receive metrics from its suppliers or alliance partners that are needed to manage service agreements with customers?
4) What escalation procedures are in place for SLA disputes?
Manage Customer Troubles 1) What tools are used to log trouble calls?
Collect and Process Billable Events
Price Events and Offers
Create Invoice & Statement
Perform Settlement & Collection Activities
Determine customer communication and support requirements 1) How many customer service employees does the ASP currently have?
2) What is the workload of ASP employees?
3) How are customer service managers and executives involved in the customer service process?
Determine skill, resource and organizational structure requirements.

| | |
|---|---|
| 1) What skills do customer service employees and managers currently require? | Sales & writing skills are required for customer service roles. |
| 2) How are customer service employees currently trained? | |
| 3) How is the customer service organization currently organized? | Org structure should align with the customer they serve, Leverage cross-functional teams |
| 4) How do customer service employees currently communicate with each other and the customer? Align Business & Network (Infrastructure + Applications) Needs Plan Network | |
| 1) Will the ASP build/utilize their own data center or will they outsource this aspect of the business? Does the ASP currently have the expertise/experience to build and maintain a data center? | Best of breed ASPs are adopting a business model in which they outsource the network and data center operations to an infrastructure alliance partner. |
| 2) Where will the data center(s) be located geographically? (US, International) | The physical location of a data center can impact the performance of the network. If the ASP plans to servce a non-US market, then non-US data centers may be required. |
| 3) What types of connections will the customer use to access the data center (Frame Relay, ATM, DialUp) and who will those connections? | The data center should be capable of supporting a variety of connections to the customer. |
| 4) What partners will be used/ leveraged to provide connectivity to the customer? | Partners should have an excellent track record since network related problems can have a direct impact on service. |
| 5) What are the usage projections of the customer base in the short and long term? 6) Will the network be capable of handling a rapid increase in usage? | Regardless of whether the network is built in-house or outsourced, it must be scalable to handle increases in demand. Performance of the network is critical to customer satisfaction. |
| 7) Who will own, manage, troubleshoot client hardware? | Best of breed ASPs are outsourcing this aspect of their business since customer will be physically locate in many locations. ASPs should remain the single first point of contact for any client hardware related problems. |

Design Network
Build & Enhance Network
Continuously Improve Network

1) Consider existing data center capacity. As demand increases, can the ASP add capacity to existing data centers or will they need to build new ones?
Plan Service Quality
Monitor Network

| | |
|---|---|
| 1) How will service quality be monitored and enforced? | Additional points to consider are: What are the ramifications if service quality is not met, especially in areas that are outsourced? What levarage does the ASP have when enforcing SLAs? |
| 2) What automated tools will be used to monitor the network items that are directly controlled by the ASP? 3) What automated tools will be used to monitor the network items that are outsourced to third parties? 4) How will end-to-end connectivty to the customer be monitored and repaired? Control Faults Perform Maintenance Resolve Trouble | |
| 1) How will trouble resolution be managed? 2) What automated tools will be facilitated to improve this process? 3) How will trouble resolution be managed across alliance partners? | This is a critical issue for ASPs. An ASP must be able to resolve all end-to-end issues, regardless of whether the probelem pertains to an ASP owned asset or an outsourced asset. |
| 4) Will automated systems be integrated will suppliers systems? | |

TABLE 1-continued

Manage Security

1) How will ASP secure its physical network, data center, and customer data?
2) What sorts of contigency plans will be developed to deal with breaches in security?
3) Will the customers run on separate instances or shared instances of the application?  Shared instances reduce costs but increase security risks across customers and require tighter controls.

Manage Change/Upgrades

1) How will application software upgrades be managed?
2) Will customers be forced to all exist on the same release of software or will customers have control of when they take an upgrade?  This becomes a larger issue if the ASP plans to provide shared instances of an application to its users.
3) What technology will be used to automate this activity?
4) How will this be handled across multiple customers?
5) How will hardware upgrades be managed?
Forecast Demand
Source & Secure Suppliers/Alliance Partners
Manage Alliance Content/Knowledge Capital
Manage Physical Assets 1) How will physical assets be be tracked, monitored, and managed?
Organizational Structure of Administrative Areas 1) What is the current organizational structure of the administrative functional areas? (Finance, Human Resources, etc.)  Should align with the product and customer service areas to enable these areas to succeed.
2) Is the Finance organization aligned with other organizations in the company?  Align the finance organization with other organizations in the company to assist employees with understanding the financial implications of their business decisions.

Skills and Training

1) What competencies are currently required for Finance/Human Resource/etc. employees?  Skills should support the complex and changing needs of the ASP organization.
2) What training do Finance/Human Resource/etc. employees currently attend?  Provide employees adequate training to support the structure of the organization.
Communication and Knowledge Sharing 1) How do the administrative areas interact and share information with each other?  Organization should be structured in such a way to encourage knowledge sharing and communication among these functional areas.
2) How do the administrative area interact and share information with other areas of the organization?  Should view areas as internal customers and structure the organization so that administrative areas align with the other area's needs.
Define Perf Management Strategy
Establish Performance Targets & Plans
Collect & Report Performance Results
Monitor Performance & Provide Feedback
Develop & Maintain Applications
Manage Technology Infrastructure
Manage Knowledge Capital
Manage Compensation & Benefits
Define Human Capital Strategy

TABLE 1-continued

Define & Manage Organizational Capacity
Perform Settlements & Collection Activities
Design as ASP organizational structure which can effectively manage alliances.

1) How does the current organizational structure interface with business alliances?
2) How does the ASP currently communicate with alliances.  Establishing and sustaining relationships is key.
Determine what competencies are required of ASP alliances.

1) Skills, knowledge, and abilities are currently required of the alliances?
2) Do the alliance employees go through any ASP specific training?
Determine what organizational characteristics and culture of the alliances.

1) What is the culture of the current alliances?
2) How are the alliances currently organizationally structured?

Examples of questions associated with the various sub-components of the organiztion component 150 of the present invention are shown below in Table 2.

TABLE 2

Capabilities, Competencies & Training

1) Does the company regularly train and motivate their employees to build better capabilities.  Have regular training and skill assessments. Encourage employees to seek additional regular training.
2) Does the company frequently assess and document their employees' capabilities to determine potential skill gaps?  Assess employee skills regularly to keep up with changing market needs and possible skill gaps.
3) How successful has the company's training programs been in the past?
4) Do all the employees understand the competencies critical to performing their jobs, and how they can build these competencies?
5) What are the careers paths of employees?  Should have clear/detailed career paths which show employees the steps in their career development.
6) Does each competency area have identified skills required for effective performance?
7) Is an understanding for customer's needs reflected in the training programs?
Leadership and Management 1) How are company executives and leaders perceived in terms of their overall abilities to generate levels of respect?
2) How are company managers perceived in terms of their overall ability to plan and manage the business and the staff?
3) What are management's communication policies?  Should have successful "open door" policies as standard procedure
4) What is management's view on training and development of employees?  Management should encourage employees to attend training sessions, seek out external training, and to TABLE 2-continued

| | |
|---|---|
| 5) What characteristics to organization leaders and managers currently require? | build upon learnings through more challenging future roles. They should be dynamic thinkers who understand the marketplace. They are results-driven and committed to the organization's future. |
| Knowledge Management | |
| 1) Are procedures, tips and techniques regularly documented and shared by employees? | The culture of the organization should be such that sharing information is critical to the company's success. |
| 2) Is sharing of information and knowledge evident across organizational levels and functional areas? | |
| 3) Does the current organizational structure encourage and enable communication and knowledge sharing? | |
| 4) Is the company aware of what knowledge it currently has and how that knowledge is valued in the market? | |
| 5) What is the current vehicle used for knowledge sharing? | Have identified specific areas (repositories) where knowledge is stored for easy access. |
| 6) How is company knowledge currently protected? | Have a security system which protects knowledge capital from competitors. |
| Organizational Structure and Alignment | |
| 1) What is the current organizational structure? | The organizational structure should be sized and staffed appropriately to efficiently and effectively achieve target revenues, customer service levels, and strategic business goals. |
| 2) How does the current organizational structure support the marketplace? | Should be organized to meet the changing needs of the ASP market. |
| 3) How do managers of different organizational areas currently communicate? | Should communicate regularly and often through open communication channels. |
| 4) How well is the current organizational structure working? | The organizational structure should be well thought through and working efficiently. |
| Performance Measures and Incentives | |
| 1) How is performance currently measured? | Should use a proven methodology. There should be significant alignment between the measures and the success of the company. |
| 2) Are performance measures currently tied to incentives that are aligned with current business objectives? | |
| 3) Are the current rewards, including pay, bonus, and benefits, competitive in the industry and with the marketplace? | Should stay competitive to retain high skilled, in-demand workforce. |
| Culture | |
| 1) What is the current satisfaction level of employees? | |
| 2) How is the company culture viewed in the eyes of the customer? | Should be seen as an organization which actively solicits and responds to customer feedback and needs. |
| 3) How does the company currently deal with change and a dynamic market? | Should be an agile and dynamic organization which remains flexible in times of change. Should respond to customer needs and market changes efficiently. |
| 1) Describe the current culture of the company. | High capacity to change quickly, Ability to iterate, Nimbleness & flexibility, Ability to deal successfully & efficiently with ambiguity, Entrepreneurials hip, Creativity, Customer focus & retention, Respect for diversity, Empowered knowledge worker, Willingness to communicate openly, Teamwork |
| 2) How has the current culture helped the company succeed/fail? Determine competencies and knowledge capital required of all ASP employees. | " " |
| 1) What competencies and knowledge are currently required to work at the ASP? | |
| 2) How are the ASP employees currently trained? Determine what specific competencies are required of ASP organizational leaders. | |
| 1) What competencies and knowledge are specifically required for the company's organizational leaders? Determine incentives and compensation needed for an workforce. | Skills to manage continuously changing workforce, processes, and outcomes will be key. |
| 1) What is the current compensation system? | |
| 2) How are employees rewarded for their work? Performance management system | Incentives should be based on customer measures. |
| 1) How are employees currently assessed? | |

Examples of questions associated with the various sub-components of the infrastructure component 152 of the present invention are shown below in Table 3.

TABLE 3

| | |
|---|---|
| Dynamic Web | |
| Interaction | CGI-BIN<br>Dynamic HTML<br>Multi-Tiered<br>Application Server Based |
| Application Server | |
| Business Components<br>Adapter Components<br>Application Services<br>Communication Services<br>Security Services<br>Administration Services<br>Guiding Principles | |
| Reliability<br>Performance<br>Scalability<br>Productivity<br>Total Cost of Ownership<br>Corporate/Product Viability<br>Components<br>Approach/Products<br>Requirements<br>1) Network | |
| WAN | What are the peak network traffic periods (daily, monthly, seasonal, random)? What is the business reason for this?<br>What communications protocols does your network support?<br>What type of internetworking hard- |

TABLE 3-continued

| | |
|---|---|
| LAN<br><br>Network Services | ware is used for LAN resources to communicate with others LANs/systems? (e.g. routers, switches, etc . . .)<br>What types of communications facilities are used for LAN resources to communicate with other LANs/systems? (e.g. leased lines, VAN, fiber, etc . . .)<br>Is there a backbone network? What type of traffic does the backbone support? (voice, video, data, image) Where are the sites on the backbone located? How do sites connect to the backbone?<br>What is the current WAN topology? (Frame Relay, Point to Point, ATM, ISDN, etc . . . Include port and circuit speeds)<br>What routing protocol is being used (RIP, IGRP, EIGRP, OSPF, etc . . .)? Is there a plan to migrate to another routing protocol?<br>Are any of the non-IP supported devices communicating over the WAN? If so, what is the method used to transmit over the WAN (IPX, SNA, etc . . .)?<br>What types of systems need to be accessed from the LANs (e.g. web servers, application servers, file/database servers, mainframe, etc . . .)?<br>What are the peak network traffic periods (daily, monthly, seasonal, random)? What is the business reason for this?<br>Is there a requirement for remote access to the network? If so, how is it achieved?<br>What is the current LAN topology? (Ethernet, Token Ring, FDDI, etc . . . Include segment speeds)<br>What types of LAN protocols are used (e.g. IPX/SPX, NetBIOS, TCP/IP, etc . . .)?<br>What types of internetworking hardware are used with the LAN, include model and OS? (routers, hubs, switches, bridges, gateways)<br>What type of cabling and wiring media is supported? (UTP cat3, 4 or 5, STP, fiber, coax, wireless) Do you have a universal cabling/wiring scheme? Is the media capable of supporting all communications protocols?<br>What NOSs are in use?<br>What TCP/IP addressing (Class A, B or C), name resolution and dynamic IP configuration schemes (DHCP, WINS, Dynamic DNS) are currently being used? Does your company own the registered IP address range or is it provided by your ISP?<br>Who manages the communications systems software? How is it designed, installed and updated? Is there a standard methodology in place to perform changes?<br>What flexibility is built into the communications architecture? Will this architecture support your company's need for the next five to ten years?<br>What Network management packages does your company use for managing LANs & WANs |

TABLE 3-continued

| | |
|---|---|
| | What service levels do you need to provide for your business?<br>How do you measure these services? Does your organization have a disaster recovery plan?<br>Has the D/R plan been tested and how often is it tested?<br>if any, What redundancy Has been built into the network, firewalls, routers, web servers?<br>How are problems on the network located and corrected (sniffer, NMS, etc . . .)?<br>What level of Web Content Cacheing exists<br>What Level of Application Proxy Services exiist<br>What ranges for speed, bandwidth, and reliability can be offered depending on the customer |
| 2) Hardware & OS | |
| Hardware Management | What are your company's current and planned strategic hardware platforms? What applications do these platforms support?<br>How many physical servers currently comprise your eCommerce infrastructure? How are these servers deployed across your Intranet, Extranet, and public Internet sites? Do the current products and models provide for a clean upgrade path for disk, CPU, & RAM? Billing adjustments for recovered equipment Do you support server clustering, dynamic failover, processing based on availability and performance Do you support multi-processor scalability<br>Do you possess storage area networks with high-availability and high speed disk storage accessed by multuple servers<br>What operating systems are currently supported? |
| 3) Information Management | |
| Data Management | How often is the data backed up? What will happen in case of a major data corruption/security breach? Can all related applications be restored to the same point in time? How much time will be required to do a complete restore? When was the restore last tested?<br>Do you support replication/syncronization, with multiple copies of the same database |
| Data Access | How is content ported to the web site? Do you have a testing/staging process for web application releases and content releases?<br>What Standard data access methods do you possess, gateways with access to a variety of databases, Sybase, Oracle |
| Data Architecture | Is the direction to move to a centralized data architecture or a distributed data architecture? What is the database data segmentation/partitioning strategy |
| 4) Middleware | |
| Legacy Integration | What are the most critical legacy systems that are accessed through middleware?<br>What is your strategy for using existing legacy middleware products |

TABLE 3-continued

| | |
|---|---|
| Database Integration | with your web applications? Current vs. future? Can you offer Single Applications seemless access to multiple data sources, relational and nonrelational |
| Types of Middleware | What is the middleware "strategy" of the application server/commerce server products that you have deployed in your eCommerce environment? How does each of these fit with your planned integration approach? Which of the following types of middleware are being used (see Middleware section of SAF for additional detail)? How? Remote Procedure Call (RPC) Message Oriented Middleware (MOM) Database Access Middleware (DBAM) Transaction Processing Monitor (TPM) Object Request Broker (ORB) Object Transaction Broker Message Broker |
| Web Integration | Are you using or have you considered "web-enabled middleware" or translation products (e.g., WebMethods, Vitria, TSI Mercator, Active Software, Crossworlds, Extricity)? |
| 5) Web Services | |
| | What application server products are currently in use (e.g. Netscape Application Server, NetDynamics, Oracle, Microsoft IIS/MTS, Bluestone SapphireWeb)? Describe how each is being used. What commerce server products are currently in use (e.g., Open Market, Broadvision, Vignette, ATG, iCat, Interworld, IBM Net.Commerce, Intershop, MS Site Server Commerce Edition, Netscape eCXpert)? Describe how each is being used. Do you have any services in your architecture to provide online payment (i.e. Cybercash, credit card, EDI VANs). Also, if you are providing online ordering, how do have standard services for RMA support, shipping options, taxes, etc.? Are you providing online product configuration capability? What infrastructure products are you using for this (Trilogy, Concentra, Calico, etc.)? Are you providing dynamic web content to your users? How are you accomplishing traffic/usage analysis? Do you currently or do you plan to adjust site content based on these statistics (a.k.a., personalization)? Do you have a process in place to deliver additional bandwidth/processing power as required based on these statistics? Will tracking data be stored in a data warehouse for trending/analysis in the future? How will you do user profiling? (Three major options or combinations thereof: mine user data from existing systems, ask user to supply personal information and preferences, observe user activities and record results) |

TABLE 3-continued

What web browsers are currently being supported?
What is the current email infrastructure configuration (SMTP/MIME, email gateway)?
What will web users expect from the eCommerce system?
Privacy
Availability of the system
Quick response times
Integrity of information
Convenience
Do you perform web event logging to make observation logs and event histories for reports and analysis
Do you support the following services
HTTPP Page Rendering
Secure Browser Connections
File Transfer
Web Application Interface Protocols
Web Application Server
State and Session Management
Streaming
What is the Data Backup Strategy and Process, including timimg, restore, when, extent
What are the policies and procedures involved with startup and shutdown of system components
Are any system of aspects of the system mirrored
What forms of system and data redundancy exists
What is the current Production Scheduling process, include maintenance window, migrations, rollout,
What is the disaster recovery plan, what is included, how often is it tested, recovery time
What options exist for supporting system capacity, include patterns, extension, present, fail over
Do any load balancing tools exist (application, servers, etc)? How are they utilized?
What type of performance monitoring exists, include components, tests, tuning, uptime
What type of Web Site monitoring exists, including users, peak, simultaneous, hits, transactions
What is the software upgrade procedure, can different versions be running concurently, can versions be rolled back, timing
Discuss your approach to upgrades, expansion, customization of application software.
How are applications supported front and back end
What is your log analysis capabilities, identifying trends, data
Do have the ability to track usage and bill for that usage
How is your web application development environment configured? Do you have separate environments for development, testing, staging, and production?
What kind of programming/Web Application editing/compiling/debugging tools are being used?
What programming languages (e.g. C, C++, HTML, Java, Perl) are being used?
What products are being used to develop user interfaces? Are these products proprietary to

TABLE 3-continued specific application/commerce servers or do they conform to open standards?
Do you use a project management/application development methodology? How many trained/experienced project managers do you have on staff?
Describe the process of migrating code through development, testing, staging, and into production. What volume testing tools are being used for web applications? To what extent are applications being volume tested? How do you perform integration testing? What connectivity does your development environment have with legacy systems? How does this compare to the production environment?
What locations or sites have technology resources (personnel, infrastructure, application, data/content) that you are either responsible for or utilize? What resources located at these sites support eC initiatives? What assets are managed and/or tracked at each site (see above)? Who has physical access to infrastructure assets?
What are the physical access mechanisms/processes at each site? Are users and technical support personnel familiar with physical access policies and procedures? How are new technical components added to the architecture (e.g., servers, disk, processors, network bandwidth, etc.)? Does this require application down time?
How do you manage/plan to manage a rapid and increasingly growing equipment inventory at each site, with potential lack of related floor space in a certified data center environment?
What levels of redundancy existst for: power, envirionment
What Disaster recovery and prevention plans are in place
What is your transition process when migrating a new client into your company's data center. Include as a part of your response, the timeframes and critical success factors in the migration.
Describe any data center operations provided by a major provider of IT related professional services (e.g. PWC, EDS, IBM Global Service).

Figure 1C:
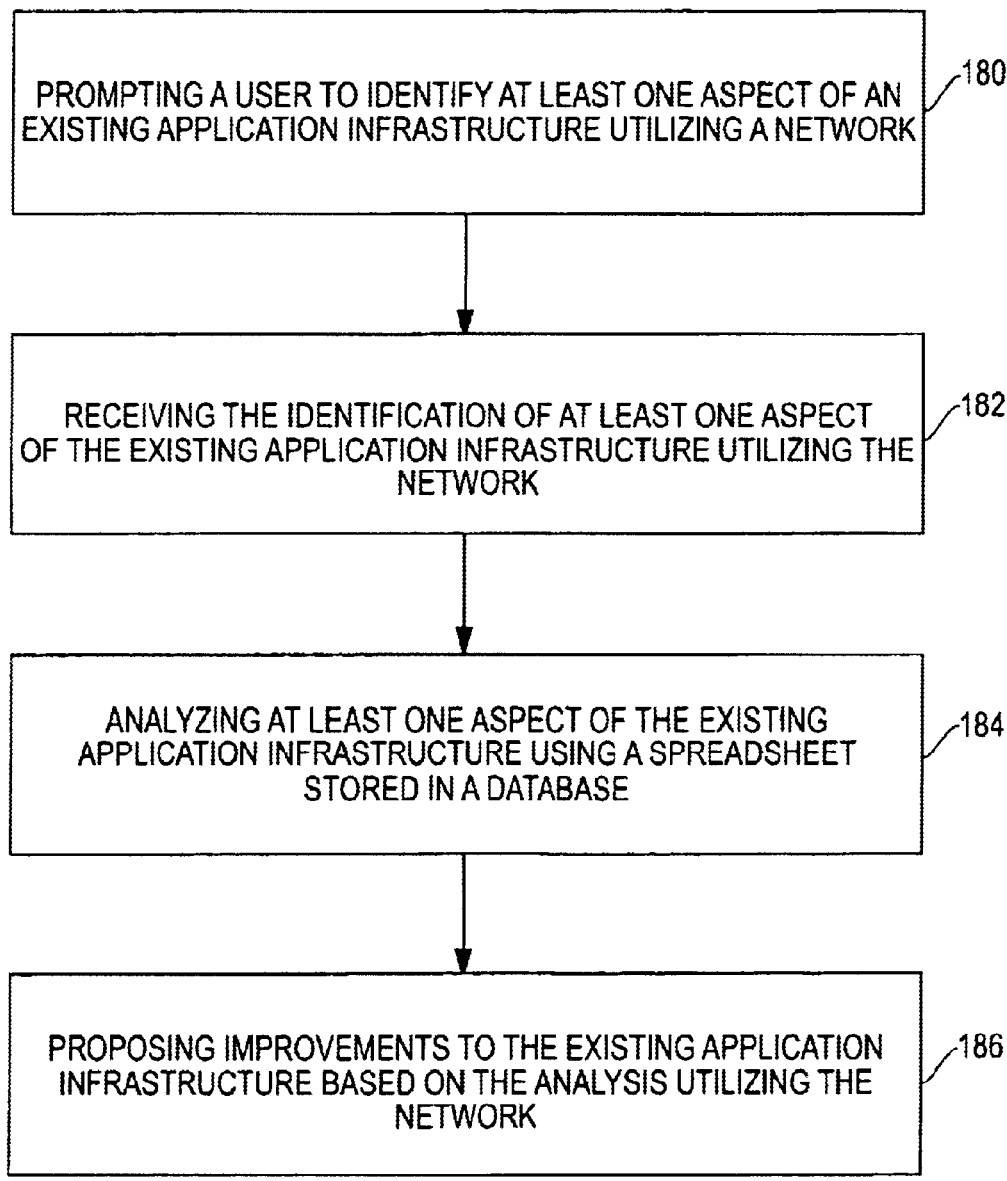
FIG. 1C illustrates a process for improving an existing application infrastructure of an application service provider.
Figure 2:
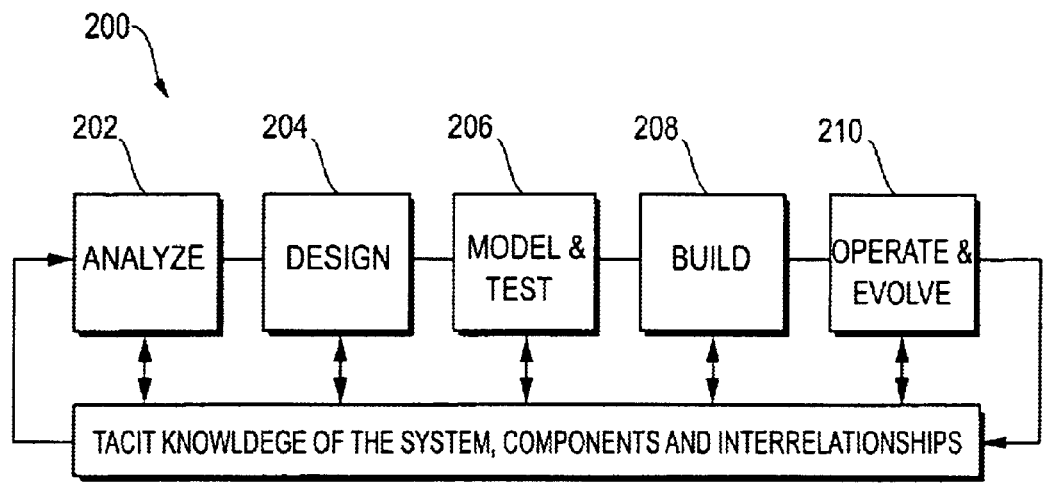
FIG. 2 is a flow diagram illustrating a high level overview of an architecture.

FIG. 1C illustrates one aspect of the present invention that is supported by the foregoing technology. As shown, the present invention includes a process for improving an existing application infrastructure, framework, or computer system of an application service provider. First, in operation 180, a user is prompted to identify at least one aspect or characteristics of an existing application infrastructure, framework, or computer system utilizing a network. Next, in operation 182, the identification of aspect or characteristic is received utilizing the network.

In one embodiment, such aspect of the existing application infrastructure may be subsequently analyzed using a spreadsheet stored in a database. Note operation 184. Further, improvements to the existing application infrastructure are suggested based on the analysis utilizing the network, as indicated in operation 186.

As an option, the characteristics of the framework may be translated into a common structure before being analyzed to identify enhancements. It should be noted that the common structure may be any single type of commonly known framework which the present invention is capable of handling. The enhancements may then be subsequently displayed to the user with appropriate recommendations.

As a further option, the characteristics of the existing computer system may be inputted into a knowledge base prior to being analyzed utilizing pre-defined rules to identify upgrades to the application service provider. Such rules may resemble those set forth in Table 1 hereinabove. The upgrades may be subsequently displayed with instructions for upgrading the application service provider.

In one embodiment of the present invention, the aspect or characteristic of the existing application infrastructure, framework, or computer system includes an ability to deliver applications over the network. As an option, results of the analysis may be assessed after which the assessment may be provided the user with the assessment.

In another embodiment of the present invention, the user may be prompted to identify the aspect or characteristic of the existing application infrastructure, framework or computer system by querying the user. Further, the improvement, enhancement or upgrade. may include adding components that are currently missing.

Additional information will now be set forth on the organization and infrastructure components 150 and 152 shown in FIG. 1A which in turn supports the process of FIG. 1C.

Architecture Basics
Architecture Overview
What is architecture?

Architecture—whether the word is applied to work with a city skyline or an information system—is both about designing something and about making, building, or constructing something. An architect is literally a "master builder"—from the Greek words archi (primary or master) and tekton (builder or carpenter). In good Greek fashion, however, it would be unthinkable for something to be built without a sound theoretical basis. So architecture involves theory, but there is nothing merely theoretical about it. Conversely, architecture is also eminently practical, but there is nothing merely practical about it. Ideas about form and structure lie behind architecture. Ultimately one must let go of a mindset that tries to separate the designing from the making; they exist together as a whole, and to extract one without the other is to kill the whole.

Architecture also is an engineering discipline. It creates and also depends on a structured manner to analyze and design whatever is to be built. Like all living disciplines, architecture continues to grow and evolve. Engineering discoveries move the field forward. Certain design and engineering principles clearly show themselves to be successful in practice, and these then become repeatable components of additional work. The ability to continue to master each component, as well as the interrelations among components, is a distinguishing characteristic of architecture.

So architecture is about designing and building something from a set of basic components, and also about the interrelations among the components. And it is a discipline whereby all these things come together—materials, space, people—to bring something into being that was not there before.

Although building architects have not always been pleased about it, architectural concepts have influenced other kinds of "building" projects for some time. Over the past twenty years, developers of information systems, for example, have used concepts from the field of architecture not only to describe their work but to execute it, as well.

The use of architectural thinking implies that the work is about creating certain kinds of structures that can be engineered or at least influenced, and that the work can be organized and performed in a structured, systematic manner. Moreover, use of architectural concepts implies that there is something repeatable about the work: architects can create a structure, then use components of that structure again in the future when they come across a similar situation.

An architectural paradigm should not be lightly used. It makes demands. To use architectural concepts implies that one is ready to do so—that is, that the field is sufficiently mature in its work to see patterns and to organize future work according to those patterns.

Finally, architecture must be understood as a process 200, not just a thing. This process can be described at a very high level using FIG. 2.

Step 1: Analyze 202. The architect must begin by listening to and researching the needs of the client. What is the function of the building? What is its environment? What are the limitations set by budget and use?

Step 2: Design 204. This is a blueprint stage. The architect creates one or several designs showing the layout of the structure, how different spaces fit together, how everything looks from different views, what materials are to be used, and so forth.

Step 3: Model & Test 206. Not every architectural project has this step, but in many cases, the architect will create a scale model/prototype of the finished product, allowing the client a clearer sense of what the ultimate solution will look like. A model is a kind of test stage, allowing everyone to test the design in a near-real-life setting.

Step 4: Build 208. This is the actual construction of the building, in general accord with the blueprints and prototype.

Step 5: Operate and Evolve 210. The building is to be lived in and used, of course, and so an important step is to ensure that the finished product is tended to and operated effectively. Architects themselves may not be involved in the operation of their building, but they certainly would be involved in future expansions or evolutions of the building. Stewart Brand's recent text, *How Buildings Learn*, argues that effective architecture takes into account the fact that buildings "learn": as people live and work in them over time, those people will seek to alter the building in subtle, or not so subtle, ways.

Also, when architects design a building, they have in their heads a primary conceptual framework for all the components that go into that building: the plumbing, the electric, the sewers, stairs/elevators, framing structure, and so forth. The tacit step for an architect is, "Based on my knowledge of the generic components that go into a building, how will these components fit together in this particular building? Which of these components will require special attention because of the functional demands of the building?"

Oxford English Dictionary Definition:
The conceptual structure and overall logical organization of a computer or computer-based system from the point of view of its use or design; a particular realization of this.

The manner or structure in which hardware or software is constructed defines how a system or program is structured, how various components and parts interact, as well as what protocols and interfaces are used for communication and cooperation between modules and components which make up the system. Seven general characteristics of successful architectures are set forth:

Delimitation of the problem to be addressed;

Decomposition of the solution to components with clearly assigned responsibilities;

Definition of interfaces, formats, and protocols to be used between the components. These should be sufficiently clear and robust in order to permit asynchronous development and ongoing re-implementation of the components;

Adequate documentation to permit compliance by implementers;

An auditing mechanism that exercises the specified interfaces to verify that specified inputs to components yield specified results;

An extendibility mechanism to enable response to changing requirements and technologies;

Policies, practices, and organizational structures that facilitate adoption of the architecture.

Several possible types of architectures contemplated by the present invention are discussed below.

Figure 3:
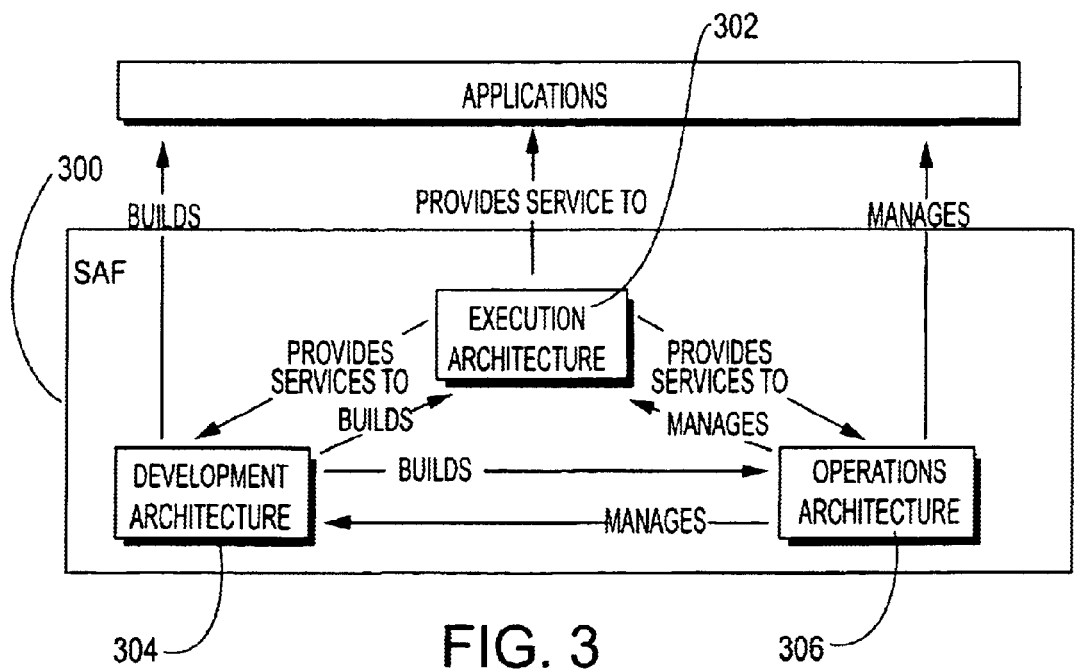
FIG. 3 shows the dependencies of three architecture frameworks.

Development Architecture Framework (DAF) 300 provides access to one's thought leadership and architecture frameworks for Execution, Development and Operations environments 302,304,306. For a more detailed discussion on these architectures, please see Standard Architecture Summaries (below). FIG. 3 shows the dependencies of the three architecture frameworks and is described in more detail in the Delivery Vehicle Overview (below).

The following lists are starting points for considering the range of components and activities that must be covered by each architectural view of the system. They are not a definitions of the environments.

Standard Architecture Summaries

Execution Architecture 302

The execution architecture is a unified collection of run-time technology services, control structures, and supporting infrastructure upon which application software runs.

It includes components such as:
Application messaging
Batch processing architecture
Middleware
Reporting
Error handling
On-line architecture
Security
Code/decode
Data access methods
Integrated help
File transfer capabilities
Directory services
Load balancing
Workflow services
State management
"Special" requirements (e.g., workflow, telephony, groupware)

Development Architecture 304

The development architecture is a unified collection of technology services, tools, techniques, and standards for constructing and maintaining application software.

It includes components such as:
Design/documentation tools
Information repository
Project Management tools
Program Shells
GUI Window painter
Prototyping tools
Programmer APIs
Testing tools
Source code control/build process
Performance test tools
Productivity tools
Design tools
Compiler/debugger
Editor Operations Architecture 306

A unified collection of technology services, tools, standards and controls required to keep a business application production or development environment operating at the designed service level. It differs from an execution architecture in that its primary users are system administrators and production support personnel.

It includes components such as:
Job scheduler
Software distribution
Error monitor
Data backup and restore
Help desk
Security administration
High-Availability
Hardware management
Performance monitors
Startup/shutdown procedures
Report management tool
Disaster Recovery
Network Monitoring Tools
Cross Platform Management Tools Considerations—All Environments Questions to ensure that you are asking the right questions about the technology architecture include:

For all technology components, have the following characteristics been addressed:
Performance according to specifications?
Reliability of operation?
Ease of operation?
Maintenance requirements?
Ability to interface with other components, particularly those from other vendors?
Delivery schedule to provide adequate pre-conversion testing?
Backup procedures?
Vendor reliability and financial stability?
Future proofing against business change?
Have the versions of system software been live at another site for at least six to twelve months?
This time frame varies by product. Have reference sites been verified?
What is a framework?
It is a major challenge to design the complex infrastructure that is needed to satisfy the requirements of today's distributed, mission-critical applications. As such, it is helpful to have an inventory of the components that may be required for the design, build, installation and operation of systems. It is also helpful to have an understanding of how the components fit together conceptually.

A Framework should be thought of as a conceptual structure used to frame the work about to be done. It should be used as a thought trigger or as a completeness check. A framework cannot be built directly but instead should use it as a starting point for understanding and designing.

Frameworks are used to help practitioners understand what components may be required and how the components fit together. Based on the inventory of components and the description of their relationships, practitioners will select the necessary components for their design. An architect extracts components from one or more Frameworks to meet a specific set of user or application requirements. Once an architecture has been implemented it is often referred to as an architecture or an infrastructure.

The scope of what a framework addresses can vary widely. One framework, for instance, may outline the components for a technical infrastructure in its entirety whereas another framework may focus explicitly on the network. A thorough understanding of a framework's scope is crucial to its use during the design phase of a project.

It is also important to understand whether the framework is vendor specific in nature (proprietary) or whether it is available for use by a large number of vendors (open).

The Importance of Architecture

Experience has demonstrated the benefits of an architectural approach to information systems development: better productivity and less reinvention of the wheel. An architecture provides a completeness check, ensuring that all relevant components of a possible solution have been considered. It ensures consistent, reliable, high-quality applications. It gives everyone—the developers and their clients—a common framework and common language with which to talk about the work.

Perhaps most important, it allows professional developers to leverage successful solutions when performing additional work. Architecture involves repeatable concepts, and so it reduces the time and cost by which a solution is delivered.

Some of the specific technical benefits of a good architecture are:

Simplified Application Development
  Good architecture provides common set of application services. It removes application programmers from the complexities of the underlying technology and development tools, allowing less experienced developers to be more productive.

Quality
  Usually more experienced developers implement the often complex technical components in an architecture. These components are then reused, avoiding duplicated complex logic in the applications. Iterations during design, implementation and testing often result in refinement and improvement of the architecture components. All users of these components benefit from such improvements, reducing the risk of failure and ensuring better overall quality in the final application.

Integration
  An architecture often ties together disparate software, platforms and protocols into one comprehensive framework.

Extensibility
  The architecture is established by experienced personnel who can predict with some confidence whether a given architecture will fulfill current and future requirements. Code extensions are easily integrated. A well-balanced architecture consists of the "right" components, where the components are tied together by simple interrelationships, since complex relationships increase the architecture's complexity faster than modularization can reduce it.

Location Transparency

Generally, the application of good architecture divorces application from the details of resource location. This is however not always true or required. For performance reasons designers and developers still often need to be aware of process and data locations.

Horizontal Scaling

Architecture assists in optimal utilization of existing infrastructure resulting in increased application performance and stability Isolation An architecture can be used to isolate the applications from particular products. This ensures that products can more easily be replaced later. This characteristic can be important if there is risk associated with a product's or product vendor's future, or the rate of change in a particular technology area is particularly high. An evident example is provided by looking back at changes in user interface standards over the last 10 years. Applications that did not separate user interface logic from business logic, had to be completely rewritten to take advantage of new user interfaces, such as MS Windows and more recently Web browsers.

Portability

The use of architecture increases portability and reusability within and across different platforms or protocols.

The use of architecture frameworks during analysis and design can reduce the risks of an IT solution. It should improve development productivity through reuse, as well as the IT solution's reliability and maintainability.

One key challenge for today's IT managers is the need for change. Architectures provide a basic framework for major change initiatives. Many businesses are performed by strategic applications that will most likely require frequent and rapid development to handle changes in technology capability and business requirements. A properly defined and intelligently developed architecture delivers an infrastructure on which a business can build and enhance applications that support their current and future business needs. This is how a business can manage change.

A key benefit of an architecture is that it divides and conquers complexity. Simple applications benefit less from architecture than complex ones do; fewer decisions are needed in these cases, and fewer people need to know about them. During maintenance, a poorly architected small application is tolerable because it is still relatively easy to locate a fault and to anticipate the side effects of correcting it. Conversely, complex applications are more difficult to understand and to modify. Complexity is reduced by subdividing the application in layers and components, each layer having a specific functionality. The layers are strongly cohesive and de-coupled: A given layer does not need to know the internals of any other layer.

Study of Large Complex Systems (LCS) reinforces the importance of a stable architectures in large systems. By way of example:

Successful delivery of an LCS solution depends on the early definition and use of common data applications and technology architecture.

There is a high failure rate when the architecture is not defined, stabilized, and delivered early in an LCS effort.

All significant LCS efforts involved the use of common or shared architectures. A successful effort, however, depended on early definition and delivery of a stable common architecture.

Significant changes to the data, application, or technology architectures had severe negative effects on the timeliness of project deliverables, and on the reliability of what was delivered.

Although it is not realistic for every project to have nine months to define required architectures, it does suggest that early focus on definition and design of the architectural components is essential.

The risk of failure is greatly increased if essential architectures are being defined or changed significantly in parallel with application development.

Benefits of an Architecture

The benefits derived from a technology architecture can allow one to be in the forefront of the development of many leading edge business solutions. The investment in a reliable and flexible architecture can result in one or more of the following:

Preservation of investments in applications and technology by isolating each from changes in the other (e.g. upgrades in hardware or third-party software do not impact applications).

Leveraging scarce technical skills (e.g. the need for people with detailed skills in a specific communications protocol or aspects of SQL).

Enhancements in productivity, flexibility and maintainability because common and often complex and error-prone components (e.g. error handling or cross-platform communications) are created within the architecture, and then reused by all applications.

Increases in the predictability of application performance because the run-time behavior of common components is familiar and consistent.

Serves as a construction blueprint and discussion agenda and ensures consistency across systems. This can have a big impact on the operability and maintenance of the delivered applications.

Architects must have deep understanding of a project, business and/or technical environment. Architects are involved across business integration projects, managing their complexities and intricacies.

It is easy to go overboard when designing and implementing a technology architecture. Ideally the architecture should be a thin, well-defined layer that ensures development productivity, maintenance flexibility, performance and stability.

A key issue is maintainability and operability. Keep in mind that others may have to understand the rationale behind the architecture design in order to correctly maintain it.

Architecture logic can quickly become very abstract and hard to maintain by others than those who built it. A carefully designed architectures can quickly be destroyed by maintenance personnel that do not understand how it was designed and developed.

The architecture should be made as light-weight as possible only addressing the requirements that drive it. Avoid "nice to have" flexibility and additional levels of abstractions that are intellectually interesting but not strictly required.

Delivery Vehicle Overview

A Delivery Vehicle is an integrated collection of technology services that supports an application style, implemented on a distinct architecture generation.

Application Style

An application style defines a unique class of processing type, which is used by applications, and thus end-users. Current Delivery Vehicle Reference set of Application Styles include batch, on-line transaction processing, collaboration, data warehouse, knowledge management and integration.

The Application Style is the primary dimension of a Delivery Vehicle, and most people use the terms Application Style and Delivery Vehicle to mean the same thing.

A key goal with a delivery vehicle is that it can be reused across many applications. It is still part of the Technology Architecture, not involving application specific logic. An Application Architecture on the other hand, will be specific for a particular application.

Architecture Generation

An architecture generation is a broad classification scheme for placing technology components within a technology era. Delivery Vehicles are physically implemented on a distinct architecture generation.

Note: Defining a clear line between what falls under the client/server and a Netcentric technology generation is difficult; typically different people tend to have different opinions. Generally, the present invention is an advance in client/server generation. In the context of the Delivery Vehicles, the technology generation discussion is intended to be a logical discussion that aims to highlight the new business capabilities enabled by new technologies. So for example, there could be a PowerBuilder application executing from a Web Browser using a plug-in.

Delivery Vehicle Matrix

Figure 4:
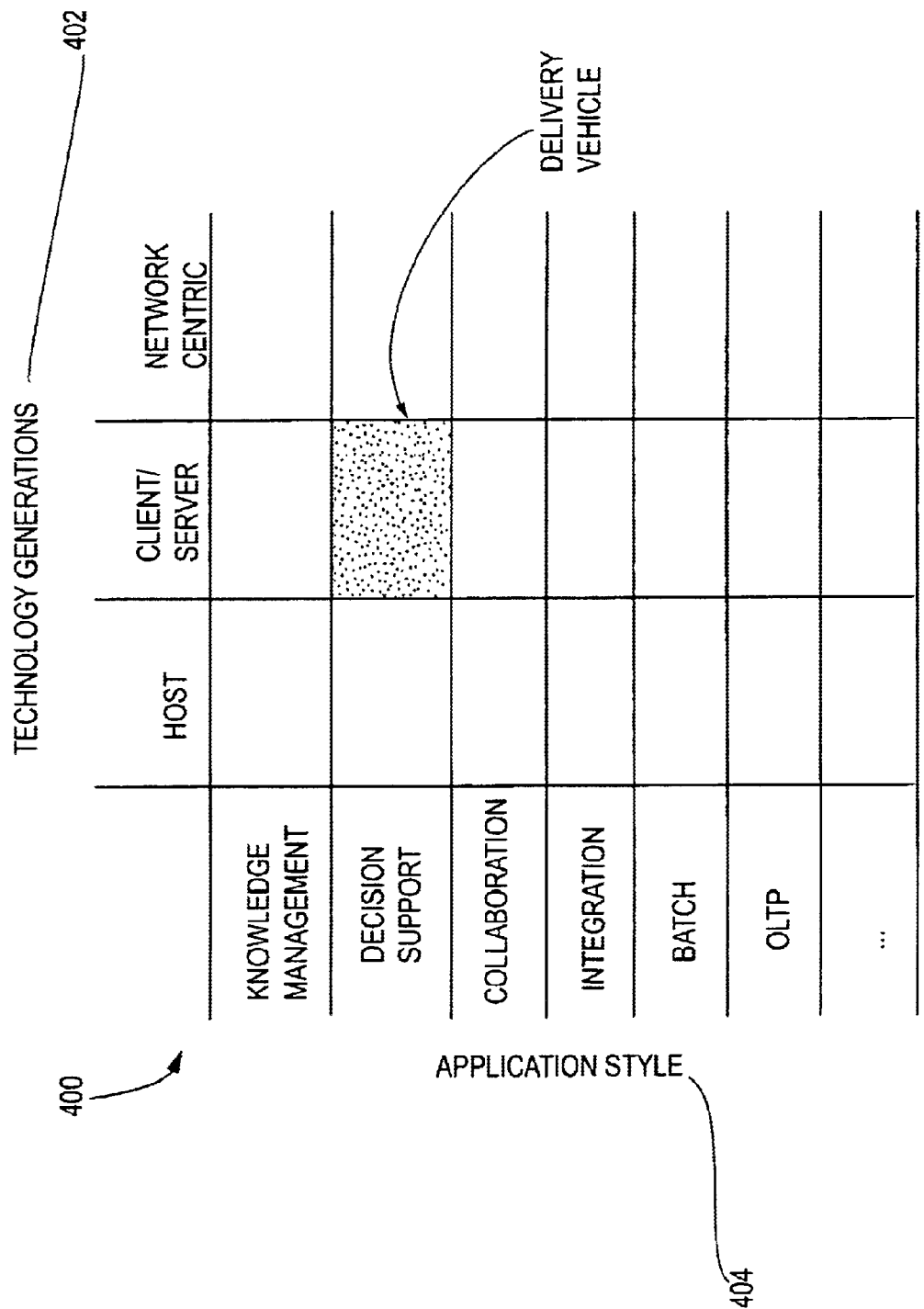
FIG. 4 illustrates a delivery vehicle matrix.

FIG. 4 illustrates a delivery vehicle matrix 400. One way of looking at a Delivery Vehicle is therefore as an intersection of a technology generation 402 and application style 404. This is the presentation method currently adopted for navigation in DAF.

Delivery Vehicle Cube

Figure 5:
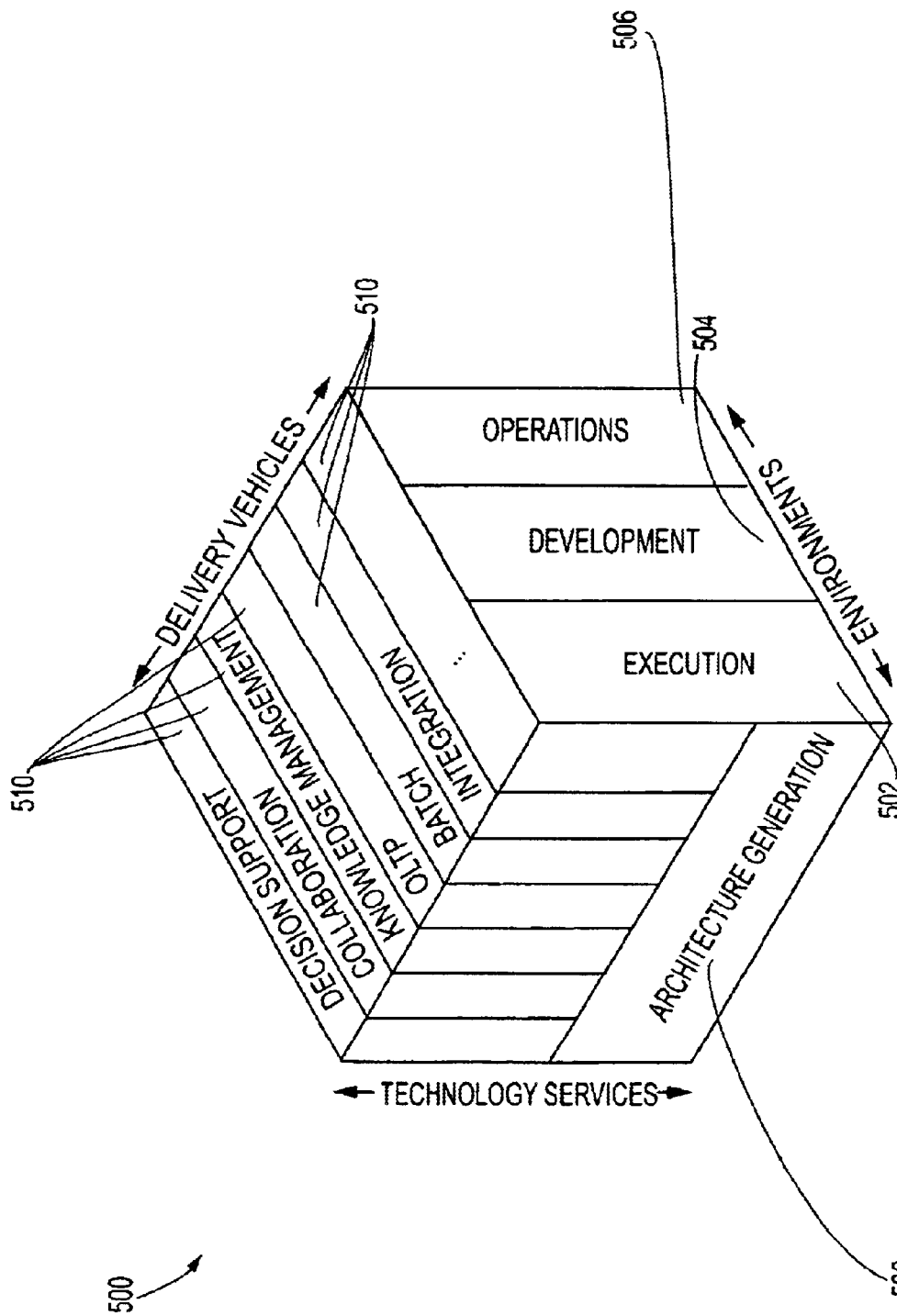
FIG. 5 illustrates a Delivery Vehicle Cube.

The Delivery Vehicle Cube 500, illustrated in FIG. 5, represents the "fill" picture of what a Delivery Vehicle is. In addition to the Application Styles and the Technology generations it introduces a distinction between Execution, Development and Operations Environments 502,504,506.

The cube has the following dimensions, or cube "faces:
1. On the bottom left face of the cube are the core technology components and services 508 that are common across all delivery vehicles.

These core services will be implemented using one, or more likely several, of the Technology Generations; currently Host, Client/Server or Netcentric. Most major enterprises have legacy systems that include both host based and distributed client/server applications. The present invention extends the mix of system technologies.

2. On the top left of the cube are the technology components 510 that are required to support a distinct delivery vehicle.

These components extend the technology architecture with services that are specific for each distinct delivery vehicle. Some of the components may extend some of the core services, while others are completely new types of components.

3. On the right face of the cube are the three environments each delivery vehicle will affect: execution, development and operations 502,504,506.

Both the core services and the delivery vehicle extensions require support in all three environments. The cube illustrates that different delivery vehicles may require different extensions to a core development or operations environment, not just the execution architecture. A mission-critical high-volume transaction delivery vehicle may require special performance tuning tools in the development architecture, as well as real-time monitoring tools in the operations architecture.

Also different technology generations may require special services in all three environments. When working in a multi-platform environment, there may be duplicated services across platforms. This usually complicates development, operations and execution architectures and may require special focus on providing an integration architecture.

Typically the focus on engagements is on the execution environment. The main dependency between these three environments is that the execution architecture to a large degree drives the requirements for the development and operations architectures. For example if a heterogeneous, distributed execution architecture is selected, both the development and operations environments must reflect this.

Delivery Framework

Promotes focus toward business solutions and away from technology issues.

Assists linkage of architecture planning deliverables to delivering.

Create an enterprise-wide view of the business capabilities enabled by technologies.

Provide new architecture frameworks needed today to meet specific needs.

Provide guidance to define what architecture best meets those needs.

Provide development architecture frameworks and best practices to build these architectures.

During a high-level architecture design, one can identify architecture services to be addressed, by providing a logical level discussion to assess types of base services and products needed for a specific situation.

When Delivery Vehicles are implemented, they reduce time to implement business solutions by providing "Starter Kits" architectures.

When Delivery Vehicles are implemented, they leverages technology across the business by:
  reducing operations and maintenance costs by limiting the number of different technologies and skills required to support these technologies.
  reducing technology costs for execution & development.

Note: The Delivery Vehicle Framework presents a way to organize technology architecture information. When presenting this type of content to clients, one will need to tailor the information one presents based on the client's background and the terminology they are familiar with.

Technology Generation Selection

Introduction

Figure 6:
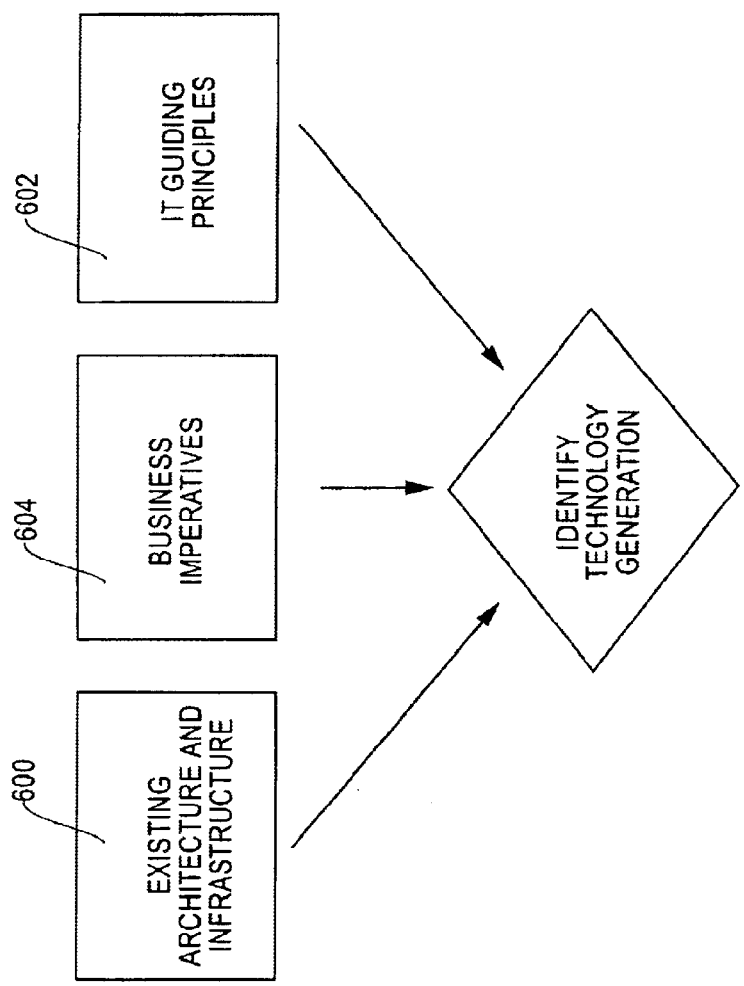
FIG. 6 is a flow diagram depicting considerations to be taken into consideration when identifying the core technologies to be used in an architecture.

This section should assist an architect in understanding the characteristics of, and the implications from selecting, a specific technology generation. The strengths and weaknesses of each technology generation should be understood when planning and designing a system. When identifying the core technologies to be used in an architecture, a view of the client's existing IT architecture 600, guiding principles 602 and business imperatives 604 should be taken into consideration, as depicted in FIG. 6.

It is important to realize that a distinct, static division does not exist between the different technology generations. It is possible that an architecture will consist of components from more than one generation.

The goal should be to understand the pros and cons of the different technology options available for each component and to select the most appropriate one based on the client's requirements.

It is becoming more important to leverage existing systems and integrate them with new applications. A typical scenario can involve mainframe legacy systems acting as servers in a client server architecture, application servers being accessed from both traditional GUI clients built in Powerbuilder and Visual Basic and from Web-based front ends accessing the application servers via a Web-server.

General Considerations

From a technology point of view a new custom-made application should generally use the most recent Architecture Generation to assure that the application will live longer by better being able to adapt to future changes.

This implies that all new applications should ideally be based on a Netcentric Architecture, rather than on a traditional client/server or a host-based architecture.

However choosing a generation is not just a technical decision. Often key technology architecture decisions are made as a result of factors which are completely non-technical in nature, such as financial factors, internal and client politics, and implementation/operational considerations.

When deciding whether to employ a Netcentric solution, i.e. incorporating Web-based user interfaces and Internet application styles, one must keep in mind that these technologies are not a panacea and should be used only when there is solid business reason. They require new investments in skills, tools, development and operations processes. Due to the relative immaturity of tools and products, they also represent additional risks both in technical terms, such as performance and reliability, and in strategic terms, such as vendor and product quality and stability.

Regardless, today each project should always consider the prospect of utilizing Netcentric technologies. It is important to evaluate whether the application can benefit from a Netcentric style implementation immediately or in the future.

Even if a traditional client/server approach (e.g. using Visual Basic or PowerBuilder) is decided upon, the use of Netcentric concepts to produce significant reductions in software packaging and distribution costs should be considered. Such concepts include three- or multi-tier architectures with more business logic residing on server, flexible security architecture, and user interface concepts that can be ported to a Web Browser at a later stage.

A Netcentric architecture will usually still support development of client/server applications. The opposite is not often true since traditional client/server systems usually keep a substantial portion of the business logic on a fat client, while Netcentric architectures still favor keeping most business logic at the server side. Also Netcentric architectures tend to be more loosely coupled than (the still dominant two-tier) client/server systems.

The following sections identify the main characteristics associated with a Netcentric, Client Server or Host based technology generation. This list should in no way be considered complete and exhaustive but is included as a starting point from which the identification process may begin.

Network centric architecture generation

Figure 7:
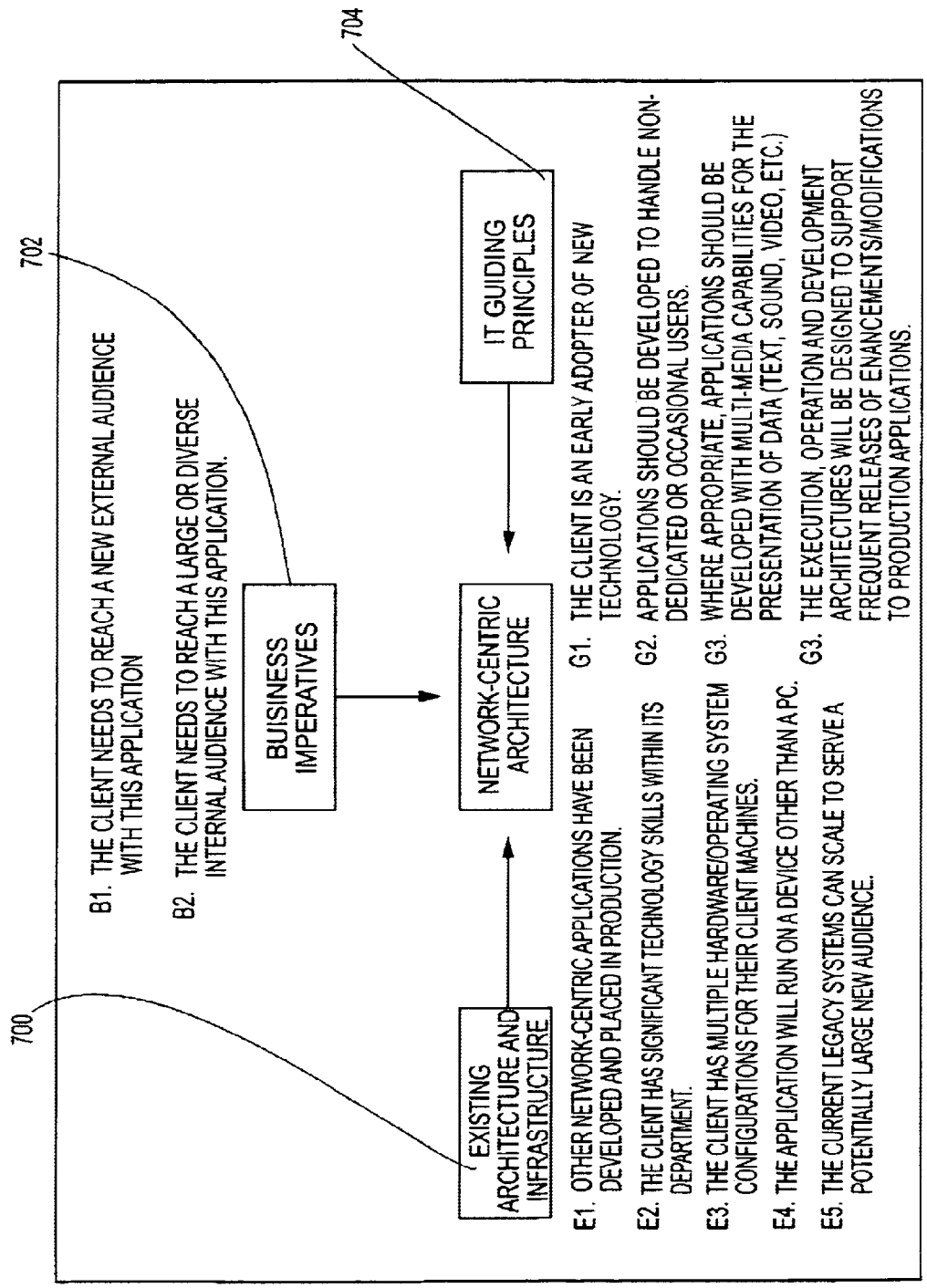
FIG. 7 is a chart that can be utilized to determine whether to use Netcentric technology.

If most of the statements in FIG. 7 are true, one should consider an application based upon the Netcentric technology generation.

The following details the importance of each of the statements in FIG. 7 and should assist in identifying the appropriate answer for specific client engagement.

Existing architecture and infrastructure 700

E1. Other Netcentric applications been developed and placed in production.

The user community is often less resistant to accept the use of new technology to address changing business drivers if they are not completely unfamiliar with the characteristics of the technology. If an application based on a Netcentric architecture has already been successfully piloted or deployed, acceptance of additional systems will be eased.

E2. The client has significant technology skills within its IT department.

This is especially important if the client plans on developing or operating the application themselves. A significant investment in training and changes to internal organizations may be necessary for successful deployment of this type of system. The client must have a culture that supports change. Some organizations are very conservative and strong, making it difficult to deliver a successful project using new technology.

E3. The client has multiple hardware/operating system configurations for their client machines.

In traditional client/server environments, distributing an application internally or externally for an enterprise requires that the application be ported, recompiled and tested for all specific workstation operating systems. Use of a Universal Client or web-browser may eliminate many of these problems by providing a consistent and familiar user interface on many different operating systems and hardware platforms.

E4. The application will run on a device other than a PC.

The momentum of the Internet is putting a lot of pressure on vendors of various devices to be web-enabled. Having the Internet infrastructure in place makes it more feasible for vendors to create new physical devices from which electronic information can be accessed. For example, Web televisions are gaining momentum. Now users can access the Internet from a television set. Network Computers, thin-client devices that download and run applications from a centrally maintained server are generating a lot of interest. Also, users want to have access to the same information from multiple physical devices. For example, a user might want to have access to his/her e-mail from a cellular phone, from a Web TV or their portable PC.

E5. The current legacy systems can scale to serve a potentially large new audience.

Expanding the user community of a legacy host or client/server system by including an audience which is external to the company can result in dramatic increases in system usage. The additional demand and increased usage placed on existing legacy systems is often difficult to estimate or predict. Analysis must be conducted to ensure existing legacy systems and infrastructure can absorb this increase.

Business Imperatives 702

B1. The client needs to reach a new external audience with this application.

This is probably the main reason for selecting a Netcentric architecture. Through appropriate use of a Netcentric architecture it is often possible to gain exposure to new customers and markets. The client can often achieve significant competitive advantage by providing new services and products to its customers. Also this new channel makes it technically possible to develop a new generation of "market-of-one" products, where each customer can repeatedly and easily customize a product according to own preferences.

B2. The client needs to reach a large or diverse internal audience with this application.

Configuration management of traditional client/server applications, which tend to be physically distributed across both the client and server, is a major issue for many corporations. The software distribution of such applications which are packaged as one large or a combination of a few large executables makes minor updates difficult for even a small scale user population. Every time an update is made, a process must be initiated to distribute new code to all client machines. The browser-centric application style offers an alternative to this traditional problem of distributing functionality to both internal and external users.

IT Guiding Principles 704

G1. The client is an early adopter of new technology.

Implementation of a Netcentric architecture can help the client realize a number of business benefits. However, the introduction of new technology into an organization does have inherent risks and can result in a significant amount of change. The client should have a culture which can embrace these necessary changes.

G2. Applications should be developed to handle non-dedicated or occasional users.

Non-expert users need a simple to use and familiar interface in order to be able to use the application. As people grow accustomed to Web-browsers, this will be their preferred user-interface. The consistent interface provided by the Web-browsers will help reduce the learning curve necessary for becoming familiar with new applications.

G3. Where appropriate, applications should be developed with multi-media capabilities for the presentation of data (text, sound, video, etc.).

The ability to digitize, organize, and deliver textual, graphical and other information (e.g., video, audio, etc.) in addition to traditional data to a broader audience, enables new methods for people and enterprises to work together. Netcentric technologies (e.g., HTML documents, plug-ins, Java, etc.) and standardization of media information formats enable support for these types of complex documents and applications. Network bandwidth remains a performance issue. However advances in network technologies and compression techniques continue to make richer media-enabled documents and applications more feasible on the Web.

G4. The Execution, Operation and Development architectures will be designed to support frequent releases of enhancements/modifications to production applications.

It is imperative that companies in the current market place be able to quickly modify their business processes in order to address changes in the industry. A Netcentric architecture simplifies frequent software releases for both internal and external users of the systems.

Client/server Network Generation

Figure 8:
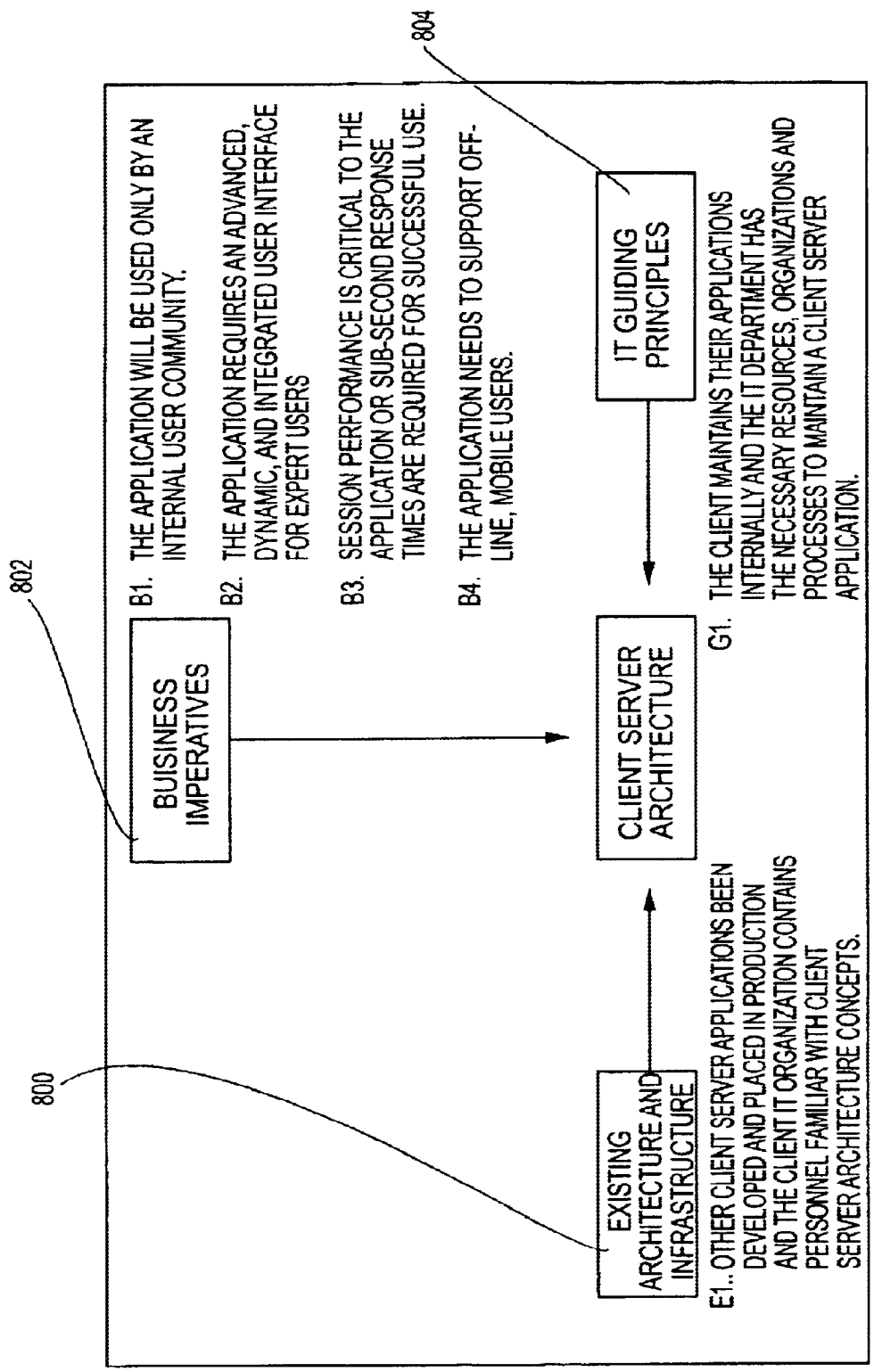
FIG. 8 is a chart that can be utilized to determine whether to use Client Server technology.

If, based upon the client's requirements, most of the statements of FIG. 8 are true, one should consider an application based upon the Client Server technology generation.

The following section details the importance of each of the statements found in FIG. 8 and should assist in identifying the appropriate answer for a specific client engagement.

Existing Architecture and Infrastructure 800

E1. Other Client Server applications been developed and placed in production and the client IT organization contains personnel familiar with client server architecture concepts.

As with any new technology, there is a learning curve related to attaining client server development skills. The development process is often much more efficient when familiar tools and environments are used. The introduction of new technology can also create instability in the operations environment. Client/server systems still represent a new technology to many IT departments.

Business Imperatives 802

B1. The application will be used only by an internal user community.

Software distribution is a concern for traditional client server computing environments due to the fact that executable and data files need to reside on the client hard drive. Distribution to a user community outside of the client's organization is even more difficult to implement and manage and will probably be limited to a few key business partners.

B2. The application requires an advanced, dynamic, and integrated user interface for expert users.

State of the art 4GL and 3GL development languages will support advanced user interfaces which require a significant degree of context management between fields and windows. Web-based user interfaces do not support such interfaces well yet.

B3. Session performance is critical to the application or sub-second response times are required for successful use.

Client server applications can provide response times necessary to support transaction intensive mission critical systems. Application logic and business data can be distributed between the client and server for optimal efficiency. Web-based interfaces still have an inherent overhead due to the connectionless communication and constant downloading of data, formatting information and applet code.

B4. The application needs to support off-line mobile users.

Mobile computing is becoming more prevalent in the work place, therefore, connectivity to a server can not be assumed for all user classes. A client server architecture allows for the distribution of application logic and/or data between the server and client. Replication of data and logic is usually necessary for applications that are run on portable computers.

IT Guiding Principles 804

G1. The client maintains their applications internally and the IT department has the necessary resources, organizations and processes to maintain a Client Server application.

Introduction of a Client Server application to a company's production environment can require a great deal of change to the Execution, Operations and Development architectures required to develop, run and support the production systems. Before a Client Server application is developed, it is important that the client identify how a system of this type will fit within the company's strategic technology plan.

Host Architecture Generation

If the clients business and technical requirements meet the following system characteristics, consideration should be given to an application based upon the Host technology generation.

Figure 9:
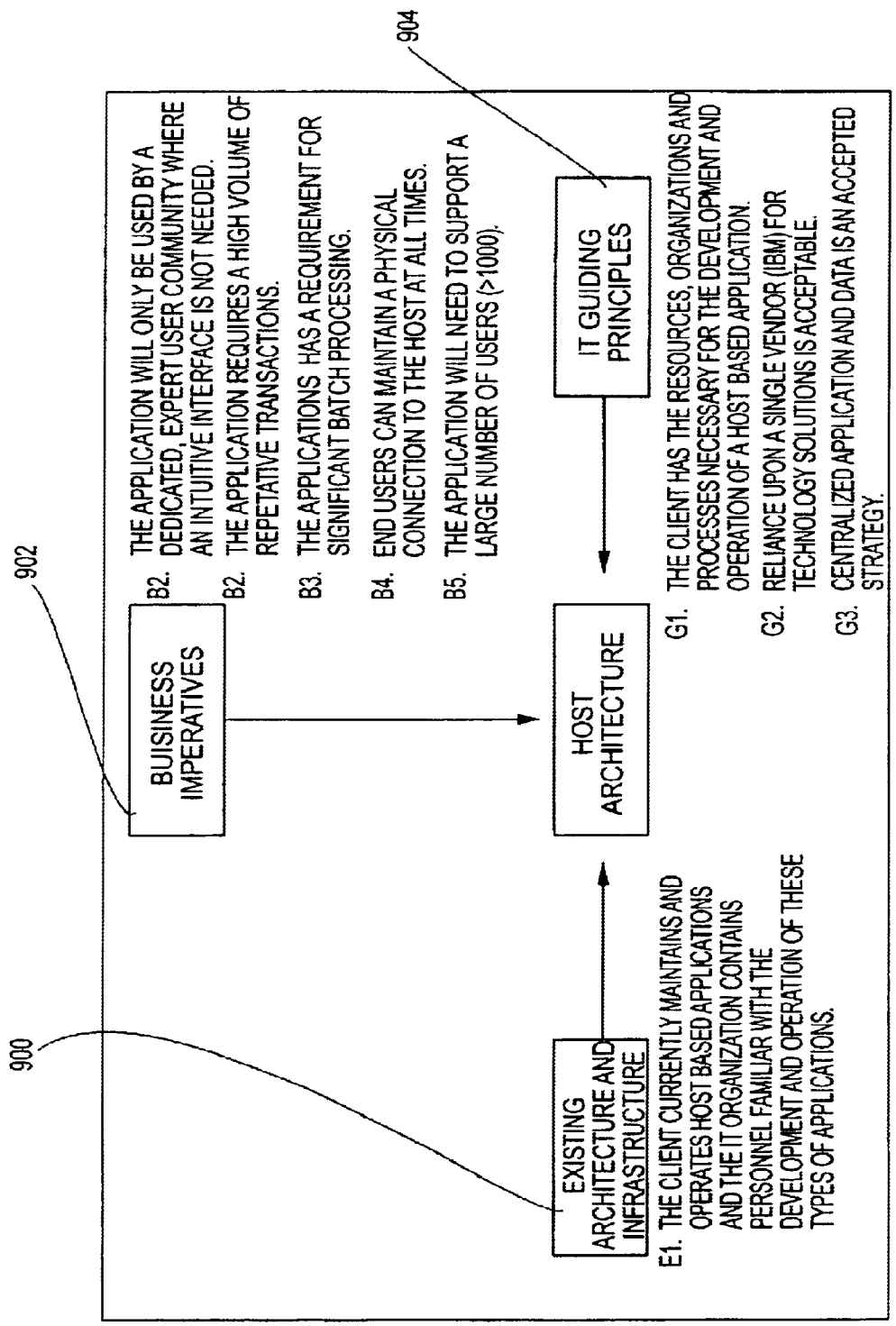
FIG. 9 is a chart that can be utilized to determine whether to use Host technology.

The following section details the importance of each of the statements found in FIG. 9 and should assist in identifying the appropriate answer for a specific client engagement.

Existing Architecture and Infrastructure 900

E1. The client currently maintains and operates host based applications and the IT organization contains personnel familiar with the development and operation of these types of applications.

Few organizations introduce solely host based production systems. Usually the infrastructure for this type of systems already exists. New development is uncommon, typically existing legacy systems need to be extended.

Host systems usually have a mature and stable operations environment. Note that mainframe expertise is currently expensive and in high demand Business Imperatives 902

B1. The application will only be used by a dedicated, expert user community where a GUI is not needed.

A dedicated work force with low turnaround, skilled in the use of character based 3270 applications, eliminates the need for a GUI interface.

B2. The application requires a high volume of repetitive transactions.

The high degree of processing power provided by mainframes allows for the development of applications with very high performance requirements.

B3. The application has a requirement for significant batch processing.

Mainframes are probably still the most powerful platforms for large scale batch processing. Mature tools exist for scheduling, recovery/restart, sorting, merging, and moving large sets of data.

B4. End users can maintain a physical connection to the host at all times.

Physical connection to the host is required for use of the applications. Methods of mobile computing with distribution of data or business logic is not possible.

B5. The application will need to support a large number of users (>1000).

The processing power of today's mainframe lends itself well to the development of large scale, mission critical applications with a large user base.

IP Guiding Principles 904

G1. The Client has the resources, organizations and processes necessary for the development and operation of a Host based application.

Before a Host based application is developed, it is important that the client identify how a system of this type will fit within the company's strategic technology plan.

G2. Reliance upon a single vendor (IBM) for technology solutions is acceptable.

Selection of a host based architecture inherently locks the client into dependence upon one vendor for its technology solutions. While IBM® is a reputable, stable company it is important to ensure that the client's long term business strategy will be supported by IBM's technology vision and direction.

G3. Centralized application and data is an acceptable strategy.

A pure host based architecture eliminates the possibility of distributing data or business logic to the client. This removes some of the application performance benefits which can be seen by a distribution strategy, however, centralized access to the business logic and business data can improve operational stability and lower costs.

A current trend is to transform mainframe based legacy systems into data—and application servers in a multi-tiered client/server or Netcentric architecture.

Overview of the Frameworks

The following should be born in mind when considering what framework to use:

when the various frameworks in DAF can be useful
how the frameworks are related

Frameworks Related to Delivery Vehicles

Most of the frameworks in DAF address various aspects of Delivery Vehicle architectures.

DAF provides access to a thought process regarding leadership and architecture frameworks for Execution, Development and Operations environments. Very briefly, DAF covers:

The Core Execution Architecture frameworks for the different architecture generations (Host, Client/Server and Netcentric). Most users will primarily use the Netcentric framework.

The Execution Architecture Extensions. This is a collection of common delivery vehicles. These frameworks extend the core frameworks with services specific for a particular delivery vehicle.

The Development Architecture Framework should help with the establishment and operation of a high-quality development environment.

The Operations Architecture Framework should help with the establishment and operation of a high-quality operations environment.

eCommerce Application Framework

Framework Overview

The eCommerce market is rapidly emerging. This is evidenced by the growing numbers of new eCommerce transactional sites, the increasing number of 'exchange of value' transactions performed daily, the emergence of new entities and businesses focusing on the electronic marketplace, the convergence and partnering of existing businesses on the electronic marketplace, and the empowerment of the everyday user to satisfy their needs within the evolving electronic marketplace.

One definition of eCommerce is: 'A commercial exchange of value between an enterprise and an external entity—either an upstream supplier, a partner, or a down-stream customer—over a universal, ubiquitous electronic medium.'

Figure 10:
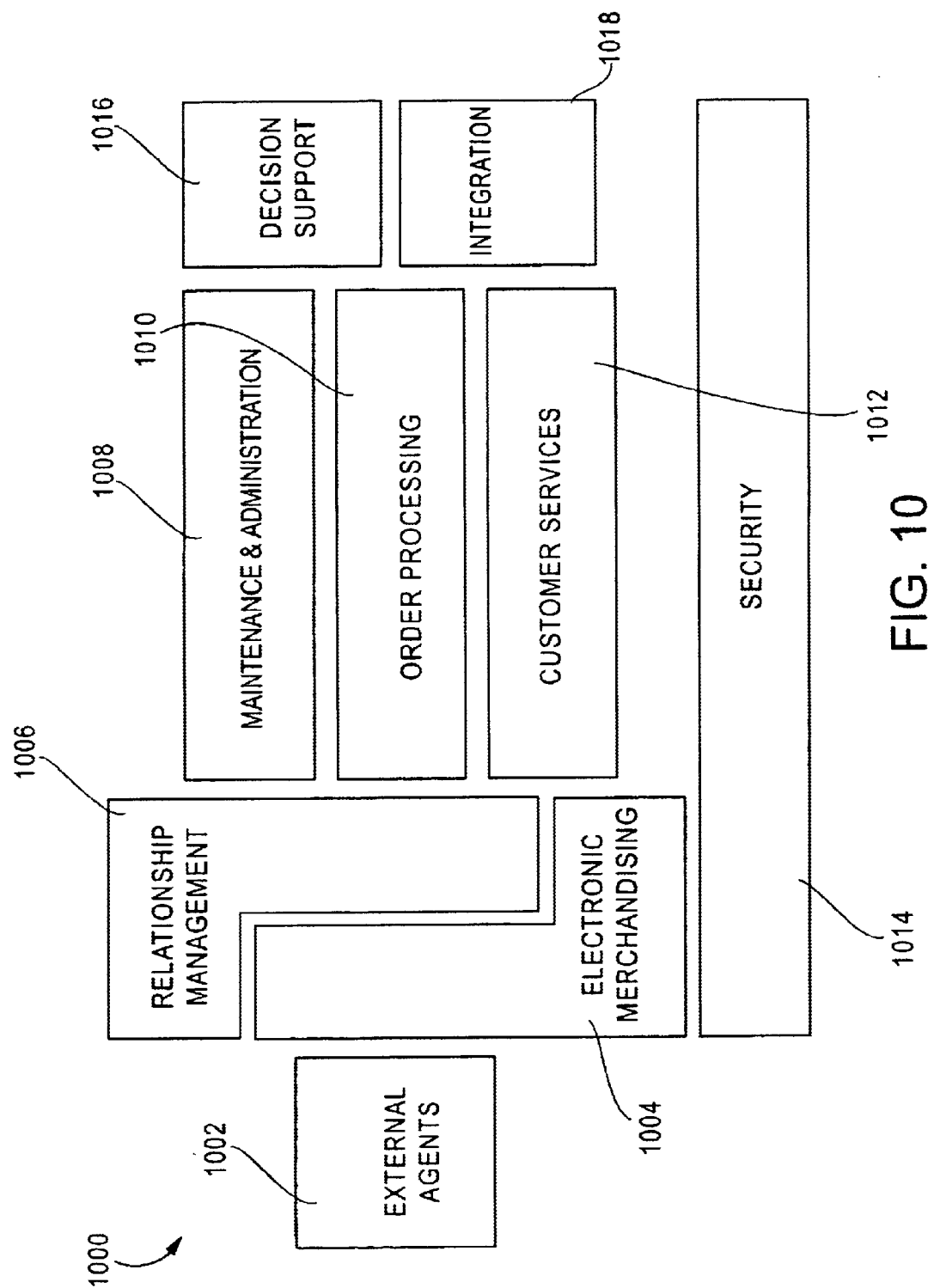
FIG. 10 illustrates an eCommerce Application Framework in a Development Architecture Framework.

The eCommerce Application Framework 1000 in DAF is illustrated in FIG. 10.

The eCommerce Application Framework (eCaf) identifies and describes the application capabilities useful or necessary to implementing eCommerce business solutions. It provides a framework to tie business process, application, and technology aspects of eCommerce together, and a basis for mapping and assessing the capabilities of the eCommerce packaged solutions. This framework should be used as a vehicle for communicating, and designing eCommerce business solutions.

Figure 11:
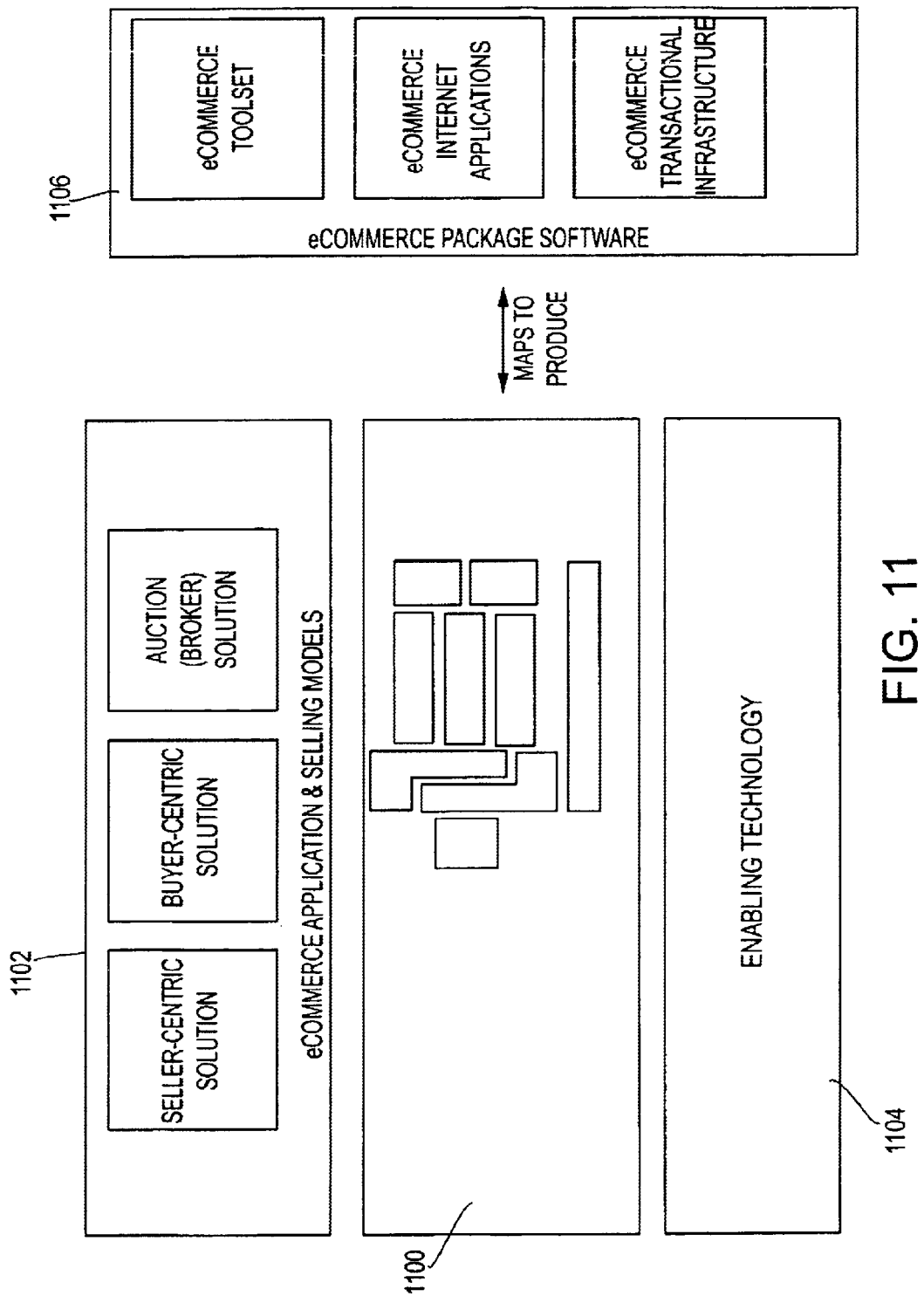
FIG. 11 illustrates the relationship between the eCommerce Application Framework, possible eCommerce Selling Models, enabling technology, and enabling eCommerce Software Packages.

The eCommerce Application Framework has been created to provide an understanding of the types of services and applications needed to implement an eCommerce solution. FIG. 11 illustrates the relationship between the eCommerce Application Framework 1000, the possible eCommerce Selling Models 1102, enabling technology 1104, and enabling eCommerce Software Packages 1106.

The eCaf defines a supporting middle layer between basic Internet or Netcentric enabled products (eCommerce Package Software) and the technical infrastructure (Enabling Technology) needed to develop eCommerce-enabled web sites based on a business-specific selling model (eCommerce Selling Models). Note that eCaf just covers the middle layer.

Each solution or site may have a different selling approach, architecture, utilization of technology, or applications. The eCaf includes the concepts, applications, and services common across the different solutions and has organized them into application capabilities.

Technologically eCommerce business capability requires a logical grouping of services enabling a specific eCommerce functionality. The functionality may be a single technical service within the underlying architecture or an entire application. The capabilities have been derived from surveying multiple eCommerce software packages and eCommerce implementations. As eCommerce evolves, the categories and capabilities are apt to change.

eCommerce Application Framework in DAF

In DAF the capabilities are presented as framework components and subcomponents. The eCommerce capabilities illustrate the highest level categories of eCommerce capabilities: External Agents, Electronic Merchandising, Relationship Management, Maintenance & Administration, Order Processing, Customer Services, Security, Decision Support, Integration.

The capabilities within a given category may cover the full range of potential selling models. Some components may be specific only to a business-to-business buyer-centric implementation. Additional components may emerge as this technology matures.

It should be borne in mind that the eCaf documentation in DAF focuses on the eCaf capabilities. The enabling technology is discussed elsewhere in DAF (see below). The selling models and eCommerce Package Software are discussed only briefly.

eCommerce Enabling Technology

The enabling technology for an eCommerce implementation is the same underlying technology used to enable most Netcentric (and in some cases client server) implementations. In general, most implementations will utilize the Netcentric technologies. An understanding of the Netcentric framework will act as a building block for understanding the technology aspects of an eCommerce solution.

eCommerce Selling Models

A wide variety of eCommerce solutions fall under the broad umbrella term of "eCommerce." The vague definition of eCommerce lends itself to a range of implementations and possibilities. A survey of the sites within the current electronic marketplace reveals the majority of the transactional 'exchange of value' solutions concentrate on selling 'products.' Products can be further divided into physical and electronic.

Physical—Any tangible product the buyer can touch or feel (for example, cars, refrigerators, food, or furniture). This would include retail and durable goods.

Electronic—Any product delivered over an electronic medium. This may include content, information, audio and video, or software (for example, music, or financial products such as insurance or mutual funds).

Across the many 'exchange of value' sites, there are three prevalent selling models: seller-centric, buyer-centric, and auction.

Seller-Centric Selling Model

The seller-centric model is the most common. In its simplest form, a company typically provides information about their products and gives the customer the ability to place orders. More advanced implementations use electronic means for supporting the entire sales and support process including: marketing, product display, merchandising, customer needs assessment, order processing, and many other activities. In most seller-centric solutions, the infrastructure is created and maintained by the merchant. The customer needs nothing more than a browser and/or access to the site.

Buyer-Centric Selling Model

In a buyer-centric solution, the main focus is on customer or buyer trying to fulfill a need for a product. In contrast to Seller-Centric sites which offer products, a buyer-centric site displays items the buyer would like to purchase—in effect trying to lure sellers. Many of the same capabilities as seller-centric sites are needed such as order management and payment capabilities. In this case, the customer joins or creates an infrastructure focused on fulfilling his needs. The infrastructure typically provides an environment between the trading partners which promotes browsing and comparing products, ordering products, fulfillment, payment, and any needed customer support services. A concentration should be placed on the ease of transactions and information flow. For this reason, sellers may customize their product line to the buyers' specific needs.

In most buyer-centric cases, the buyer or often a consortium of buyers, provides the bulk of the eCommerce infrastructure. Additional integration and setup may or may not be required for each of the trading partners who wishes to participate. Implementations requiring sellers to specially configure or integrate their own systems in order to participate are usually only successful where the buyer has substantial market power in the relationship, as in GM® or Ford® buying parts from their suppliers. In such cases, agreements must be made as to what information is to be shared, how to model the information, the standards for messaging and communication, and what technologies will be used. Besides the technical hurdle of integrating multiple systems and the somewhat immature state of the software products to date, convincing trading partners to adopt an Internet commerce approach can also be very difficult. If one is not a particularly big or powerful buyer, it can be difficult to attract potential sellers to come to one's site and spend the time necessary to learn about one's needs. This requires sellers to engage in a very different activity than they have traditionally performed and many are not eager to change their way of doing business for a relatively small customer.

This section of the market has been slower to emerge. As mentioned above, trading partner maintenance is a key issue. Companies at the end of the hub must buy into the hub's practices and vision. Future vision and direction are also important. As changes are implemented, all trading partners have to move together. Getting buy in from all partners has the potential to slow down the adoption of new technologies and process innovations which over time can lead to a lack luster lowest common denominator approach.

Broker Selling Model

Broker or auction type solutions are also emerging, albeit more slowly. Broker implementations don't typically sell their own goods, but rather provide an eCommerce environment to facilitate bringing multiple buyers and sellers together. Both buyers and sellers can utilize the broker's site and infrastructure rather than developing and maintaining their own eCommerce capabilities. In this case, a broker has set up the infrastructure needed to buy and sell goods. The infrastructure will be very similar to a seller-centric solution with the addition of components needed to register goods to be sold (or in a buyer-centric twist—register RFQ's 'request for quote'), price negotiation and bidding, and reconciliation services.

A Trading Network (TN) is an excellent business example of a broker site. Users of the TN can issue Request For Quote's (RFQ'S) on the trading network. The request could be for raw materials, components, or finished items. Suppliers are free to answer an RFQ providing they meet some basic guidelines and requirements. The network provides a true win-win relationship. Since the network can be global, suppliers the purchaser may never have known about are free to participate.

Another example on the consumer side is a sales website. Such a site offers a variety of computer, electronic and fitness goods as well as a general merchandise auction. Customers can browse items in order to view product information and their current bid prices. Interested buyers can place a bid online and see how their bid price compares with others. The auctions are time based and follow a detailed bidding process. As customers are out bid, they are notified via email and have the option to reply with a counter bid.

Packaged eCommerce Software

In relation to packaged eCommerce Software, the eCaf framework provides a basis for understanding and assessing the capabilities of the eCommerce packages.

If a package is used to implement part of the eCommerce solution, an analysis of its underlying technology and business requirements with respect to the Netcentric Framework and the selling models should be conducted. It is important to understand the underlying architecture and any inherent application limitations due to the package's choice of technology used to implement its architecture. In short, it is important to understand what comes 'out of the box.' Be sure to understand each of the main components described by the Netcentric Framework (e.g. Web Browser, Web Server), how the components communicate, and any limitations of the package and architecture of the component.

A multitude of different packages are emerging usually with the name sounding something similar to 'eCommerce Server.' Each package may boast to be different in the problem it is addressing, the architecture, or the underlying processes and technology. In addition, it may claim to provide an 'end-to-end solution' for businesses wishing to transact on the Internet. It is currently very difficult to differentiate between the products. The eCAF provides a basis for understanding and assessing the capabilities of existing eCommerce packages as well as those emerging.

The current eCommerce software packages can be classified in the following categories:

eCommerce Toolset This category would includes any set of tools or components with which an eCommerce application can be built. Examples include the multitude of 'CyberWallets' or electronic cash components.

eCommerce Internet Applications This category includes software geared toward providing an application for specific eCommerce business functions or processes. This product would be a template or is in itself a specific eCommerce-enabled application. An example would include products providing the ability for cataloging or help desk functions. This is often referred to as vertical solutions.

eCommerce Transactional Infrastructure This category includes software packages providing the infrastructure to support multiple transactional eCommerce applications. These types of solutions provide the transactional infrastructure used for multiple sites.

A complex eCommerce solution potentially may utilize software from all three of these categories in addition to any custom code needed to integrate them.

External Agents 1002

Figure 12:
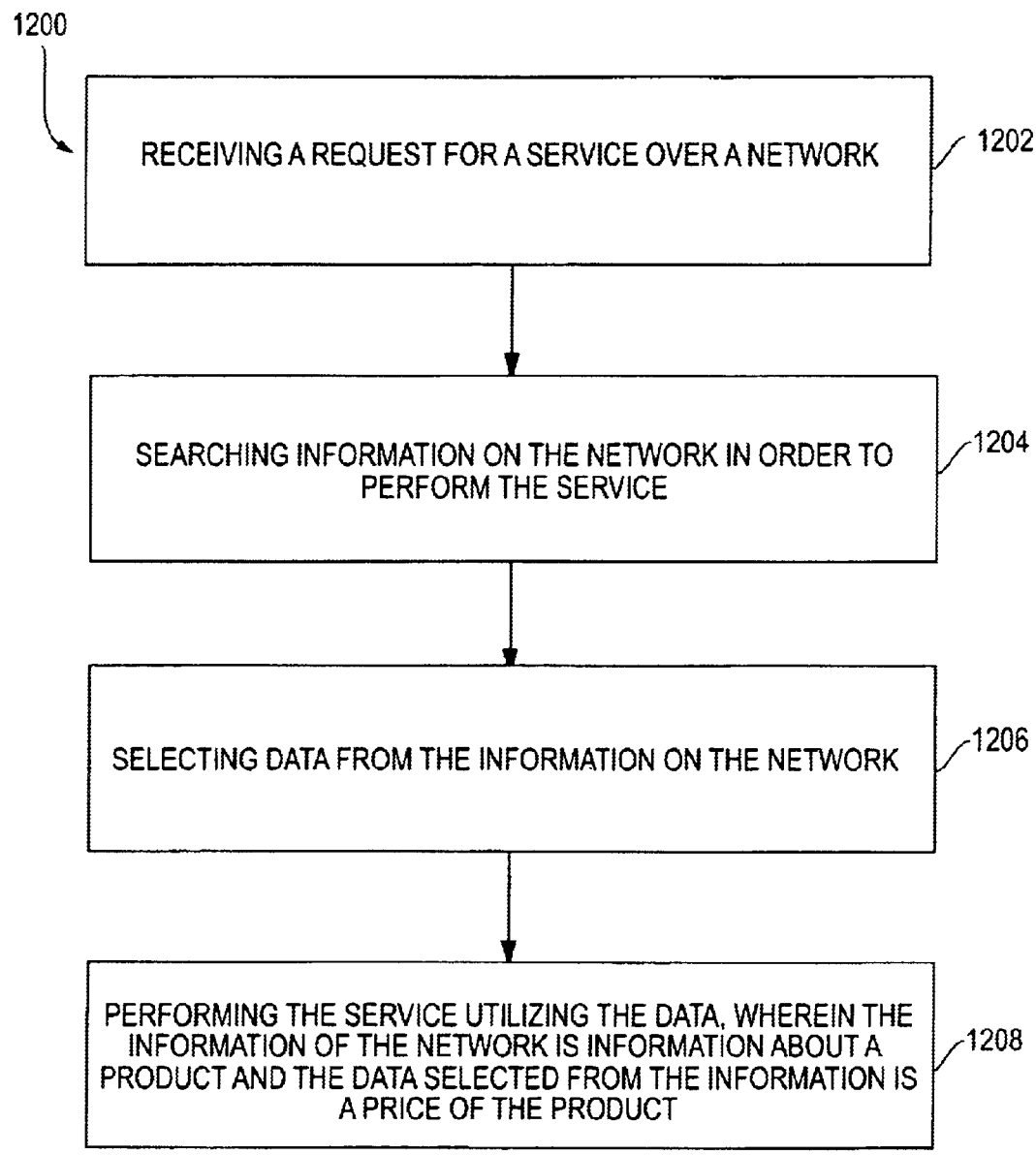
FIG. 12 illustrates a flowchart for a method for automated performance of services on a network in accordance with an embodiment of the present invention.
Figure 13:
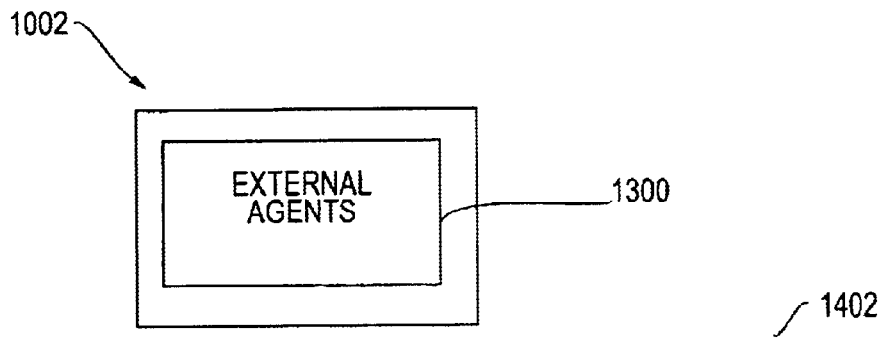
FIG. 13 shows an agent of the eCommerce Application Framework in accordance with one embodiment of the present invention.

FIG. 12 illustrates a flowchart for a method 1200 for automated performance of services on a network. When a request for a service is received over a network in operation 1202, information about a product on the network is searched in operation 1204 in order to perform the service. Data including the price of the product is selected from the information on the network and the service is performed utilizing the data in operations 1206 and 1208.

The service may include making suggestions based on a user's profile and history. The service requested may also include retrieval of data. Thirdly, the service requested may include a product comparison. As an option, the data may further include detailed product attributes. As another option, the services of other agents may also be used to perform the service.

On the Internet, an agent 1300 (also called an intelligent agent) is a program that gathers information or performs some other service without the immediate of a user. See FIGS. 10 and 13. Typically, an agent, using parameters provided by the user, searches all or some part of the Internet, gathers the requested information, and presents it back to the requesting user. Intelligent external agent technology will continue to grow as the eCommerce market develops. As the market saturates with products and information, the need for techniques or agents to filter this information will grow.

Business Drivers

Despite the vast amount of information and tools available on the Internet, it is still passive, requiring the user to browse through tremendous amounts of information in order to obtain what they need. The introduction of advanced intelligent agent technology will potentially transform the Internet into an active network through which users can delegate tasks to computer programs to complete on their behalf. An agent in accordance with an embodiment of the present invention has the ability to transport itself from one place in the network to another, filtering through relevant information in order to perform its task. The software can be designed to make suggestions based on the user's profile and history, and change its behavior as it learns from experience and interactions with other agents.

Intelligent Agents may have the following characteristics:

Mobility—the ability to move around an electronic network;

Autonomy—agents operate without the direct intervention of humans or others, and have some kind of control over their actions and internal state;

Adaptability—an agent may be able to adjust itself to the habits, working methods and preferences of its user.

An exemplary agent is a Bargain Finder. The Bargain Finder agent is an intelligent agent used for comparative shopping for music CDs. A user can request the agent to search based on a specific artist and album. The agent would search its known sources, gather the needed information, and return a comparison list with prices and specifications to the requester. If this concept is applied to the business world, the potential value increases dramatically.

A business may utilize a similar concept but on a much grander scale, allowing the user to take advantage of the lowest available price. Providing there are ample suppliers, a business may create an agent to search for the best prices on construction materials or assembly components. In this case, the agent could provide substantial savings in material costs and personnel.

Inbound vs. Outbound Agents

From a site's perspective, there are inbound and outbound agents. An outbound agent would be an agent a site sends out to gather information. For example, a site selling digital goods may embed a specific digital watermark within its digital goods. It could then create an agent to search the Web for this digital watermark to determine if unauthorized uses exist. Another example would be competitive analysis. A site may create an agent for polling competing sites for current prices and product list in order to price the site's own items competitively.

On the other hand, the site may deal with inbound agents. The emergence of the comprehensive intelligent shopping assistant is a prime example of inbound agents. Agents may enter a site in an attempt to gather information about products, availability and prices. For example, an Internet shopper may use a 'shopping agent' to submit a request for a particular product. The shopping agent determines which sites may contain relevant information, interacts with the site in order to gather any needed information, and prepares a report for the user including detailed product information, product comparisons, and pricing lists. From the site selling goods, the agent may be viewed as in inbound customer.

In essence, an agent is both inbound and outbound, depending on the perspective of the site. If the site is the initiator of the agent, the agent is viewed as outbound. This same agent is viewed as inbound to the sites it interacts with to gather information.

Agent Technology

The technology behind agents is continually evolving. Agents generally require more distributed processing and communication capabilities than are currently offered by networking and computing standards such as TCP/IP and CORBA. These standards cannot accommodate the flexibility and variety of interaction needed among agents, users, and other agents and systems. As it is available now, middleware support to inter-process communication is quite primitive. TCP/IP fulfills the necessary transport function; Remote Procedure Call (RPC) and socket libraries allow for the basic exchange of information and invocation of procedures on top of TCP/IP; and CORBA adds routing, names services and data type translation.

Flexible, tailorable interactions among agents, users, and other agents and systems require a language and protocols for specifying or customizing the behavior of agents, regardless of their mobility. Some statements of the language will allow flexible interactions with a specific component of the agent-interface to services. These service mediators will allow incoming agents to query for the nature of provided services and conditions of their usage. Research is underway on such languages, their semantics, their syntax and how they should be integrated with agent systems.

Peer-to-peer computing allows work stations to concurrently send and host multiple requests for services. Security, reliability and integrity issues need to be explored, especially because the market has high expectations for these areas in client/server environments. Asynchronous distributed computing is best handled with mobile agents. Rather than coding a long-lasting, complex exchange of messages between a client and possibly multiple servers, a mobile agent carries a compact program with all the required procedures for the interaction to be executed remotely.

Electronic Merchandising 1004

Figure 14:
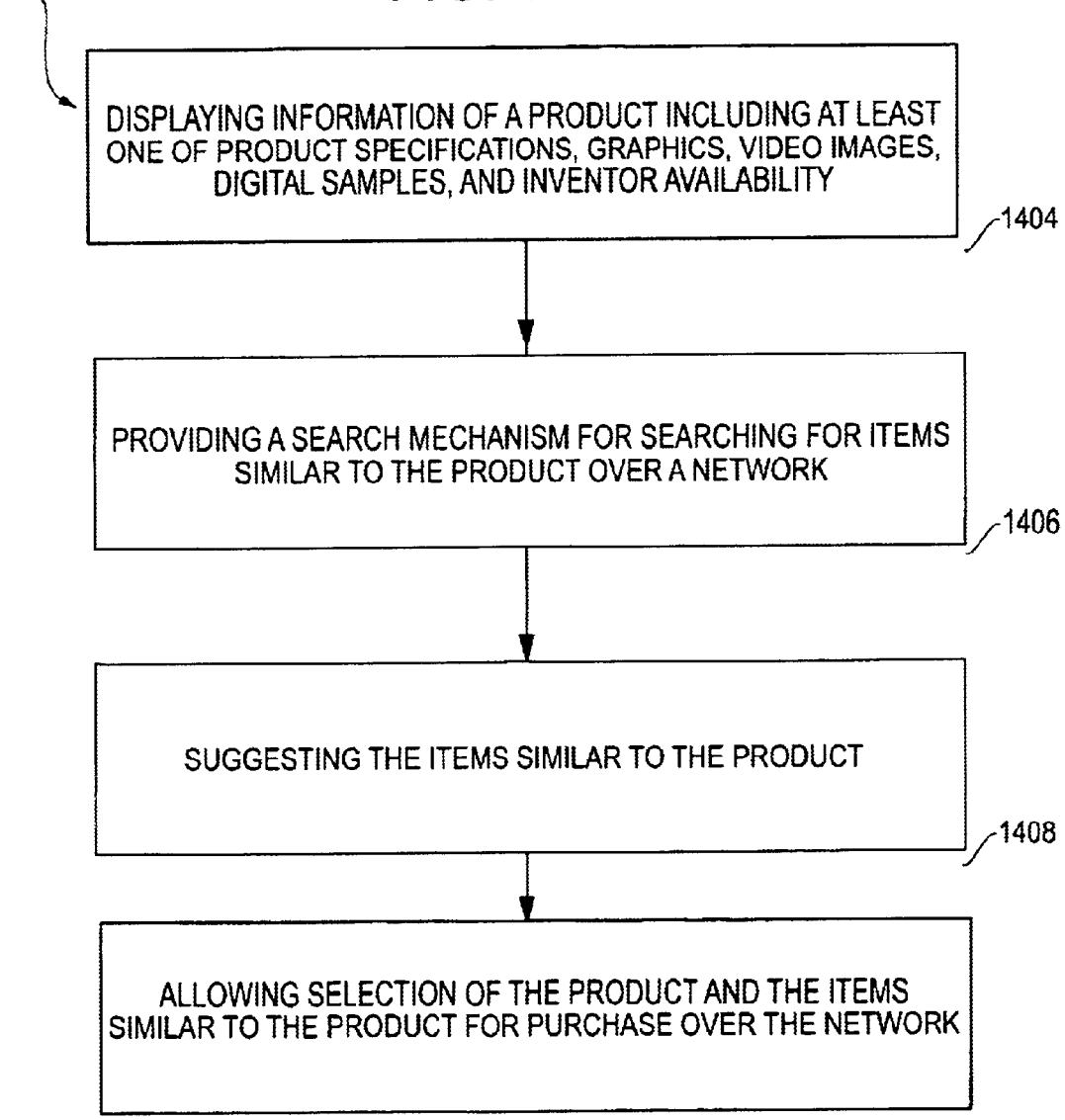
FIG. 14 illustrates a flowchart for a method for suggesting products over a network in accordance with an embodiment of the present invention.

FIG. 14 illustrates a flowchart for a method 1400 for suggesting products over a network. Information of a product is displayed in operation 1402. The product information includes product specifications, graphics, video images, digital samples, and/or inventory availability. In operation 1404, a search mechanism is provided for searching for items similar to the product over a network. Items found during the search similar to the product are suggested in operation 1406. Selection of the product and the items similar to the product is allowed for purchase over the network in operation 1408.

As an option, a downloadable sample of the product may also be provided. As another option, user-created customization of the product may also be allowed. Also, compatibility and/or equivalence of the product may be evaluated with regards to the items similar to the product.

Optionally, a price of the product or the items similar to the product may be generated based on a customer profile, a customer type, and/or a geographic location. Additionally, one or more of a special offering and a sale of the product or the items similar to the product may be generated for a customer based on a customer profile, a customer type, and/or a geographic location.

Figure 15:
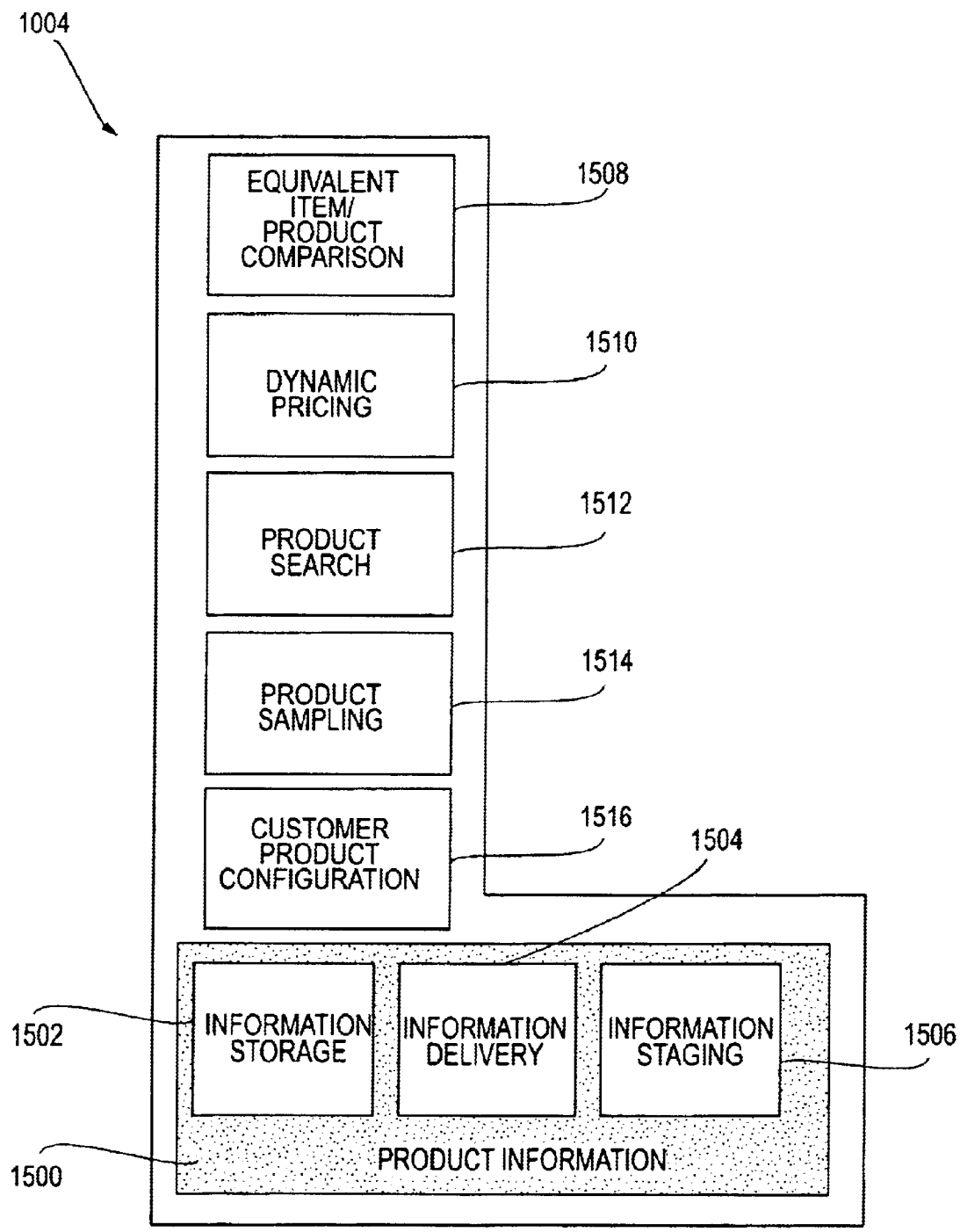
FIG. 15 illustrates the merchandising component of the eCommerce Application Framework of the present invention.

Electronic merchandising introduces a new medium, the Internet, for merchants to sell their products. As shown in FIG. 15, the merchandising component consists of services needed to deliver product, pricing, and inventory information. These services may directly interact with the personalization services in order to deliver the information in a customized format. A traditional example of this would be window-shopping, merchandise browsing, or any informative interaction with the sales clerk.

There are tremendous benefits in adapting electronic (or dynamic) merchandising. Listed below are some of the benefits.

Amount of Information—The Internet is an excellent medium for selling information-intensive products. In addition, the information can be updated as needed. Customers will no longer worry about outdated catalogs and information.

Location—The Internet is geographically independent. A single site can potentially serve the global community.

Availability—In addition, the merchant does not need to worry about store hours. The site can be open for business 24×7.

Catalog Sales Model—The catalog sales model migrates naturally to the Internet. Shoppers can click on a product to see a larger picture and more detailed information. An intelligent agent can suggest similar items or others matching the tastes of the individual. Special offerings and sales can be generated dynamically for each customer at the time of the visit. Catalogs could even be sent as email attachments once per month, with links back to the main site for more information.

Convenience Services—Convenience services, such as grocery shopping and virtual flower shops, are successful on the Internet. Busy consumers can choose a greeting card from a huge online catalog, add a personal message, and have it sent on any day they specify.

Digital Goods—Digital goods, such as news, research, or data and graphic media like art and photography, are ideal for eCommerce. Buyers can take immediate delivery at the time of purchase, providing instant gratification and peace of mind. The seller does not receive payment until the goods are received.

Large Selection of Goods—Online stores can have "virtual inventories" with a depth that would be impossible or prohibitively expensive to duplicate in the physical world.

Product Information (Catalog Services) 1500

There are many different styles and metaphors for electronic merchandising. The basic underlying concept is providing product information to the end user. Product information may include product specifications, graphics or video images, digital samples, or even inventory availability. The approach for displaying this information may differ based on a Business-to-Consumer or Business-to-Business implementation. The most common implementation is to use the catalog approach.

Information Storage (Data Model) 1502

The actual storage of the content is important. Product information stored using static HTML aside, the most common method is in an object or relational database. Many vendors even provide data models for a product database. Vendor-provided data models often will need to be modified in order to meet the specific product detail the system requires. It is important to understand the robustness of the data model as well as the impacts to the system if changes need to be introduced. The system may involve storage and access to many non-discrete data types.

Information Delivery 1504

In more complex merchandising implementations, the content may consist of non-discrete data types such as audio and video. The delivery mechanism will need to be able to deliver the data to different access devices. Systems will encounter the need to manage non-discrete data types such as audio and video data and alternative content in case the access type cannot handle the data types.

Information Staging 1506

The ability to deliver new products and information may be critical to stay ahead or match the competition. The speed at which the information can be updated and migrated to production is critical. Be sure to understand the relationship between the content changes and the correct procedures to migrate the changes to the production system. The ability to maintain and grow the site may prove to be key factors in the site's success.

In most cases, a content staging process should be put in place. In the simplest format, the procedures for modifying and adding content, testing, validation of content and subject matter, authorization and migration to production should be documented.

Equivalent Item Identification and Product Comparison 1508

Buyer-Centric solutions may need to implement a method of evaluating compatibility and equivalence of products. If the buy site deals with multiple trading partners, these functions may provide additional cost savings. Getting buy-in from all the trading partners to agree upon a common model for product information is key for this to be successful.

Dynamic Pricing 1510

Dynamic pricing is the ability to display a different product price based on a customer profile, customer type, or any other logical possibility. Ties to personalization may be needed to handle pricing schemes based on relationships, terms, volumes, or other potential customer profile items. It is a good practice to base the information on database technologies that allow for quick retrieval and calculation (Note: This is definitely a performance-conscious area).

In addition, the pricing mechanism should be tied to any sort of discounting or promotional incentives. For Business-to-Business implementations, contracts and agreements may be in place to drive the specific pricing. Discounts may be applied on an incremental or time-oriented basis. A common concept used are electronic coupons or other types of discounts. The customers may have earned or acquired a coupon or other form of discount earlier in the interaction with the site. The coupon, usually stored on the user's machine, may be applied to the purchased products.

Product Search 1512

In addition to catalog navigation, the ability to search for specific products is crucial. Assuming the site is a seller-centric site, there are numerous methods of implementing a product search Product Sampling 1514

Product Sampling—Products able to be sampled over the Internet will sell well there. Music is one example. A shopper can listen to pieces of songs on a CD before deciding to order it.

Custom Product Configuration 1516

Some applications may require the ability for custom part creation or the combination of individual components the user can combine to fulfill a specific, hard-to-manage, need. Part compatibility and pricing can become very complex and unmanageable.

Implementation Consideration

International Considerations

It is important to keep in mind international considerations when designing the merchandising component. The obvious considerations are related to converting currency and linguistics. In addition to these, there are hidden pitfalls of specific customs that may unknowingly be violated. Sales of some goods may also be banned in certain countries.

Site Design Considerations

As with designing any site, the layout, design, and navigation aspects are extremely important. The home page or entrance to the site is crucial. There is often a debate as to what level of clutter and organization is desirable. It is a good practice to research a potential user's current standard practices for site design and layout.

Relationship Management 1006

Figure 16:
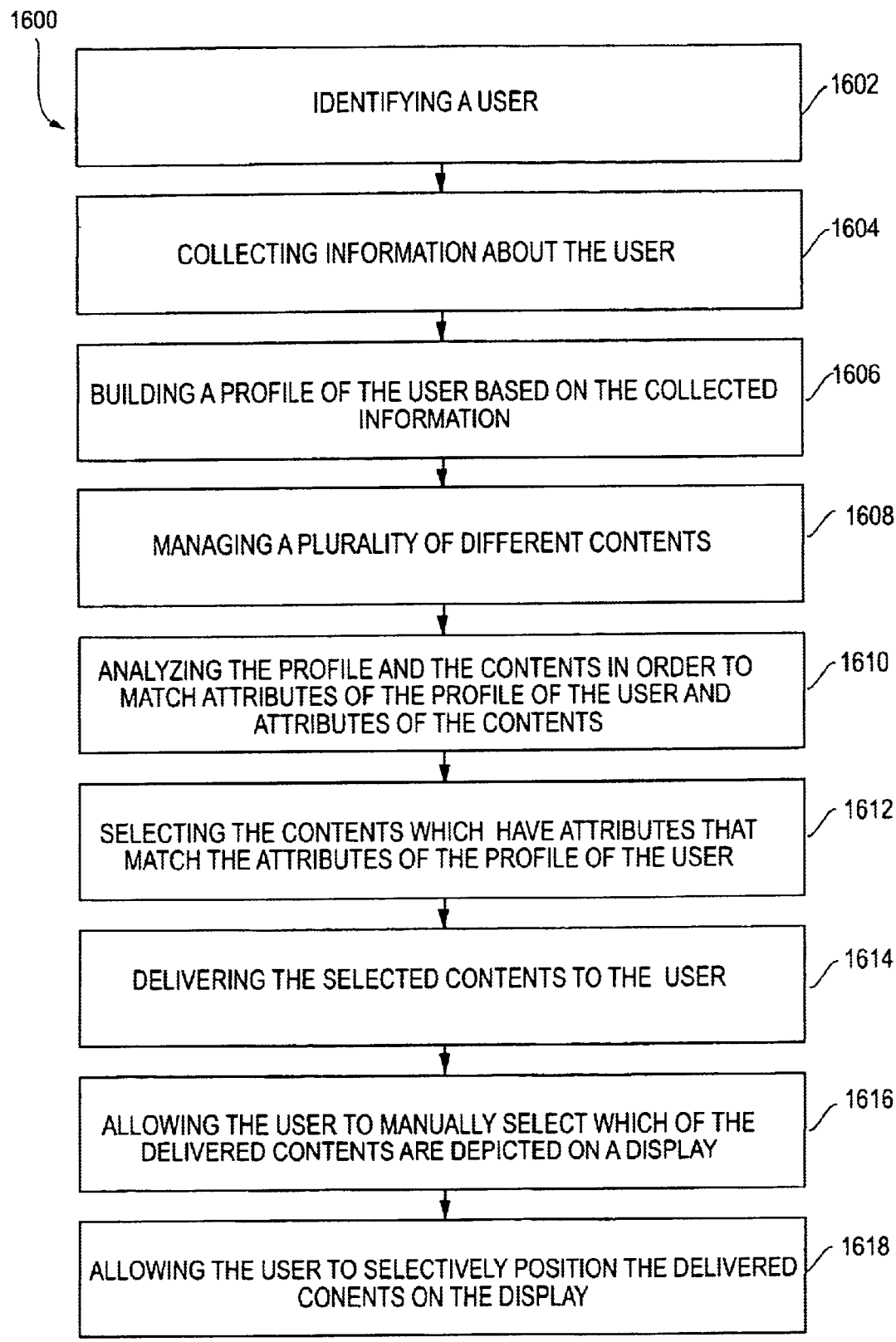
FIG. 16 illustrates a flowchart for a method for interacting with a user over a network for personalizing a website in accordance with an embodiment of the present invention.

FIG. 16 illustrates a flowchart for a method 1600 for interacting with a user over a network for personalizing a website. A user is identified and information about the user is collected in operations 1602 and 1604. A profile of the user is built based on the collected information and a plurality of different contents are managed in operations 1606 and 1608. The profile and the contents are analyzed in order to match attributes of the profile of the user and attributes of the contents in operation 1610. The contents which have attributes that match the attributes of the profile of the user are then selected and delivered to the user in operations 1612 and 1614. The user is allowed to manually select which of the delivered contents are depicted on a display in operation 1616. The user is also allowed in operation 1618 to selectively position the delivered contents on the display.

The analysis of the profile may occur in real time. The user may also be identified by using a cookie, receiving user input, and digital certificates. As an option, a time when the user last viewed the contents may also be identified with portions of the contents that have been modified or added since the time when the user last viewed the contents being indicated. As another option, the user may also be allowed to rate the contents.

Further, a potential customer may be selected from a plurality of users and an act may be performed to entice the potential customer to become a real customer. Also, an activity may further be conducted to retain a current customer and a demand generating application may be provided.

Enterprises must respond by capitalizing on the new potential the interactive mediums offer, to reach, communicate, and interact with customers. The way enterprises interact with their customers continues to change due to demand for increased convenience, better access, higher levels of interactivity, and faster fulfillment As a result, more customer interactions are done through electronic means (e.g., home PCs, automated teller machines, automated voice response, 800-numbers, and the Internet). Regardless of the particular medium the customer chooses, it is clear future communications will be increasingly technology-enabled and information-intensive and will provide the foundation for a continuous, two-way dialogue with customers.

The benefits of new media and communications technologies to interact are numerous, enabling enterprises to provide better customer service, to capture valuable information about customer behavior and product use, and to allow greater differentiation at the point of contact. However, most next-generation customer interfaces continue to be designed to be high tech rather than high touch.

Figure 17:
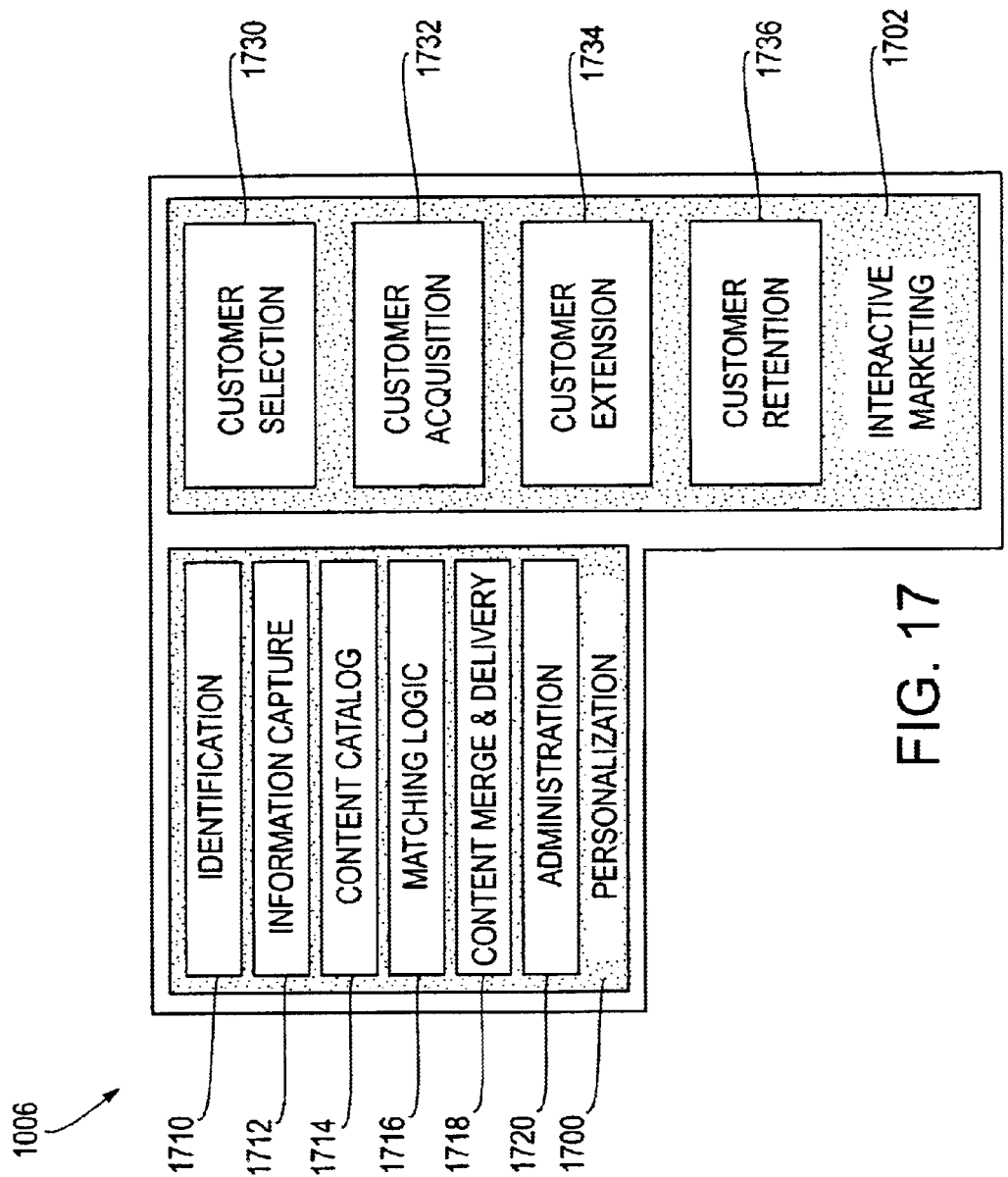
FIG. 17 depicts the Relationship Management section of the eCommerce Application Framework in accordance with one embodiment of the present invention.
Figure 18:
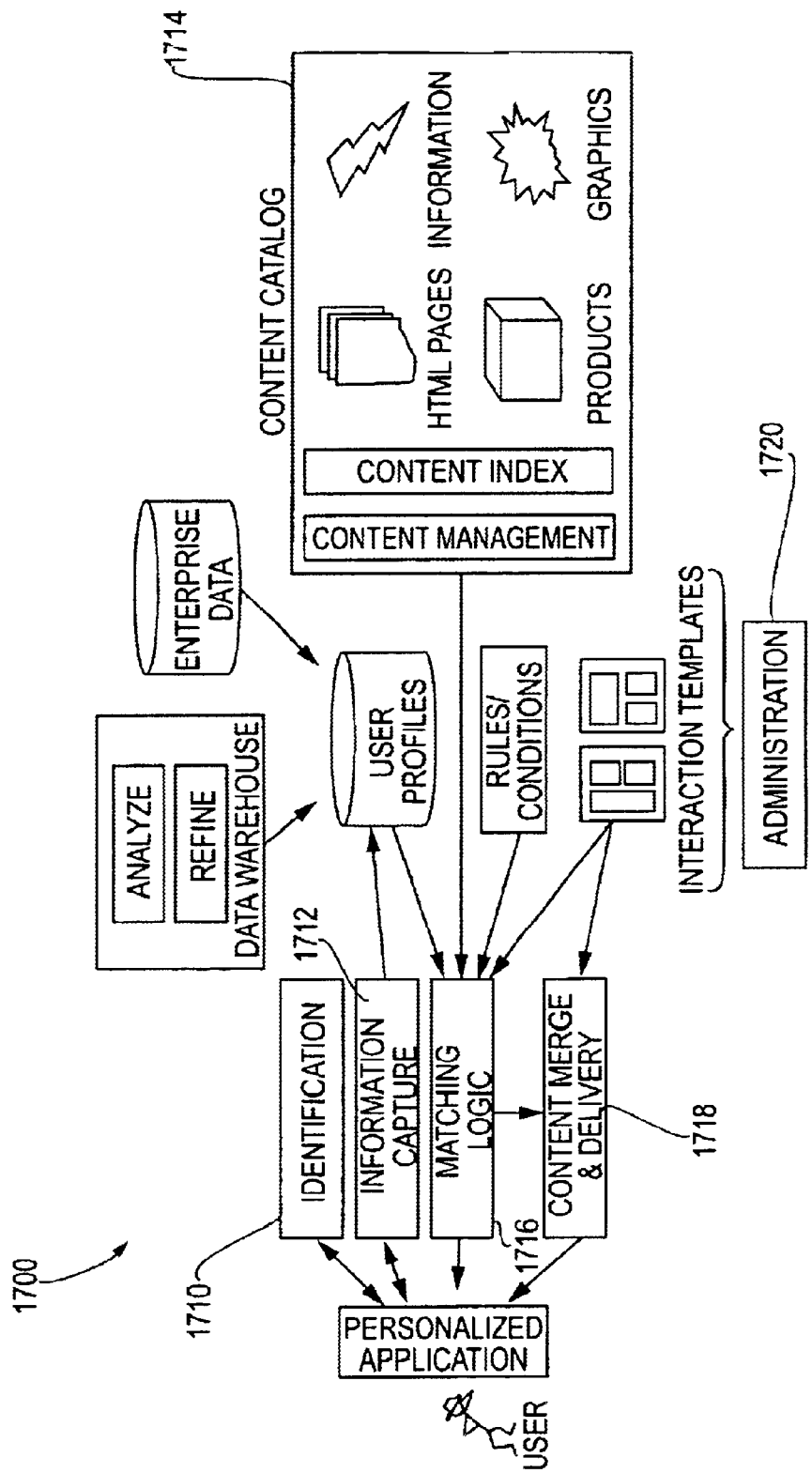
FIG. 18 illustrates a conceptual personalization architecture for implementing the Relationship Management section of the eCommerce Application Framework.

The Relationship Management section of the Ecaf, shown in FIG. 17, covers applications and architecture components geared toward capitalizing on the interaction with the customer. Within relationship management, there are two main driving forces: Interactive Marketing 1702 and Personalization 1700.

Personalization 1700

Personalization is the continuous process of collecting, analyzing, and using information about the end-user in order to improve the productivity and value of their interaction with the organization.

The purpose of personalization is to interact with the customer/user with the hopes of establishing and building a relationship, increasing sales by catering to the individual customer's needs, cross selling or up selling, and enticing users to return to the site. Unlike any other broadcast medium, the Internet was designed for two-way interaction, hence providing the ability to narrow-cast or customize the interaction to the individual user.

Generating demand for a site's products or services and building customer relationships are crucial for any eCommerce implementation. This is even more evident in seller-centric implementations and hype or marketing driven implementations. The customization can occur in many forms. The services and infrastructure can vary drastically depending on the extent of personalization desired. Each eCommerce package may approach personalization using different services and infrastructure.

The enterprise complexity of the personalization approach will drive the architecture components and application required to implement and deliver this strategy. It is critical for the enterprise success to understand how the personalization strategy will affect the entire enterprise.

Conceptual Personalization Architecture

The conceptual personalization architecture is independent of enterprise or industry.

Implementing a personalization strategy into an existing system or a new one requires the design and development of personalization architecture components. These components are essential to the success of the personalization strategy. They include an Identification component 1710 to identify the user, Information Capture component 1712 to capture information about the user, Content Catalog component 1714 to manage the different contents in the system, Matching component 1716 to match the user's profile attributes with the correct content, Merge & Deliver component 1718 to deliver the content to the user and an Optimization & Administration component 1720 to continuously optimize the personalization interaction and administrate the rules and content as they change or added. See FIG. 17. By way of example, the conceptual personalization architecture components illustrated in FIG. 18 will be discussed in detail in the subcomponents of this component.

Personalization Techniques

There is currently a lot of hype and press attention centered on the idea of "personalization". Given the wide variety of products and ideas being labeled "personalization", it is apparent that a variety of different personalization delivery techniques and technologies are evolving. As with most emerging concepts, the initial techniques cover a wide range of complexity in both infrastructure and approach. Most personalized sites use a combination of techniques. Samplings of personalization techniques are presented below:

User Acknowledgement

This is acknowledging the user or greeting them with a personalized statement The statement may be a simple 'Welcome back <user name>!' message or it may be more complex, drawing on information from the last interaction.

Personalized Interface

In this approach, the application or web site's user interface is customized for the individual. The actual page layout or page design is altered based on the individual interacting with the system. This category can be sub-divided based on who (the site or the user) controls how the interface is altered.

Site Morphing. Site morphing is when the site alters the user's interface. The site may alter the page's layout, the subjects or types of content and information, or the site capabilities based on what is known about the user. A variety of different user attributes or algorithms can be used to customize the user's interface.

1. Customer Strategy. The site's interface may alter based on a customer status or customer strategy. A customer strategy might attempt to interact with new site visitors with an interface geared toward selection (what is the potential value of this customer?) and acquisition (how do we acquire this customer?) while gearing the interface and interaction for an existing customer to retention and extension (selling additional products, allowing the customer to be self serving, or making it easier to do business with the company).

2. Customer Status. The site's interface can be altered based on the status of the customer. For example, a United Airline® site could be customized based on the user's Mileage Plus® status. Non-members would have a very generic site where they can perform the basic site functions. Mileage Plus members would have additional capabilities (such as flight history, mileage status or customer service chat) as well as different site layouts and attributes based on their exact status.

3. Intent Determination. This technique attempts to pre-determine the purpose of the user's visit to the site and customize the navigation and user interface to help the user quickly perform these actions. Based on the user's information and past actions, it can often be determined the most likely reason the user is logging on and thus make those functions or information immediately available—front and center. Assume the United Airline site used intent determination to create a personalized interface. Over time, the site learns that the user regularly check their mileage status, the in-flight movie listings, food service listing, and airport maps. The site also notices that the last two interactions, the user has called to upgrade to First Class. The next time the user logs in, realizing the customer has an upcoming flight reservation to Chicago, an O'Hare terminal map, the in-flight movie, and dinner menu is automatically displayed as well as a prompt asking the user if they would like to upgrade to first class. The power of this concept becomes increasingly important as more functional web-sites are deployed that allow the user to do possibly hundreds of different things. Users are already complaining about the ability to navigate even relatively simple sites. Personalized intent determination seeks to "de-clutter" the company's site and demonstrate to the user that the company "knows" them and what is important to them. Good intent determination is not easy to implement, but holds real power for making customer-based applications easier, and more likely to be used.

User Configured Interface. The user controls the site's configuration. In this case, the site provides a facility that allows the user to configure the page layout, and the subjects, links or content that the page will contain. Once configured, the user has a customized page configured to their specification. When the user enters the site, the user-configured interface is loaded. Within the user-configured site, the user has the ability to configure their own site by selecting the layout, topics and content details that will be displayed by selecting items from defined menu of configuration options.

Content Filtering

This technique filters the information or content displayed to the user based on what is entered by, or known about the user. Many personalized sites use some form of content filtering. A variety of different filtering techniques have emerged. Some are adaptations of traditional client/server techniques adapted to the Web. In the first grouping of techniques presented here, the user controls how the information is filtered.

User-controlled, explicit content filtering. Techniques in this category enable the user to filter data or content.

Personalized Information. Allows the user to see information specific to them. The content in this case may be information about the user's profile, about products they have or a past order history. This technique allows the user to filter the data by building 'where clause' statement or execute 'canned' queries. It is often used when the user is familiar with the data and wishes to organize or filter it in multiple ways.

User-controlled, implicit content filtering.

Collaborative filtering. Collaborative filtering determines clusters of users with similar interests, either by asking users explicitly or by observing user selections and actions to determine those interests implicitly. This is an effective technique for creating recommendations for products.

Site controlled content filtering.

Contextual Inferences. Contextual inference uses human-determined rules to select content based on behavior, interest or other profile attributes.

What's New. Based on knowing when the user last visited, the site determines what content has changed since the last time the user has interacted with the site and display a list of changes. A personalized "what's new" is far more effective than a generic "what's new" that is shown to all users—obviously what's new is different for the user who was here yesterday versus the one who hasn't used the site in six months. The content that is marked as new may be further constrained to only contain the areas that the user has interacted with in the past.

Configure Process or Fastpath

This technique simplifies a complex process or repetitive task by storing the user's preferences and inputs required to complete the process. In most cases a series of pre-defined questions and preferences have to be set up in order to use this functionality. 1-Click purchasing can be offered which allows a user to select an item with a single click and purchase the item—by-passing the order selection, order form, shipping and payment pages. A Fastpath approach can be used where the user has performed the function before and allowed the application or web site to retain more static information like shipping address.

Pre-filled Forms and Information

In situations where user data is required to complete an action, the site can use information that it currently has about the user to pre-fill the form. For example, the site may fill out the order form with the user's last address and order information or the site may fill out the list of items ordered last. This approach differs from Fastpathing in that the user still sees the pre-filled form and has the opportunity to change the data.

Personal Assistant

The site provides an interactive assistant to deliver 'personalized help and assistance'. Its purpose is to help the user with difficult actions and site functionality. Based on observing and recording how often (if ever) the user has used a give function within the site, tips, suggestions, and other forms of assistance can be fine tuned to the user's level of experience.

Non-interactive Delivery Techniques

Most of the personalization techniques described above are interactive personalization techniques. Content and information is personalized for the user in real time—while the user interacts with the application or site. Some forms of personalization can also be used in a non-interactive, or "push" mode "Push" (or "server-push") is where the delivery of information to a user on the Web is triggered and initiated by the information server rather than by the user.

In fact, the information pushed from a server to a user actually comes as the result of a subscription-like standing request created by the user and either stored on the server or on their local machine. This program captures and stores the user's profile locally and then periodically initiates requests for information on the user's behalf from the server.

Push technologies enable an enterprise to reach and provide value to their customer outside of the traditional interactions. Of the personalization techniques described above, content filtering doesn't require that it be delivered though an interactive session. Keep in mind that push does not necessarily mean personalized. A site may simple push the same information to all users or subscribers. Personalized push refers to information that is filtered based on a specific user's request or profile or where the delivery is scheduled for a specific user. There are a variety of different legitimate business reasons to push a users information. The following are some examples of personalized push:

Information Delivery. A user subscribes to receive information on a scheduled basis. The information that is pushed is either determined through user selection—the user selects the subjects and type of information that they wish to receive, or the site determines what information the user may be interested in receiving based on their profile information. For example, at an investment web site, users are allowed to subscribe to investment information feeds. The user decided to receive a daily feed of the stock quotes for the commodities they hold. The site pushes this information and additionally pushes news articles and stock recommendations based on the user's portfolio holdings.

Event Reminders. The user subscribes to receive event reminders from the web site. An event reminder might remind the user of specific dates of interest such as a birthday or anniversary, a bill reminder or that an action is required in the near future.

Information Update. A site may also push updates to a user. For example, Microsoft's Expedia allows users to request fare updates. A user can choose a specific destination of interest. If the fare to this location changes, the user is notified of the fare update.

Don't be a junk e-mailer. The push medium is powerful and potentially less costly than conventional mail. This doesn't justify its use as junk mail. It does not work because everyone receives junk mail, and junk mail that ends up in the trash is failed target marketing efforts. Personalize it. Deliver valuable information that the customer is interested in. Allow them to select the topics, how to filter the content and the frequency.

Personalization Process

Personalization is actually a catchall for several underlying technology capabilities needed to create a personalized interaction between an organization and a user. By breaking the underlying technology and logic into simpler components, one can build an understanding of the processes and technology needed to deliver personalized applications.

Personalization is the continuous process of collecting, analyzing, and using end-user information in order to improve the productivity and value of their interaction with the organization. Implicit in this definition is the need to do a number of basic things. Simply put, there needs to be some method for identifying the user, collecting (or detecting) and storing user information, analyzing it, assessing what content or functionality is appropriate, and present it to the user.

Figure 19:
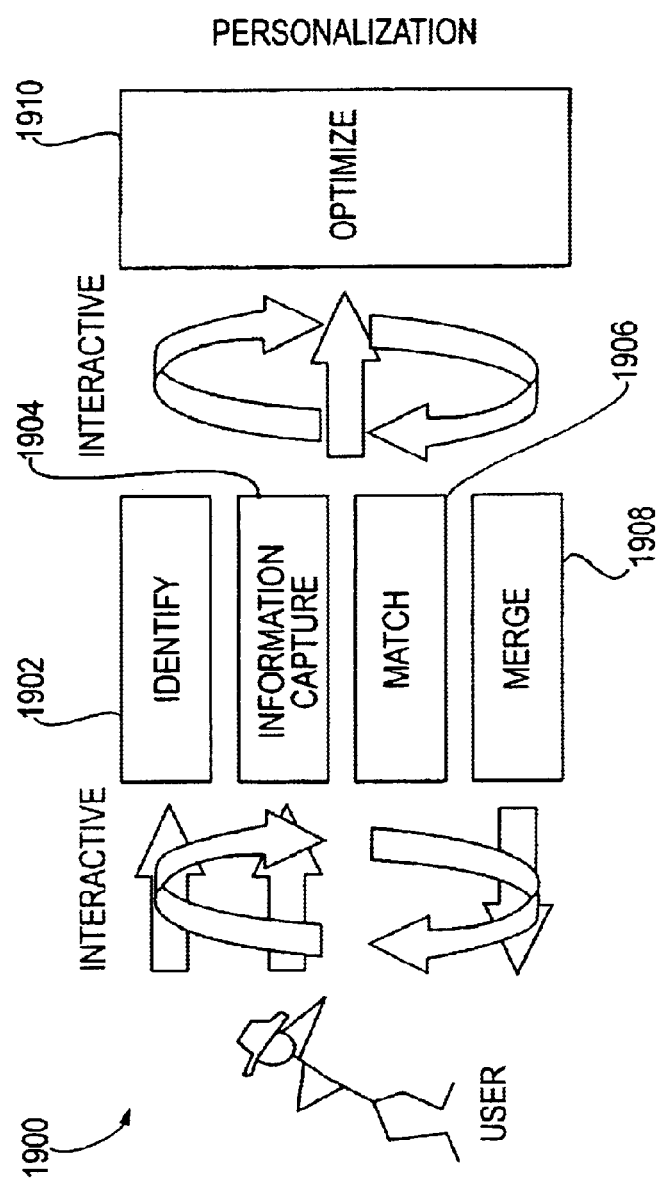
FIG. 19 illustrates a simple personalization process.
Figure 20:
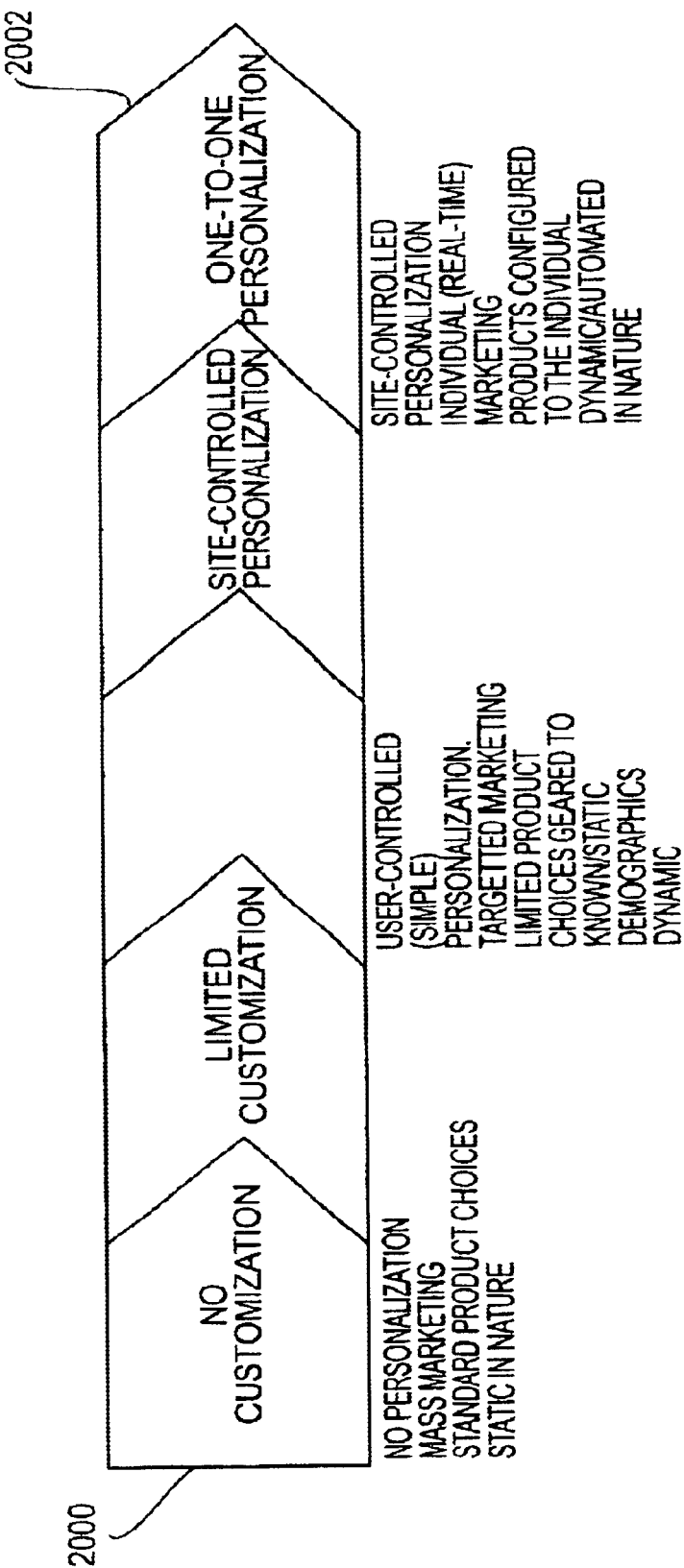
FIG. 20 is a graphical depiction of extents of personalization.

FIG. 19 illustrates a simple personalization process 1900. Most personalization techniques utilize this process in some fashion or another. The complexity and the details of the process may vary based on the technique. The following is a description of the different personalization process components.

Identification 1902—The first step is to identify the user. This enables the rest of the personalization process components. One must know whom one is talking to, in order to personalize "personalize" the experience.

Information Capture 1904—The next step is to collect information about the user. This may be done with implicit or explicit techniques at the direction of the user, or controlled by the system. The goal is to capture information that will assist in determining and delivering a valuable interaction.

Analysis and Refinement—Once the data is captured, it may need to be refined before it is usable. The system needs the ability to analyze the data and draw insight or conclusions about the information and interaction. The refinement may transform the data from questionnaires or implicit observation to be usable with the matching rules and content indexing strategy.

Match—When the personalization strategy is developed, a base of 'Personalization Matching Factor' and rules (based on who, what, where, when, why . . . ) are created. These matching factors and rules are necessary to determine the content, navigation, and layout appropriate for the user.

Merge and Delivery 1908—Upon determining the appropriate information and format, the information needs to be merged and deliverer to the user. This may be through an interactive interface or through a push mechanism.

Personalization Optimization 1910—Personalization is a complex and evolutionary process. The ability to gather metrics and measurements on the personalization process in order to perform rule or data translations, model tuning and reporting is essential to maximizing the concept's potential.

Personalization Strategy

Personalization will continue to be adopted by the market place. Numerous sites have incorporated personalization techniques into their sites and the marketplace is full of independent software vendors creating personalization related software.

Each enterprise must assess their personalization opportunities from their own perspective and develop their own personalization strategy. The personalization strategy must be integrated with the enterprise's existing customer relationship, technology and eCommerce strategies.

Developing a Personalization Strategy

Using the Opportunity matrix given below, the opportunities where personalization typically delivers the most value in within the Interact domain. This area consists of opportunities where the organization is interacting with the user or the user is attempting to engage in a dialog. The publishing slice and Knowledge Management aspects of the Interact slice are the areas which are typically the secondary areas of personalization opportunity with the transact slice being last.

| Process | Publish | Interact | Transact |
| --- | --- | --- | --- |
| Develop products and services | Research and product information | Capture customer feedback; co-design products | Integrated design Systems |
| Generate Demand | Product information; advertising | Interactive marketing; Market of One | Demand-generated Pricing |
| Fulfill Demand | Product availability information | Customer relationship management | Order/deliver/pay; loyalty programs |
| Plan and Manage Enterprise | Publish policies and procedures; HR & Finance info | Knowledge management | Internal purchasing; HR & Benefits systems |

When evaluating what opportunities exists, all areas should be considered. The value of the personalized interaction will be dependent on many factors such as the type of products and services (can they be personalized?) or the type of relationship with the customer or consumer and the ability to capture user information.

A formal personalization strategy should be established that included the near term goals and future vision. Many companies jump right in without any guidance or realization on how they are growing or enhancing the enterprise. The strategy should begin with the big picture. Perform an examination of the critical forces affecting the enterprise and how these forces affect the business process. What are the drivers? Society, marketing, technology, business/industry? With the personalization market emerging, there are still with many unproven business cases and unproven technology. Firms should not engage in personalization simple because they can, nor should they fall prey to the unproven expectations generated by vendors or marketing hype. Firms considering personalization must frame personalization in the context of true enterprise goals (increasing customer retention or increase customer extension), then determine how personalization will help accomplish these goals.

The personalization strategy should evaluate the complexity of the personalization, the cost and time to implement and the potential business impact. In many cases, a true one-to-one personalized site may not make sense. Creating millions of varieties of a product will only complicate the interaction to the point that the user is overwhelmed. In some cases engaging in simple personalized dialogues may be the best near and midterm solutions.

Since different users may wish to interact differently, there may be many right answers to the personalization strategy. Some users are self serving and want to have the tools to explore or make choices on their own, others want immediacy, others may want intimacy such that their feed back and options register with the company. See FIG. 20 for a graphical depiction of personalization from no customization at 2000 to one-on-one personalization at 2002.

The type of dialog that the site engages with the user may vary based on the user. In some cases no personalization or customization should be performed. As more information is captured on the user, the correct type of dialog should be assessed. Determining the correct touch points and level of complexity of the personalization techniques is an important part of the enterprise's personalization strategy.

Common Impediments to Personalization

Listed below are some of the common impediments to personalization.

1. Cost—The cost of implementing sophisticated personalization is very high. The annual cost of maintaining a highly personalized Web site will likely be even greater than the implementation cost.
2. Software Immaturity—Several of the Web measurement and analytic techniques used to segment users based on behavior and preferences come straight from academia and have not been adequately tested in the real world yet.
3. Vendor Immaturity—Many of the vendors offering the most sophisticated personalization software are small start-ups founded by academics. These companies are still developing their strategies and growth plans, and are liable to change course over the next few years.
4. Content Management—Content must be created and stored in such a way that it can be flexibly combined and frequently modified.
5. Integration with marketing databases—To be more than a novelty, personalization will require tight integration with marketing databases. This presents a serious integration challenge, and may necessitate the creation of an enterprise wide strategy for the collection, normalization and analysis of customer data.
6. Required Maintenance—Personalization requires dedicated maintenance. While much of the process of personalization can be automated, the construction of the business rules used to match content to visitors and the creation of the metadata tags required to classify all content still require a tremendous amount of human oversight. The need for such oversight is only compounded by the fact that personalization becomes exponentially more complex as the number of visitors and amount of available content increases. The net result is that firms that decide to engage in personalization without ramping up staff adequately will fail.
7. Personalization Failure—If the personalization technique fails to deliver the correct message or product, the result may be devastating. The last thing a personalization technique should do is destroy or damage relationships.

Implementation Considerations

The architecture components and processes will differ depending on the type of personalization technique implemented. For each technique, there are important considerations and differences that should be understood. Each technique will vary in approach, information required, and delivery. The following items should be considered:

1. Triggering the Personalization Process—What triggers the personalization process? Does the user control the process or does the site? Is the process triggered when the user requests a page or DCA within a page or is it triggered by a background process based on implicit information capture?
2. User Profile Information—What information does the personalization process require? What is the data source or where is the information stored? How and when is it captured?
3. Matching Logic—What drives the matching logic? How is the rule defined? Can the user configure the rule? Does the rule optimize and learn by itself? What happens if the information needed does not exist, does the site attempt to capture it?
4. Content—What is the potential content? How is it stored? How is the content merged and displayed? What is the extent of content management?
5. Definition and Maintenance—Who is responsible for configuring and maintaining the rule, matching logic, or Personalization technique? What are the metrics that will measure its ROI? How are these metrics captured?

These questions can be answered in many ways. The impact the answers have is dependent on the enterprise and its personalization strategy.

A few specific techniques to consider are detailed here:

1. Personal Acknowledgment—In the case of a personal acknowledgment, the rule set may be well defined and the user is not even aware that it exists. There is also no way for the user to alter or customize the content. An example of the personal acknowledgment would be a simple greeting that says "Hello <User>, Good Afternoon". The rule is based on time of day, as determined by the system time. Once the user enters the site, the rule is executed. Based on the result to the system would greet the user with a 'Good Morning, Good Afternoon, or Good Evening'. In this case, the rule is set and does not get altered.
2. Content Filtering—Content Filtering works very similar to personal acknowledgment, but it allows the user to alter the content they wish to see. The rule set is not as clearly defined as personal acknowledgment, rather a shell of the rules is in place and the user has the ability to customize the attributes to the rules. Content Filtering allows the user to define what it is they wish to see on their page. On a site, the user is able to select what information is important for them to view. Users can select whether or not they want to see information about sports, weather, U.S. news, World News, states, and many more. Whichever options the user selects, are the types of stories that will be displayed on their personalized page. The user should also be given the option to change their options at any time. In this case, the rule shell is defined, however the attributes are changeable by the user at any time.

3. Custom Interface—The Custom Interface example takes the concepts of Content Filtering one step farther. In this case, the user not only has the option of setting the content attributes, but they are also able to set the page attributes as well. By giving the user the ability to set the page attributes, they set up the layout of their page so the items are what they want to see, and where they want to see them. Here, the same form of the rule shell is used, but the user also gets many other options that allow them to set up the page as they desire.

4. Personal Assistant—The idea of a personal assistant has been popularized by Microsoft in their addition of the personal assistant to Microsoft Office. If one begins to have trouble or is unable to figure out what to do, the Personal Assistant is there to help. This type of interface is different from that of the other types mentioned. In this example, the system is designed to be a learning system and is situation based. That is, it is designed to monitor what actions the user is performing and trying to determine if the user is lost. If the system notices the user is continually returning to the section of the site designed to change their address, but has not been successful in getting their address changed, then the personal assistant would be launched. The assistant would try to help the user follow the needed steps to change their address successfully. This type of site is not built upon hard-set rules, but rather is designed to learn as much as possible about the user as it goes.

Identification 1710

The first task of the personalization engine is to identify the user. Unlike the everyday person to person interactions where a person relies on recognizing the another's face, voice or other attributes to identify the other person, identifying a user on-line can be a difficult process. The simple task of identifying users does not prove to be a simple task at all. A system may personalize an interaction based on the information captured during a single session or information gathered over the entire duration of the relationship. Regardless, the information that is captured needs to be associated with the user. In order to track a user, an identification or tracking mechanism needs to be created.

Identification Techniques

A variety of techniques can be used to identify the user. The technique may depend on the site's security requirement and privacy concerns. Today, the most common approaches are to either create a cookie on the client machine or to have an identification system on the server, such as a user login. In the future, digital certificates will be more prevalent, and should become the dominant identification method.

Client Side Storage—Cookie

A Cookie is a small text file placed on the client machine's hard drive by a Web server. It is essentially a user's identification card, and cannot execute code or deliver viruses. It is unique to the user and can only be used by the server that issued it. Although this is a common method for identifying a user, there are many risks associated with it.

Cookie may expire or be deleted by the user.

Multiple people may use the same client machine. Identifying what user is on the machine may be very complex. This may result in multiple cookies or a complex cookie that can identify multiple users. Regardless, the cookie may not be able to determine what user is currently on the system.

A user may use multiple machines. In this case, the new/other machine may not have the user's cookie and will not be able to identify the user.

The user has the ability to disable the use of cookies within their browser. There is an option that the user can set that will tell their browser to reject all cookies. If the user does this, then he or she will be unidentifiable.

Server Side Application Logic

This technique requires the user to log-in or sign on to the site. This requires the creation of a user ID and password to utilize the system and the resources needed to validate and store the ID and password. With this technique, the user must remember their log-in name and password. Additional services to lookup log-in names or request new passwords should also be provided.

Certificates and Digital ID's

In every day life people carry different forms of identification; a person's on-line identity may be no different. Modern cryptographic technology offers certificates or digital IDs that will serve as electronic forms of identification. Digital certificates are still evolving and the key players and details on how the pieces tie together are still falling into place.

One example of an effective use of a certificate is Firefly Passport. There the certificate is tied to a list of user profile information. (Microsoft purchased Firefly for this technology. The name is apt to change over time.) The Firefly Passport gives users an application with which to control their personal information and payment details. The information can be dispensed selectively to third parties to use.

A combination of techniques may also be used. The cookie may be used for the initial identification or the default ID for the Log-in process, while the server side log-in process would then be used to verify the identity of the user. It is important to make this process seamless and unobtrusive. The identification process should fade in the background. It should be present yet invisible and unobtrusive.

Relating Multiple ID's

Creating a log-in or sign-in process introduces the traditional problem of multiple log-ins, (or ID's) from a site or enterprise perspective. If a user forgets their login, they may simply create a new one. This may result in multiple logins for the user, and any information related to the previous login is not associated to the user's new one. To prevent this, a facility to look up existing login names or request a new password should be provided.

As in the client/server world, a single or universal log-in is advised, especially for systems that wish to personalize their site's interaction. If the enterprise already has an existing user base, pushing out IDs to users or allowing the ability to re-use the existing ID should be encouraged. For example, United Airlines created a PIN (Personal Identification Number) for each of their Mileage Plus members that provided access to the Mileage Plus section of their Web site and pushed (physically mailed) this out to the respective user. The PIN was their mileage plus number with a password associated with it. By doing this, they were able to reuse their existing identification process and login IDs.

Information Capture 1712

The personalization process is data intensive and is driven by the information collected about the system's users. The more information the site collects and retains about a user, the more likely it can add value and interact on a personalized level. With out this crucial data, there is no basis to shape the interaction or drive the personalization techniques.

Personalization Profile

The information collected about a user is considered the user's profile. Logically, this is everything the enterprise (site) knows about the user. Attributes from the user's profile will be the input to the personalization process and the driving data for the different personalization techniques. A profiling strategy should be developed by the enterprise that addresses what information to capture, the sources of this information, the methods to capture it, and how this information will be stored. If the customer is to be treated the same at all points of interaction, a common profile should be developed that is shared by all departments and applications.

Determining what information to capture or what attributes make up the user's profile can be a difficult process. In most cases, the profile will be based on the enterprise's personalization strategy, the personalization techniques to be implemented, the data required to implement them and a mix of any user information deemed usable that can be captured. In general, the site needs to capture the information required to perform the analysis aspect of the personalization process for each of the personalization technique to be implemented. This information might include:

Basic user information such as name and address.

User demographics, psychographics, and sociographics such as gender, height or age.

User transaction or enterprise data such as purchase history.

User's specified configuration information such as the attribute's of the user's personal home page.

Interaction information such as content viewed or duration of content displayed to the user.

Each personalization technique may require a different set of attributes from the user's profile. The information needed to deliver a 'Site Controlled Contextual Inferences' will be very different than the information needed for 'pre-filled forms.' Site Controlled Contextual Inferences Content Filtering requires the creation of rules and the necessary user information that satisfy the rules or 'Contextual Inferences'. (The information required to satisfy a rule is referred to as Personalization Matching Factors (PMFs) and will be discussed in more detail in the Matching Logic component.) For instance, the rule may be based on gender, age, purchase history or customer demographics. On the other hand, the information that is used to Pre-Fill forms may be a different set of user profile attributes. For example, this might be name, address, shipping information and payment information. Another personalization technique may use the same set of user information or may require another subset of user data.

Physically, this data may come from many sources within the enterprise. Information may be gathered directly from the user's interaction with the personalized site through implicit or explicit information gathering techniques. Information may be used from other data sources such as existing application's transactional data, the enterprises' data warehouse, or from other internal or external data sources.

The situation should be analyzed to determine if the 'profile data' should be replicated and stored in additional profile tables or if it should remain within the existing data source. Some personalization techniques will require additional tables to store the user's profile attributes needed to deliver the personalization technique. This will be discussed in more detail within the Matching section of the paper.

Profiling Standards

The industry has recognized the importance of personalization and the requirement of a user profile information to deliver personalization. To date, a profiling standard or definition of a common 'User Profile' does not exist. This means that each site will be required to capture and retain its own set of profile information. From a user's perspective, this introduces additional annoyance since they will be prompted by personalized sites for the same basic information. The Open Profiling Standard has been proposed to address this issue.

Platform for Privacy Preferences and Open Profiling Standards

The Internet Privacy Working Group (IPWG) began to develop the Platform for Privacy Preferences (P3P). P3P extends the Platform for Internet Content Selection (PICS) standard with notice and consent capabilities to enable automatic negotiation of preferences, policies, and information exchange. If P3P settings are accurate, Web surfers should be able to surf at will and only see P3P notices when they stray out of bounds of what is already approved in the profile.

Netscape, FireFly Network Inc. and VeriSign have introduced Open Profiling Standard (OPS), a proposed standard that helps to address the issues of multiple profiles. This proposed standard would provide Internet site developers with a uniform way of getting users' Personal Profile information in order to personalize interaction. The OPS is a standard being worked on as part of the World Wide Web Consortium's Platform for Privacy Preferences (http://www.w3c.org). It is compatible with the existing vCard and X.509 digital certificate technology standards, which allow for user identification and authentication over the Web.

Individuals will have a Personal Profile that contains their personal information, including their names, e-mail address, mailing address, and any other information they wish to provide. This profile will be stored on their personal computer (or securely stored in a corporate-wide or global directory). The first time that an individual visits a Web site that supports OPS, the Web site will request information from the Personal Profile. To protect their privacy, users can decide whether they want all or part of the information to be given to publishers, and which ones can see it. In addition, if the Web site collects additional information about the individual's preferences, it can (with the individual's permission) store that information in the Personal Profile for future use.

Some of the benefits to the user are as follows:

Convenience of maintaining only one set of personal information for many Web sites, which can save time and the inconvenience of giving the same information to multiple Web sites.

Enhances personal privacy by allowing users, instead of Web sites, to have control over releasing this private information to Web sites The security that can be offered by possibly encrypting the locally stored information or the transmission of this information to Web sites.

Users have the ability to selectively release or withhold information in their Personal Profiles, rather than the "all or nothing" process of accepting or rejecting cookies that the user cannot examine. OPS gives individuals both more flexibility and more control over personal information than cookies can.

P3P and OPS have common goals and have unified their projects. The governing term is now P3P.

Information Capture Techniques

Once the profile strategy has been defined and the sources have been identified, the next step is capturing the information. In many cases, the information comes from existing data sources. In these cases the data may require refinement or replication. The remaining information can be captured directly from the user's interaction with the site.

In most cases, the user will control the personalization process or technique. In these cases the user is aware of the personalization technique and chooses to use the interface that will deliver it. For example, a configured interface such as My Yahoo! requires the user to select the layout and topics they wish to display on the personalized page. The configuration (or setup) interface captures the needed information and adds this to the user's logical profile.

On the other end of the spectrum are information capture techniques that the site controls. The site collects information about the interaction. The interactive information capture techniques can be categorized as explicit or implicit.

Explicit Information Capture

Explicit information capture usually provides an interface to collect profile information. The site explicitly asks the user to provide the information. Examples of explicit information capture techniques are:

Registration Forms. A form that the user fills out to register to the site. This may include interests, demographics or any other profile attributes that site has defined and the user maybe willing to provide.

Static or Dynamic Questionnaires. During the interaction, the site may prompt the user to answer questions. The questions may be based on the answer to the previous question. (Note: The registration form or a rating interface may also be an example of a questionnaire.) The site might ask a user a question if there is a Personalization Knowledge Gap. (A Personalization Knowledge Gap is the difference between the data required to deliver a specific personalized interaction and the amount of information the site has collected on the user.) Another example might be a need assessment questionnaire. For example Progressive Insurance's site provides a list of questions used to analyze the user's insurance needs.

Rating Interface. The site may provide an interface that allows the user to rate content or products. A rating interface is often used with collaborative filtering.

Filter or Query Interface. An interface that allows the user to directly manipulate or filter the content that is displayed.

Configuration Interface. An interface that allows the user to configure the site or select the content to be displayed.

Implicit Information Capture

Implicit Techniques gather information about the interaction without directly asking the user. In essence, the site is recording the interaction in search of useful information. The user may be unaware that the site is capturing information. The most common implicit technique is clickstream analysis. The site records the user's actions, what they clicked on or where they navigated to, the content displayed, time spent or the duration a graphic was displayed. The information gathered is then analyzed for patterns and trends.

Information Capture Concerns

The goal of a personalized site is to increase the value of the interaction of the user with the organization. Unfortunately, the site has the potential to do the opposite. The personalization aspects of the site could actually offend or deter customers. The approach the site uses for information capture will play a large part in the personalized site's success. The following are some items to be aware of when capturing user profile information:

Provide Value. In general, people do not like to give away personal information. To overcome this, the site needs to offer value for the information capture or provide a win-win situation. If the information capture results in something benefiting the user, they are more likely to provide the information. A good example is the grocery-preferred card. For instance Jewel Food Stores offered a preferred card where users receive discounts off of selected groceries each week. The user must present their card to receive the discount. Jewel obtains valuable user profile attributes such as purchase history and trends while the customer receives tangible discounts. The same analogy can be applied to the explicit information capture techniques used by the personalized site.

Small Appropriate Questions. Filling out long forms or questionnaires can also be an instant turn off. Users don't want to be burdened by information capture techniques. They have their own goals and agendas and if the site distracts them from accomplishing this, the site risks losing a customer. If the information capture is not directly tied to some value that the user will instantly see, break it into to small units or single questions. In addition, ask only what is needed and when it is appropriate. If the user is required to fill out a long questionnaire at the start of the interaction or when they first visit the site, they are likely to leave. By gathering the information only when it is needed and tied to tangible value, the user is more likely to provide accurate information and remain at the site.

Accuracy Issues. There is nothing that stops the users from lying or providing false information. Although there is no sure-fire way to prevent this, the site can reduce the possibilities of this occurring. As mentioned above, users are more likely to be truthful if when answering questions that are tied to perceived value or in small amounts. The site should explain the benefit of accurate information and how it will benefit the user by serving them better.

Information may also change over time. The user's interests or their marital status may change over time. It may be necessary to occasionally verify information. If derived information is stored, these may also become inaccurate over time. For example, driver status may change over time due to the occurrence of moving violations or a change in marital status. The same risks apply to information captured implicitly.

Privacy Issues. The fine line of a user's personal space and their legal rights is another possible area for concern.

Regulatory Compliance. The details of a user's legal rights are still not clear. In the near future, legal regulations will require all companies to place privacy statements on their Web sites and to provide customers with a mechanism to examine and challenge personal data collected about them. Customer access to personal information will be difficult to implement due to user authentication requirements, and the unpredictable nature of data requests and alterations. In either case, failure to comply with a site's stated privacy policy or failure to provide customers with a copy of their personal information will mean legal prosecution of organizations under national regulations.

Defining Preferences or Personality. The definition of "private" information is open to debate. For example, the European Data Protection Directive defines a number of areas (e.g., political affiliation) that are considered particularly private and, therefore, subject to enhanced controls. However, the ability of the Web to follow users' search patterns and to customize content provided by certain sites (e.g., most current-affairs sites) will offer the de facto ability to identify users' viewing preferences without the explicit authorization that the law would require if they were identifying their own characteristics. This issue will cause the most friction between U.S. and European regulators, as the United States tends to assess privacy on the basis of context and usage, while Europe bases it on an absolute measure of the data's perceived privacy (see Note 1). The collection of data that could be used to derive sensitive information will be subject (in each jurisdiction) to the equivalent privacy regulations as that level of sensitive information (0.7 probability).

Children. Vendors whose Web sites are designed for children will be subject to greater public scrutiny for violations of privacy regulations and conventions. It will be politically sensitive for children's Web sites to perform customization of content or context across multiple visits.

Selling information to third party providers. General data privacy guidelines state that information cannot be used in ways not explained to the subject at the time of collection. The problem results from the fact that the most personal information (e.g., a stock portfolio) is also the most valuable when sharing information with other application providers. This can cause tension between the value that the Web site provides its visitors (in terms of the degree of personalization that it is offering) compared with the value it can extract from the service that it provides (by sharing the information with advertisers or third-party organizations). Managing the conflicting requirements of personalization and information sharing will become a key element in determining the success of a Web site.

Content Catalog 1714

Today, the Web content of most sites is unmanaged. The enterprise does not utilize a method of tracking the content or the attributes of the content. Instead, the enterprise has a pool of content that may span multiple directories, departments and web servers. When content is created it is added to this pool of content by simply adding it to the Web server's directory and adding the necessary link required to display it. The content within this pool may be duplicated, outdated or unused. In short, the enterprise has no idea of the extent of the content or information about the attributes of the content.

Unmanaged content may be an obstacle for personalization. In order to deliver personalized content or filtered content the system must know what content exists and the attributes of this content. A content catalog 2100 or content management system should be used to manage the enterprise's content. A simple definition of a content catalog is given below.

Figure 21:
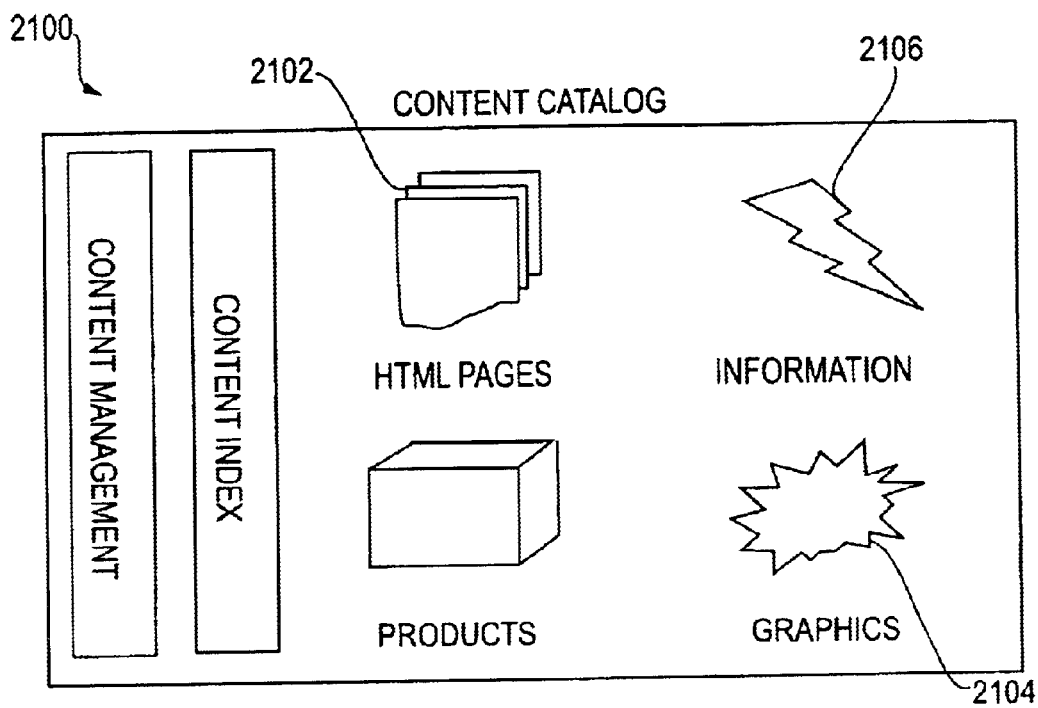
FIG. 21 illustrates a content catalog that can be used to manage an enterprise's content.

What is deemed as content can take many forms. As illustrated in FIG. 21, content may be Web pages (HTML pages) 2102, graphics (images) 2104, audio, video, or even information 2106 and messages. How this content is stored may also take many forms; it may be stored in table, files or directories. The content catalog needs to be aware of what content exists and where it is stored. This can be achieved by retaining attributes of the content and providing indexing to the content. Content attributes might be physical properties such as what type of content it is (HTML page, graphic, audio file, video file or textual message) or the size of the content. The difficulty is attempting to store the heuristic or analytical attributes and making these attributes available for personalization techniques. The indexing strategy should include full text and attribute indexing which provides efficient access for the enterprise's users and potentially any integrated members of the enterprise's value chain.

Matching Logic 1716

This personalization component needs to provide the intelligence to match the user's profile attributes with the correct content and deliver this content to the user. Bridging the profile information to the content is truly the heart of the personalization architecture. A variety of different approaches can be implemented to accomplish this task. The complexity of this matching logic is directly proportional to how flexible, robust and dynamic the personalization aspects of the site are.

The Match concept is the process of analyzing the information that is known about the user and determining the correct content to display to them. Once the user profile attributes have been identified, they must be applied against the rules or matching logic defined within the site in order to determine the appropriate content to display. Three inputs are required in order to complete the Match process:

User Profile Information—This information consists of what is known about the user. The processes used to gather this information are explained earlier in this section.

Content Available—The content on the system includes any information displayed to the user. In this case, content includes; Images, Text, Personalized Statements, Applets, and Digital Information.

System Defined Rules or Matching Logic—In order to use the user profile information effectively, one must have a clear set of rules defined against which to evaluate each user. The rules are defined to match the user information with the content A simple example of this matching logic is a defined query. The site may provide the logic for a user to view their account information. In this case the profile information is their user ID or account number, the rule is the defined query (SELECT account_info FROM Account where Acct_Id= :User_Acct_Id) and the content is the user's account information stored in Account table. If the content is stored in a relational or object database, SQL queries are an effective method of accessing this data. In this case the 'defined rule' takes the form of a SQL statement. Unfortunately, most of the content is not stored in relational databases or is not directly related to something as simple as a user's account ID. Instead the content is web pages or massive amounts of news feeds and textual information. These situations require a different and possibly more complex approach and infrastructure to perform the matching logic. In this environment, the rules are usually composed of Personalization Matching Factors (PMFs).

Personalization Matching Factor (PMFs)

A Personalization Matching Factor (PMF) is the building block for a rule. It is the information required to perform the matching aspect of the personalization process. This is the demographic/psychographic/sociographic or any other information that will be needed to drive the personalization process. A PMF might be as simple as the user's gender or a complex attribute such as driver type that is derived from a group of data. Included in the definition of the PMF should be the definition necessary to create it.

Developing PMFs will require involvement of the Marketing department and other business entities that understand the customer strategy and the enterprise's customers. It is important to understand the customer needs, what the customer expects, and what makes a difference to them when determining and creating PMFs.

PMFs should be restricted to information that can be realistically captured by the site as well as information that is reliable and accurate. Conceptually, a PMF can be any piece of derived or any conceived information. For example, a PMF could be the user's gender, age, marital status, number of children, the number of years they have been a customer, their profession, driving record, interests such as sports, travel or other leisure activities, favorite color, a personality trait such as if they are detail oriented or pessimistic in nature, or any otherdemographic/psychographic/sociographic piece of information. How would this information be captured? What are the attributes that would be used to derive this? What is the accuracy of this information? Why is this PMF used to personalize? These are the types of questions that need to be asked when determining possible PMFs.

A PMF needs to have a clear definition and a finite list of possibilities. For example, a site may create a PMF called 'Age Classification'. The site would need to define what it means by the PMF 'Age Classification'. For this example, age classification is simple a logical group of users based on their age. The values would be:

| Age | Age Classification |
|---|---|
| 0–12 | Child |
| 13–19 | Teenager |
| 20–40 | Young Adult |
| 41–64 | Middle Aged |
| 65–125 | Senior Citizen |
| 125–200 | Ancient |

A PMF may also be a combination of low level data. If a PMF of 'Insurance Risk' were created, the required data would be far more than age. It would need to include age, driving history, vehicle, region and potentially other data.

Rules and Matching Logic

The PMFs are the building blocks for rules and matching logic. Unlike SQL extensions, there is no industry standard method for accessing 'Web' content and creating rules. Some approaches are detailed below.

Simple Conditional Rules—The simplest process is to define a clear-cut set of rules against which to evaluate the PMFs. These rules are generally simple and have only a few conditions to evaluate. A simple rule would follow this structure:

> User Variable + Comparison Operator + Predetermined Value (or PMF)
> Age =
> Young Adult (20–40)

The user variable is a specific user's profile attribute or value for the rule's PMF. In this case it is the user's age which maybe derived from the user's birth date and the current date. The next element in the structure is a comparison operator. The final element is the PMF or the group or data the rule is based on. Based on the user's age and the granularity of the PMF the rule may have numerous results. Each result may point to a different set of defined content. The entire age rule may be something like this:

| User's age = Child (<12) | deliver content ABC |
|---|---|
| = Teenager (13–19) | deliver content DEF |
| = Young Adult (20–40) | deliver content GHI |
| = Middle Aged (41–64) | deliver content JKL |
| = Senior (>64) | deliver content MNO |

A rule will be made more complex with the addition of a logical operator that allows a rule to have multiple PMFs. For example a rule may simply be 'AND' multiple PMFs together. In this example, the rule would look like this:

> User Variable A + Comparison Operator + Predetermined Value (or PMF) A
> AND
> User Variable B + Comparison Operator + Predetermined Value (or PMF) B A piece of the actual rule would look like:

> Age = Young Adult (20–40)
> AND Gender = M (Male)

This rule would now be the age-gender rule. It evaluates the user's age classification and gender. If the users age classification is 'Young Adult' and male, then statement evaluates to be true and action is taken or the specified content is delivered.

At first glance, this may appear to be hard coded. If directly placed in a script this would be a true statement. Instead, the infrastructure should be created that can define rules, evaluate rules, assign a rule to a dynamic content area or page, and assign content to specific rule results. Instead of hard coding this with in the application or script, the rule component or dynamic content area (DCA) is placed in the script. When the DCA is encountered, the architecture handles evaluating the rule and matching the defined profile attributes to the rule in order to deliver the appropriate content.

Conceptually this is easy, but creating this infrastructure is very difficult. For this reason a rule engine or personalization vendor will be brought in. Numerous independent software vendors (ISVs) are capitalizing on this niche and creating their own proprietary personalization infrastructure. These vendors are covered in more detail in the accompanying Vendor document.

Forward Chaining Rules—Forward chaining still uses the fundamentals of simple rules, but facilitates building upon whatever user information may be available at the time. In this case, if only a small amount of information about the user is available, then the rules are determined based only upon that data. Once more information is gathered, the rules allow for more complex conditions to be evaluated against. The rules are set similar to this:

> User Variable + Comparison Operator + Predetermined Value (or PMF)
> AND if the following is known -continued

| User Variable + Comparison Operator + Predetermined Value (or PMF) |
|---|
| Age = 20–40 |
| AND if Gender is known to be = M |

The above rule will be evaluated differently according to the amount of information known about the user. For instance, If all that is known about the user is his/her age the rule will evaluate in one way, if his/her gender is known, then the rule will be evaluated in another way.

Learning System (Neural Network)—The premise behind the learning system is that it will monitor the user's actions and perform differently depending upon what the system learns from the user actions. This technique is a complex combination of rules and relationships using the user's interactions with the site to increase the knowledge of the enterprise about the customer. The best way to describe this is with a definition of neural networks. A neural network is a system of programs and data structures approximating the operation of the human brain. Typically, a neural network is initially "trained" or fed large amounts of data and rules about data relationships (for example, A grandfather is older than a person's father is). A program can then instruct the network how to behave in response to an external stimulus, or it can initiate activity on its own based on the user's actions.

Inductive reasoning/Collaborative Filtering—Firefly defines collaborative filtering as a technology that emulate the social processes of people making recommendations based on an understanding of one another's preferences. Individual agents track and choose items based on individuals' tastes and preferences.

The core technology personalizes both the delivery of content and the knowledge of related people within a defined networked environment, or "taste space." Firefly tools correlate individual users' preferences for specific items based on either explicit or implicit ratings of comparable items in other situations. These ratings may be stored entirely within a single Web site or compiled on the fly from information assembled from individual clients and shared servers.

Collaborative Filtering assesses a single set of user preferences to identify an individual community of interest. Collaborative Filtering correlates the tastes on an individual user with the preferences of comparable users to develop a list of personalized recommendations. It is some times referred to as People-to-people matching, and is aimed at automating word-of-mouth kind of information.

Canned Queries—A system of canned queries allows the user to choose only certain actions that have been pre-determined for the user. The queries only give the user the options listed, and do not change over time.

The examples above are mainly site controlled. The site either has a pre-defined rule or matching logic that will execute. The site is responsible for determining what has been learned from the interaction, what is enabled based on the knowledge gained, what additional information will provide additional insight. Where possible, the users should be allowed to define the rules and matching logic or the content they wish to view. Provide the user the structure to create a rule or define a query.

Defining legitimate business rules and models is as important as the infrastructure to evaluate them. The rule may execute and content may be delivered but if the rule doesn't make good business sense the effort is wasted. Business and marketing personnel should be involved in defining the rules and verifying that they are correctly translated and technically implemented. This is another reason that the personalization team should include individuals from IT, the business and marking departments. The team needs to understand their existing and potential customer, the content available, and when and why to display it.

Merge and Deliver Content 1718

The rules for matching logic should be defined as stand alone entities so that they may be reused in multiple situations. Each situation may associate the same rule to a different interaction and a different set of content. The matching logic should be associated with a template or interaction and content should be associated with a rule result or condition of the matching logic.

One possible method of associating a rule and content to an interaction is by using a Dynamic Content Area (DCA). A DCA is embedded with a template and points to a specific rule, and a rule results set will be associated with specific content. For example a page maybe explaining a particular service to a current user. The site may wish to display on the page a graphic that the user can relate to along with a list of benefits that are personalized to the user and finally list discounts that the user might be qualified for.

Figure 22:
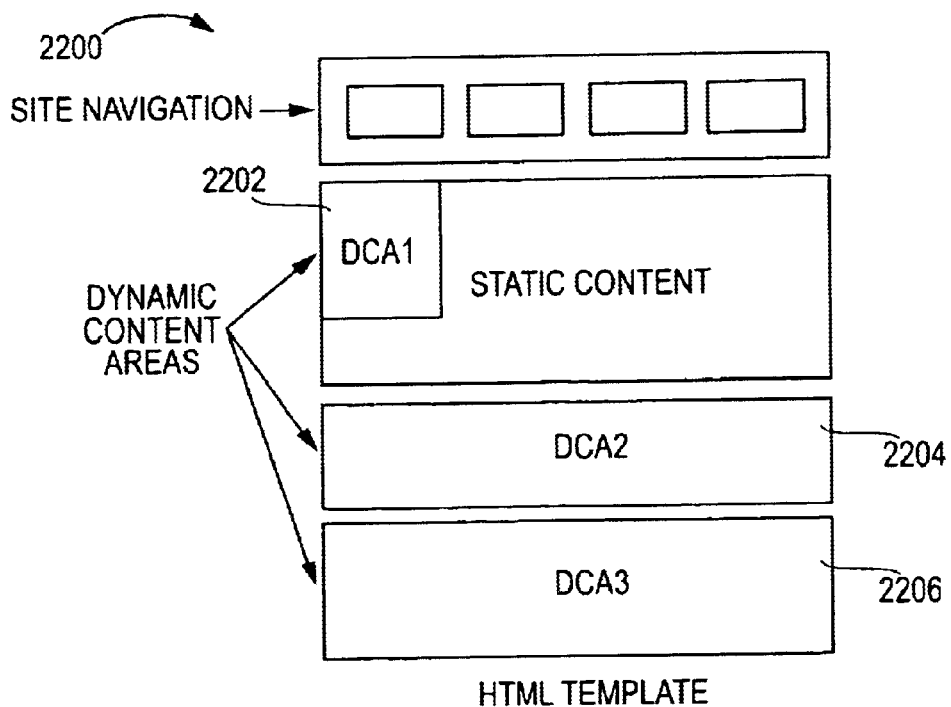
FIG. 22 illustrates an exemplary template with three Dynamic Content Areas (DCAs) embedded within the template in accordance with a method of associating a rule and content to an interaction.

A separate DCA would be used for each set of data. FIG. 22 illustrates an exemplary template 2200 with three DCAs embedded within the template.

DCA1 2202 might be a place holder for the graphic. The rule associated with DCA 1 might be bases on a set of PMFs such as Age and Gender. Depending on how the rule is evaluated, a different graphic might be displayed. (In this case a graphic is the content.)

DCA2 2204 might represent a place holder for a list of benefits the user may receive from the service. This rule may be associated with different PMFs. For example, the PMFs for this rule might be marital status, number and ages of children and income level. Different benefits would be displayed based on how this rule is evaluated. In this case a textual statement about benefits is considered the content.

DCA3 2206 might represent a place holder for discounts. This area may reuse the rule created for DCA 2 but the content is different. In this case, the content is a list of discount based on the rule evaluation.

During the design of the site, a decision must be made to determine which areas of the site will provide personalized content to the user, the rules to use and matching logic associated with it, and what content should be displayed for each rule result. Since there is no face-to-face interaction with the user, identifying the content to use is very important. The web site must make the users feel as though they are being communicated directly. Once the page is requested or encountered by the user, the page is generated, and each DCA will request that a rule be executed and the content should be generated according to the user profile.

The normal delivery method of the content is through the use of HTTP. This method will be used to deliver the majority of the content. There are other methods of delivery that may be considered depending upon the content to be delivered. Other delivery methods includes e-mail, FTP, Push or Channels and streaming video. Since timing of the delivery is very important, consideration must be given to developing a method of delivery that provides the most impact to the user and does so in a timely manner.

Administration 1720

Personalization is difficult for a number of reasons, but the biggest "gotcha" is that, above all, it requires dedicated maintenance staff. While much of the process of personalization can be automated, the construction of the business rules used to match content to visitors and the creation of the metadata tags required to classify all content still require a tremendous amount of human oversight. The need for such oversight is only compounded by the fact that personalization becomes exponentially more complex as the number of visitors and amount of available content increases. The net result is that firms that decide to engage in personalization without ramping up staff adequately will fail.

Personalization is a continuous process. It is not an application that is delivered and then left unmonitored or forgotten about. Personalization techniques will need to be added, removed and modified. Rules, content, and messages will change. Most enterprises fail to measure their return on investments, or to directly attribute customer behavior to certain initiatives. As a result, the enterprise often invests in initiatives, promotions and campaigns without understanding how they will affect product or customer profitability. Procedures, measurement and reporting devices, and metrics need to be created to allow for the enterprise to evaluate and improve their personalized interactions and deliver their customer strategy. The site may provide the customer a chance to make a purchasing decision. If they decide not to make this purchase, what is the reason why? The enterprise should attempt to gather information on why this result occurs and seek to prevent it in the future. The following optimization and administration components should be considered for a personalized site:

- Content Rating and User Feedback. Allow the users to directly rate the interaction and the content. The Internet is an interactive medium, but unlike a face to face interaction one can not read the user's face or inflections in their voice to determine if their needs are being met. This type of feedback needs to be built into the site. The interface should be simple where the user can provide feedback with a single click.
- Metrics Return On Investment/Information. How can one determine if the personalization process is helping the enterprise? Metrics should be defined to measure the ROI. This might include reporting facilities to capture the information needed to provide these metrics.
- Administration Facilities. When designing a personalization site, maintenance of the rules and content should be considered. The people most likely driving this information will not be technology oriented, and may require simple interfaces for altering rules for personalized content. An IS staff member should not be needed to change rules. The same holds true for content. As content is added, this information will need to be indexed and integrated with the search technology implemented at the site.

Interactive Marketing 1702

With the emergence of interactive mediums and the inherent capability to gather real time information about the customer interacting with the medium, enterprise's marketing strategies and systems are becoming more customer-centric. With the move from mass (or targeted) marketing to a form of customer-centric marketing, enterprises must evaluate their customer relationship model.

Traditionally, marketing models tended to focus exclusively on customer acquisition (mass marketing) and then on customer selection (micromarketing and target marketing). However, several studies have shown it costs between four and 10 times as much to acquire a profitable customer as it does to retain one. This awareness has resulted in a heightened emphasis on customer retention and extension and has been the driving force of relationship marketing.

However, customer retention and extension are less dependent on traditional marketing and are more tied to the value perceived by the customer during every interaction with the enterprise. In addition, these strategies require a different marketing infrastructure that is information- and customer-driven, rather than product- and creative-driven. Thus, relationship marketing is somewhat of a misnomer, as adding value to the customer relationship is not simply a marketing challenge, but rather a challenge involving every function within the enterprise. This business model calls for enterprises to differentiate themselves by consistently providing superior service at every point of contact with the customer.

The ShARE Model

Figure 23:
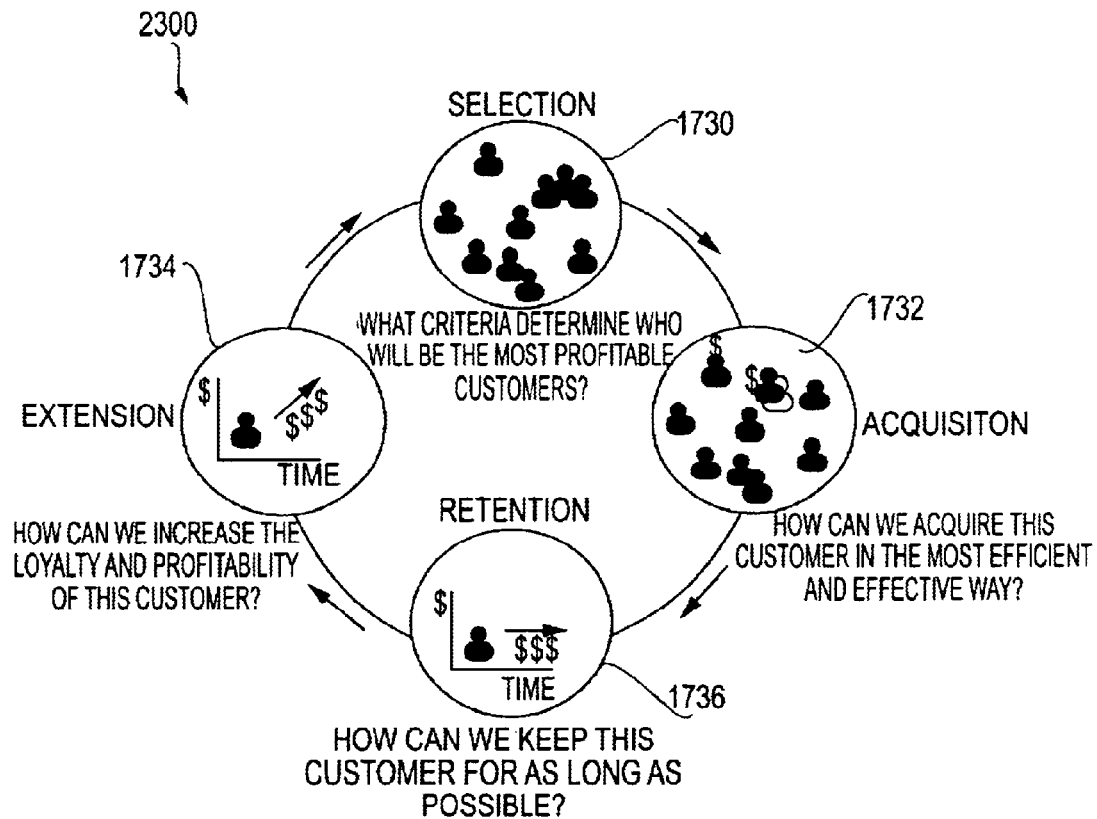
FIG. 23 depicts a ShARE (Selection, Acquisition, Retention, and Extension) customer relationship model which addresses the changes in a shift to interactive marketing.

The ShARE (Selection 1730, Acquisition 1732, Retention 1736, and Extension 1734) customer relationship model 2300 is detailed in FIG. 23. See also FIG. 17. This model addresses the changes in the shift to interactive marketing. Due to the emergence of interactive mediums, today's systems now have the ability to address all areas of the ShARE model.

Selection 1730

The selection portion of the ShARE model deals with determining who within the general population will be a company's most profitable customers. Selection deals with determining who makes up a product's target audience, and allows a company to focus their attention more accurately. This is the area where demographic information, such as age, geography, and income are applied to produce a more finite list of likely customers. The selection process allows businesses to make strategic decisions such as NOT to market a snow shovel in Ecuador.

Acquisition 1732

Acquisition focuses on getting a potential customer to use one's service or buy one's product in the most efficient way. This area has traditionally focused on mass marketing and measuring a business' cost per thousands of consumers reached. The classic example of acquisition is Proctor & Gamble's use of daytime television dramas in the United States to sell soap, creating what is now called the soap opera. Other methods of acquisition include direct mailings, telephone solicitation, toll free order numbers, and, more recently, Internet advertising and online businesses.

Advertising

Capitalizing on the two-way interaction and an audience of the general public, advertising is often utilized on applications deployed on the Internet. In a browser-based implementation, the use of frames or banners creates the possibility to dedicate a section of the display to advertising. With most of marketing capabilities, the advertising model (services) can vary from simple static advertisements to a robust advertising integrated with the personalized system. The implementation methods may range from an advertisement Applet to advertising services integrated with the personalization system. Detailed below are possible services included in a complex advertising implementation.

- Storage. Storage of the advertising content should be performed in the same fashion as the product and electronic merchandising content. The content should be so it integrates well with the personalization services and user profiles.
- Integration with Personalization. Ideally, the personalization services are separated and can be utilized by multiple applications. For personalized advertising, profile information will be gathered and the advertising content filtered based on the profiles. A separate process will handle the merging and delivery of the content as well as changing the advertisements as the user navigates through the site. The advertising content may include rich content such as graphics and video.

Buy Now Services. Microsoft and others are currently working on technology to allow a user to click on the advertisement and purchase the item without leaving the site. These technologies are emerging and may require a client-side wallet to perform the transaction. The push is to provide the ability to quickly purchase items of interest without leaving the site of interest to make the purchase. Microsoft currently provides this ability using an ActiveX control integrated with a Microsoft wallet. Others are sure to follow this trend.

Usage Metering and Reconciliation. There are different methods for billing for advertising space. The most common billing methods are usage which may include: the number of times displayed, the length the add is displayed or the number of users to which the ad is displayed. Services are needed to record the usage information in order to reconcile with the advertisement providers. Since many sites are funded by ad revenue, the accuracy of these services is crucial.

As online advertising and its supporting technology matures, new advertising methods will emerge. For example, the use of 'intermercial' (sometimes referred to as interstitial—meaning intertwined) ads that automatically pop up between pages may prove to be the next method of choice. It is important to ensure the advertising services remain flexible and are able to address the evolving technology used to implement advertising.

Retention 1736

Now that companies know it is cheaper to hang on to existing customers than to find new ones, more and more emphasis is being placed on customer retention. Retention focuses on keeping customers for as long as possible. The most effective way to do this, is to provide excellent customer service at each and every interaction with the customer. Since electronic business don't provide traditional customer service, it is important web-based businesses have sites with appropriate support functionality. The support should be easy to use, and meet the specific needs of that product's consumers.

Recommendation Services

Recommendation functions may take up multiple formats. The most common format are simple services to allow the site's users to provide direct feedback, positive or negative, and recommendations about the content or products on the site. By providing these services, the site may create a community where users can interact with each other, furthering the site's worth. For example, a sict could allow for users to submit book reviews. The information is then available for consumption by the general public. While the technology to implement this is rather simple, the process may prove to be a little more complex. The process includes receiving input, reviewing recommendations, filtering and approving content, and then posting the review or recommendations. The lack of a filtration or review process could be devastating to a site.

Another type of recommendation service makes suggestions to its user base. These services can range from simple to complex. A more complex recommendation service may utilize collaborative filtering. Collaborative filtering is the technique of using content or product ratings from the site's user base to predict the interest other potential users will have in the content or products. Correlation algorithms use the profile information, history, and/or input preferences to construct a correlation group of users whose ratings are effective predictors for the new user. Prediction algorithms then use the ratings and profile information of the users to make predictions of the content they most likely will find interesting. (Note: The collaborative filtering technique could be implemented within the personalization system.)

Site Announcements and Event Reminders

Additional relationship building techniques are site announcements and reminders. The underlying services are again personalized. The site has created content which may range from new product announcements based on the customer's last visit or reminders of an upcoming event important to the specific customer. For example, an event reminder could point out an upcoming wedding, personal anniversary or holiday. The user, once reminded, may then utilize the site to act on the event. If the site implements complex event reminders, additional services may be needed to provide calendar and scheduling functionality. These services may also be incorporated with the off-site subscription services to provide reminders to users not logged into the site.

Loyalty and Return Customer Programs

Creating an environment that promotes customers to return to the site is critical for the longevity of the site. Many of the seller-centric implementations will utilize membership services and other incentive programs to try and promote customers to return. For example, site members would receive discounts and additional privileges, thus building a better relationship with the site. Incentives like frequent shopper points or access to member only information are other common methods. The loyalty programs may require additional logic for permissions and content filtering. Most of this may be implemented by gathering and using profiles and integration with a complex personalization system.

Return Programs are services geared toward enticing the customer to return to the site. The Internet eliminates two main factors affecting customer loyalty. The first is proximity. In the brick and mortar medium, customers tend to shop (or browse) close to where they live or work. The second factor is time or how long a store is open. With the Internet being 7 by 24 and geographically independent, these items are no longer relevant. For this reason, considerable effort may be geared toward creating return programs. The most common forms are electronic version of current methods, although they may be more effective due to personalization and real-time delivery.

Push and Off-Site Subscription Services

This section includes merchandising using email to push information to a user. (Note: Subscriptions to sites and information are covered in the Order Processing—Fulfillment component.) Many of the common services for storage, filtering, formatting and approving content would be utilized. Additional services would be needed to push the content to the desired mailing list. Details and considerations for using push technology is included in application discussing the Netcentric Framework, referenced above. Below are some basic services.

Subscription Management. Due to the Internet community frowning on junk email and spamming, most sites have distributed their push marketing using a subscription-oriented approach. Services should be provided to allow users to subscribe and un-subscribe from the site marketing distributions.

Distribution Management. As the user base of the site grows, the actual distribution mechanism needs to be robust enough to scale to handle the growing user base. Methods of distributing the information in a fashion that does not impact the already increasing network traffic should be researched.

Extension 1734

Extension asks businesses to answer the question, "How can one increase the loyalty and profitability of this customer?"

Cross Selling and Up Selling

Cross Selling and Up Selling are similar to recommendation services. Cross selling uses some knowledge of the consumer to suggest complimentary or similar products in which the consumer may be interested—"Would you like fries with that?" Up selling is an effort to sell more of the same thing, or a better version of what the consumer may currently be considering—"Would you like that Super Sized?"

Cross selling and up selling are considered an application or service enabled by complex personalization. Although very important from a marketing perspective, once the underlying services for complex personalization are in place, many of the demand generating applications are now possible. Cross selling or up selling could be implemented by product relationships in a database.

Maintenance and Administration 1008

Figure 24:
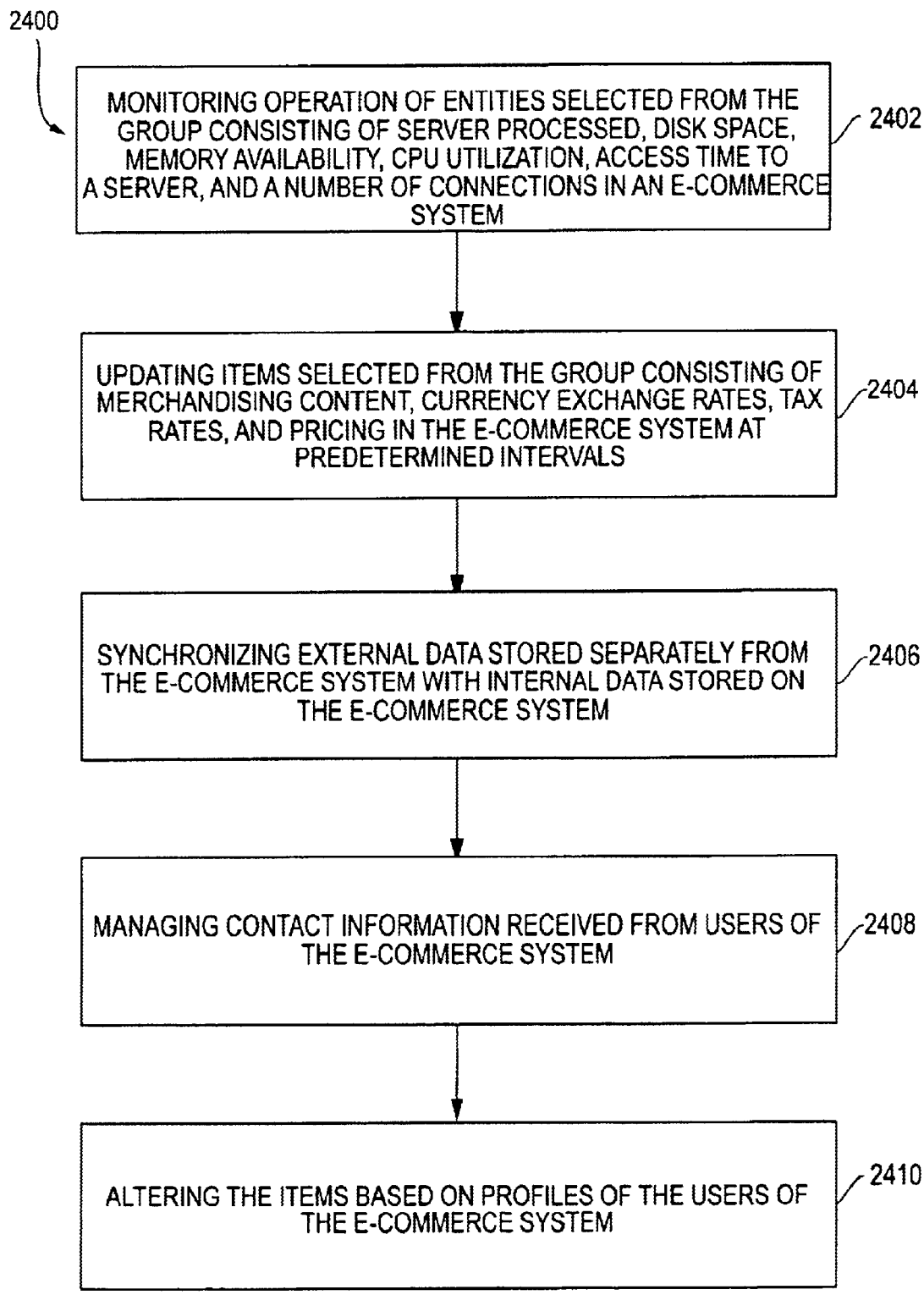
FIG. 24 illustrates a flowchart for a method for administrating an e-Commerce system on a network in accordance with an embodiment of the present invention.

FIG. 24 illustrates a flowchart for a method 2400 for administrating an e-Commerce system on a network. Operation of entities is monitored in operation 2402. Entities include server processes, disk space, memory availability, CPU utilization, access time to a server, and/or a number of connections in an e-Commerce system. In operation 2404, items including merchandising content, currency exchange rates, tax rates, and/or pricing in the e-Commerce system are updated at predetermined intervals. In addition, external data stored separately from the e-Commerce system is synchronized in operation 2406 with internal data stored on the e-Commerce system. Contact information received from users of the e-Commerce system is also managed in operation 2408. The items are altered based on profiles of the users of the e-Commerce system in operation 2410.

One of the items altered based on the profiles of the users may include price, which may be altered to reflect a discount assigned to the user. A search may also be performed for the internal data in the e-Commerce system prior to the synchronization of the external data.

As an option, load balancing services may also be performed that initiate and stop processes as utilization levels vary in the e-Commerce system. As another option, managing of the contact information may further include tracking responses to the users of the e-Commerce system.

Figure 25:
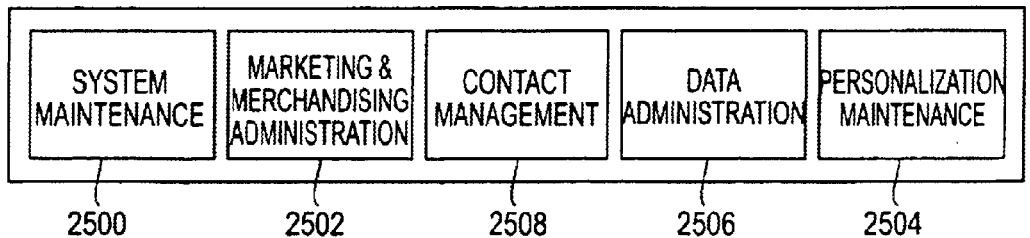
FIG. 25 illustrates components of the maintenance and administration portion of the of the eCommerce Application Framework in accordance with one embodiment of the present invention.

As with any system, a support, administration, and maintenance facility and procedures need to be put in place to remain operational as well as efficient. In general, packaged implementations will only provide minimal maintenance and administration facilities leaving the bulk of the burden to the integrator. The underlying technology for the facilities may be basic batch download/uploads, simple server processes and applications or even browser based. It is important to understand the system administration and maintenance needs, develop a plan, and stick with it. Some of the areas to consider are listed below. FIG. 25 illustrates high-level concepts of maintenance and administration of the framework.

System Monitoring Facilities 2500

The health of a system can be easily maintained by putting in place monitoring facilities and procedures for capturing the system's electronic vital signs. Far too often the users of a system are the first to know of system problems while the administrators are the last to know. This can be prevented by creating automated monitoring facilities for server processes, disk space, memory, CPU utilization, access time, number of connections, and other electronic vital signs. The complexity of these facilities is open for debate. In addition to online monitoring facilities, robust logging, audit trails, and archiving capabilities should be included. These will aid in analysis and forecasting of system needs.

System Administration

The term system administration is a vague term used to categorize the actions needed to support a system. This may include starting, stopping, or restarting servers or processes, scheduling backups and loads of databases or files, recovery procedures or anything else needed to maintain the system. Traditional system administration also includes updates to system software, packages, and operating systems. Listed below are additional system administration considerations an eCommerce system may encounter.

Merchandise Administration 2502

The merchandising aspect may introduce additional administration and maintenance. Procedures should be put in place to handle sold out merchandise and back order items. Updating merchandising content, currency, tax, and pricing may need to be performed on a regular basis. The merchandise administration facility should be able to handle pricing and discount items and have the ability to allow automatic updating and manual override capabilities for authorized administrators.

Personalization Maintenance Facility 2504

The biggest challenges in personalization are determining matching rules for the business's market plans, categorization of the profiles, gathering profile information, and then developing robust content with adequate content indexing. Once these have been established, they should be easily maintained. When designing the personalization services, maintenance of the rules and content should be considered. The people most likely driving this information will not be technology oriented, and may require simple interfaces for altering rules for marketing, advertising, or other personalized content.

Content Administration

As content is added, this information will need to be indexed and integrated with the search technology implemented at the site. Other items such as customer service chat discussions or review would also need to be purged on a regular basis.

Data Administration 2506

Many times, utilizing packages to implement an eCommerce solution will introduce a proprietary data model for customer and product information. In order to make this information accessible to the rest of the organization, the information will need to be synchronized with the enterprise data. Services may be required to determine changes and synchronize the data. This would be true for any information the site gathers not integrated into the enterprise data.

Load Balancing

In addition to the monitoring and maintenance facilities, services should be considered to stabilize performance. Providing the system is scalable, load balancing services would aid in initiating and stopping extra processes as utilization levels vary. Processes could be started to handle additional requests during peek periods providing the user with a consistent level of performance. This is extremely important in periods of peak usage. A good example is the fluctuation of the average response times of some of the current electronic trading systems during market surges.

Times during a market surge were 2–3 minutes above their average 6–10 second response time.

Contact Maintenance 2508

Internet users are quick to point out mistakes and opinions for improvements. Sites will receive sporadic emails from users experiencing a variety of emotions about the site. Users may sour quickly if actions are not taken or noted to items pointed out. Responses to user feedback should be monitored to ensure that each message from a user is responded to in some manner.

Maintenance and Administration of the system is often wrongfully overlooked. It is a key component in improving customer satisfaction and building customer relationships. Having robust maintenance and administration facilities should increase the system's overall stability by reducing the time and cost to identify and fix issues, automating processes, and enabling system administers.

Implementation Considerations

Information Staging

The ability to deliver new products and information may be critical to stay ahead or match the competition. The speed at which the information can be updated and migrated to production is critical. Be sure to understand the relationship between the content changes and the correct procedures to migrate the changes to the production system. The ability to maintain and grow the site may prove to be key factors in the site's success.

In most cases, a content staging process should be put in place. In the simplest format, the procedures for modifying and adding content, testing, validation of content and subject matter, authorization and migration to production should be documented.

Order Processing 1010

Figure 26:
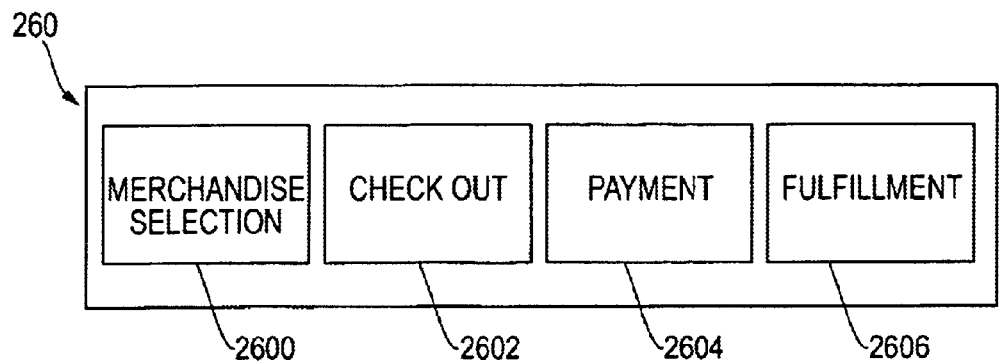
FIG. 26 illustrates the Order Processing portion of the eCommerce Application Framework of the present invention.

FIG. 26 illustrates the Order Processing portion 1010 of the eCommerce Application Framework 1000. Subsections include Merchandise Selection 2600, Check Out 2602, Payment 2604, and Fulfillment 2606.

Figure 27:
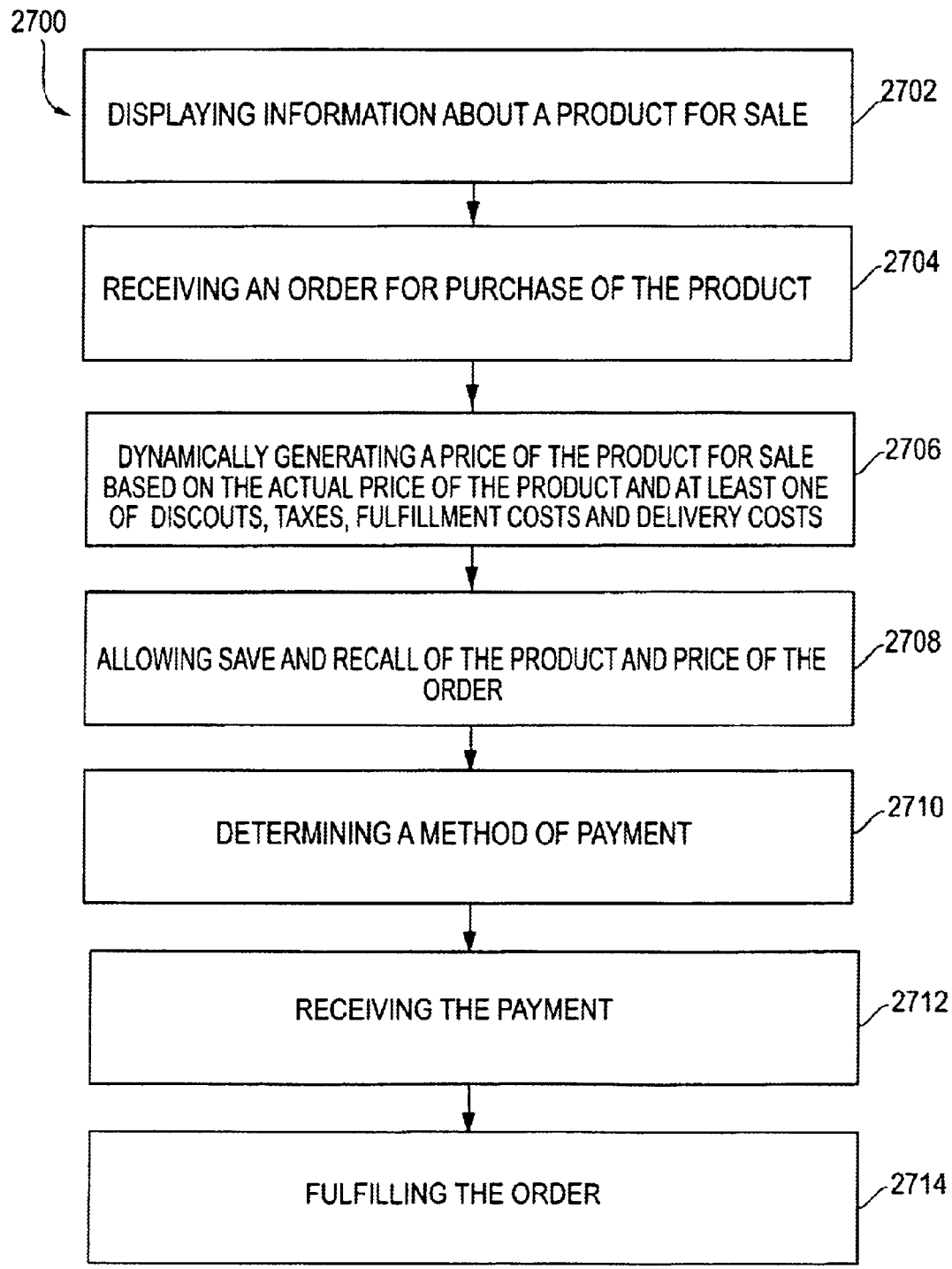
FIG. 27 illustrates a flowchart for a method for completing a transaction over a network in accordance with an embodiment of the present invention.

FIG. 27 illustrates a flowchart for a method 2700 for completing a transaction over a network. Information is displayed information about a product for sale in operation 2702. Upon receiving an order for purchase of the product in operation 2704, a price of the product for sale is dynamically generated in operation 2706 based on the actual price of the product and discounts, taxes, fulfillment costs and/or delivery costs. Save and recall of the product and price of the order are also allowed in operation 2708. A method of payment is determined in operation 2710. When payment is received, the order is fulfilled (see operations 2712 and 2714).

A medium for receiving the payment may be via credit based payment, debit based payment, and/or electronic cash. Additionally, verification of export restrictions with respect to a selected product may also be allowed.

As an option, the ability to review, update, and cancel the order at any time may be allowed. As another option, electronic rights may also be managed. In even a further option, order tracking information about a status of the order may also be provided.

Allowing customers the ability to not just browse and interact but complete the purchased is crucial for a successful eCommerce solution. This section includes many of the capabilities needed to negotiate and perform the entire transaction. The transaction begins when the user takes action to purchase the item(s). From a seller-centric view, the transaction is initiated once the 'purchase' button is selected. The 'buy transaction' may include sub-transactions such as totaling, payment selection, inventory management and purchase authorization.

It is important to recognize some commerce packages specialize in the transaction processing portion of an eCommerce solution. For example, Open Market's OM-Transact, does not provide a catalog interface or any of the infrastructure for interaction with the potential customer. Instead, it will provide an interface for communicating with its transactional infrastructure.

Figure 28:
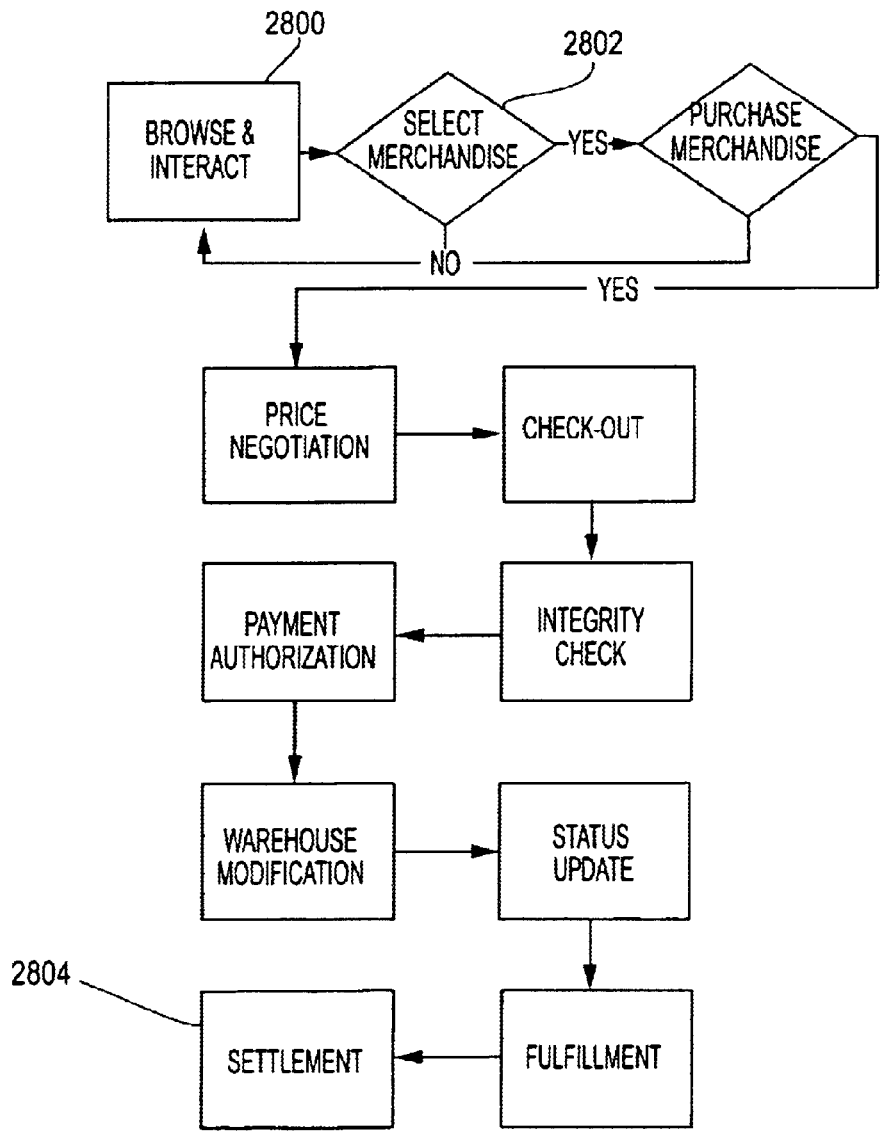
FIG. 28 depicts an example flow of business capabilities needed for complete order processing on an eCommerce implementation.

Each implementation will require specific flow and business logic. The commerce packages available today provide generic order processing business capabilities that will need to be customized to achieve the specific needs of the business. Illustrated in FIG. 28 is an example flow of business capabilities needed for complete order processing on an eCommerce implementation. The process begins with operation 2800 which allows browsing and interacting in order to permit selection of merchandise in operation 2802. The process ends in operation 2804 with settlement.

Merchandise Selection 2600

Some sort of merchandise collection facility is needed. All items of interest should be gathered and organized so they can be reviewed prior to purchase. The most common approaches are an order form or a metaphor such as a shopping cart or basket.

Shopping Cart Metaphor—The user is enabled to select items and add them to his online shopping cart. The items selected will be tracked. The user has the ability to add or remove items, review item details, and check out and total the items. In addition, the shopping cart should allow the user to exit and reenter the store without losing the items he has selected.

Independent of the medium, the following capabilities should be considered:

- Order list and information should be consistent with the merchandising mechanism. If possible, display the merchandise in the same format so it is as appealing as when they order it.
- The customer should be able to save and recall items, pricing, and other order details for the current and previous orders.
- Allow for additional sales and impulse buying. The checkout process is ideal for cross selling or any other form of impulse buying. These capabilities should be integrated to the merchandise selection facility.
- Allow for the ability to review, update or even cancel the order at any point of the selection purchasing flow. The customer should not feel confined or forced to make the purchase.

Check Out 2602

The check out phase begins once the user has decided to purchase or order the items gathered. A variety of capabilities may be required or may affect this process. Listed below are some of the services to consider during the check out processing.

Price Verification

Given the geographically independent environment and multitude of potential customer relationships, many factors may affect the actual pricing. The first step in the transaction is determining the price. The price in most cases will be dynamically generated based on the actual price of the items, taxes, fulfillment or delivery costs, and any other item affecting the price. Ideally, product prices, shipping and handling charges and other charges should be maintained separately. This functionality should include the ability to handle tax-exempt customers and transactions. Sales tax and value added tax logging and auditing capabilities should also be included.

Discounting

In general, pricing is calculated dynamically. Discounts may be applied for many reasons either to specific items or to the entire order. Additional discounts may be given for using a preferred payment mechanism. Other implementations may provide discounts at the end of month based on total sales.

Taxes and Tariffs

The tax issues related to the buying and selling of tangible personal property or services through the Internet, are numerous and complex. Questions include what products and services are subject to tax, when and where to impose a tax on the retail transaction, and what tax (sales or use) the merchant is required to collect. Tax calculation functions with an integrated sales tax or value-added tax (VAT) engine, able to perform real-time calculations based on customer-specified product codes, order point of origin, shipper's address or recipient's address should be considered.

Due to these complexities, most solutions interface with a tax engine to reduce the risk and legalities involved with taxes. Most of the commerce packages available today interface with the leading tax engines.

Shipping Charges

Shipping charges may be applicable for items not fulfilled directly by the site. In some cases, the customer's shipping location may be used to determine their taxes and shipping charges. There are a variety of mechanisms for determining shipping charges. They include:

Price Threshold—Shipping charges will vary according to set price tiers.

Weight—Shipping charges may be determined based on gross shipping weight.

Quantity—Charges may vary dependent on the quantity of items ordered. Items may be free up to a given number or shipping may be free after a given quantity.

Line Item—Designating a specific shipping charge for each line item on the order.

Order Information

Other basic order information may be gathered during the check out processing. The most common method is an order form. The form should be easily customizable and may contain a variety of information.

Order Form Standard online form with the usual questions: Name, Address, shipping location, credit card number, email address, etc. The user usually has the ability to submit or decline the order at this point. Submitted orders should be encrypted automatically by the commerce server.

Customer Information (Establishing Customer Location.) If the basic customer information has not been gathered earlier in the process, it should be gathered before the payment phase. For some implementations, customers may wish to remain anonymous, but this is rare.

Shipping/Billing Address Applications should be capable of supporting ship-to addresses independent of and different from the bill-to address. This allows billing for a product or service to be sent to one location, and the actual product to be delivered to another.

Automated Inventory Management. In some cases, trading partners may set up Automatic Ordering based on usage or schedule. If inventory is used on a regular basis, the re-ordering process may be automated.

Order Validation Inventory checks and verification of export restrictions can be done before the order is placed. Depending on when and how the information is gathered this may be done anywhere along the process flow or as a background event concurrent with the other processes.

Purchase Order Creation If the commerce implementation integrates with an existing system, it may need to generate unique purchase orders. Services to integrate and manage this functionality may be required.

Determine Payment Mechanism Interaction with the user may be required for determining the payment mechanism. Research is currently underway to determine if this may also be automated.

Payment 2604

After a total has been established, a payment method must be determined. A variety of mediums can handle the transfer of money. The methods, flow, technology, and potentially messaging, will vary by implementation. Issues concerning security, liability, and relationship to fulfillment need to be worked out.

Listed below are some considerations for determining the payment flow and mediums to be utilized.

Anonymity. If there is a need to allow the users to remain anonymous, an anonymous medium may need to be implemented. Implementations such as a silent bidding site may require strict standards and mediums for anonymity. In general, anonymity is not a concern for most implementations.

Monetary Transaction Size. If the site will be handling very small or very large monetary transactions additional considerations will be required. Sites accepting micro value transactions will need to plan a process to collect and verify the payment. To make low-value transactions cost effective, solutions may sacrifice security. In some implementations, it is assumed "some" fraud will occur but in such small denominations as to be negligible.

Transaction Cost. Depending on the payment method, there are numerous potential associated costs. Most mediums have either transaction costs or may involve a broker requiring additional fees. Understanding the costs associated is important when planning an efficient payment system.

Audit Trail. Some implementations may record each transaction with a unique identifier used to track funds if necessary.

Security. In the past, eCommerce has been hampered by the absence of secure and robust transaction options. Recent development of secure online payment options over the Internet have been a primary enabler. Strongly-encrypted online purchase transaction protocols have been developed and integrated into software for consumers, merchants, and banks to enable secure credit card transactions.

Consumer Type. The types of flow and payment medium will vary greatly depending on the consumer or purchaser. B-C implementations require payment (or at least authorization) once the order is placed. For the buyer-centric, trading partner relationship, the established infrastructure may handle payments using traditional invoicing or an Internet-enabled form of EDI or EFT (Electronic Funds Transfer).

Electronic Authentication. Some sort of digital signature strategy would need to be in place between trading partners and potentially the financial institution.

Message Standards. Payment instructions must be recognizable to all parties involved.

Payment Methods

There are a multitude of different vendors and technologies available for handling electronic payments. The infrastructure, process, and technology may vary dramatically from vendor to vendor. The actual mediums for the current payment options fall into these categories:

Credit-Based Payment. Today, the most widely-used electronic payment option is the credit card. With the new transaction protocols and security features, credit cards can be used on the Internet just as they are in the real world. Consumer confidence is higher with the already familiar standard. Current overhead for clearing, settlement and fraud makes credit card based solutions uneconomical for transactions of small dollar amounts.

Debit-Based Payment. Payment utilizing this method will directly debit and credit accounts. These may take the form of debit cards, electronic checks or messages utilizing EDI or EFT.

Electronic Cash. Electronic cash is the electronic equivalent of real paper cash. It is usually implemented using public-key cryptography, digital signatures and blind signatures. Electronic cash is "digital" money on the computer's hard disk. Theoretically, the money could be spent in very small increments, such as tenths of a cent (U.S.) or less. In an electronic cash system there is usually a bank responsible for issuing currency, consumers that obtain cash from either banks or brokers and merchants who will accept the digital cash for goods and services. In short, the bank, merchant and consumer each own a public and private key which is used to encrypt and digitally sign the electronic cash.

Smartcards. A smartcard is a programmable storage device the same in size and appearance as a normal credit card. It contains a microchip to store and process information. Some of these cards can contain stored value in the form of digital coins. A lost card means lost value, just like cash. The person holding the card can spend the value stored on it at any merchant accepting smartcards. This technology is particularly useful for online shopping, and is far less vulnerable than systems storing value on a hard disk. Transaction costs for this form of payment are very low, enabling the user to conduct micro-transactions of one penny or less. Microsoft and several computer manufacturers are pushing for standards to incorporate smartcard readers into PC keyboards, and most TV set-top Internet access devices already have them Digital Wallets. Digital wallet software facilitates secure, online transactions between the consumer and the merchant, and between the merchant and the bank. For the consumer, there will soon be literally hundreds of software "digital wallets" available. They will likely be free and similar in function, running within a web browser.

Payment Authorization. In many cases, consumer sites which implement a credit card payment method will require payment authorization. In some cases the actual settlement process can not occur until the items are shipped.

JEPI, being developed by W3C and CommerceNet in cooperation with many large technology companies, is a standard mechanism for Web clients and servers to find out what payment capabilities they have in common, and negotiate the payment instrument, protocol, and transport between one another. This will be transparent to the user; they will simply be told by the wallet software what payment options are available at this merchant (along with any available discounts for payment type or membership affiliations), and asked to choose.

Fulfillment 2606

The fulfillment process can be complex and will vary depending on the type of goods being delivered. Integration to existing systems as well as communication of invoices and orders to distributors or trading partners will play an important role.

A tremendous amount of communication and back end processing will be needed. Often implementing an eCommerce environment opens the doors to review the underlying systems and processes. Potential areas include warehouse notifications and P.O. delivery. Print, fax, or sneaker net systems may be upgraded to EDI, email, or another electronic medium. Updating and improving these processes will be critical for providing customer support. Users will come to expect the ability to see the progress of their order as it moves from the site to warehouse to their desktop.

Electronic Distribution

Soft goods may take the form of information, software, graphics, music or any other digital content. Many traditional content providers have imported their content to the Internet. Although the revenue generation is less than what they achieve through their traditional channels of distribution, publishers and other entertainment providers have found the Internet offers a richer, more interactive environment to present their content. The Internet provides consumers the ability to search, evaluate, transact and personalize the content. The Internet will continue to be adopted as an effective distribution channel.

Site Subscription

A very simplistic form of soft goods fulfillment may be achieved by allowing the user access to the site. Functions to handle permissions and access would be required to prevent unauthorized users or actions.

A site subscription may be based on different metering technologies. Internet metering technologies can be divided into two categories: observational metering and usage metering. Observation metering measures site activity while usage metering measures the usage of items such as files, bytes or time.

Electronic Rights Management

Owners of digital content, including authors and publishers, have been searching for a method to protect against the unauthorized distribution of their works over the Internet. Most content available on the Internet today is freely distributed, often without consideration of the content owner's copyrights and appropriate royalties. Protecting Web content is a difficult task. Items such as copyrighted words, images and other 'digital' objects need to be protected from unauthorized (and endless) duplication. Currently, copyright notices can easily be stripped away. There are a few recent developments aimed at tracking rights violations.

Some rights management methods are geared toward identifying legal and illegal uses of a document or digital object. These concepts still require actively searching the Web for signs of abuse. In essence, the methods still allow the content to be extracted and used, basing the majority of the security on trust. Other approaches place a 'security wrapper' around the content so it can only be accessed by authorized users.

Digital Watermark—The most common method is to add a digital 'watermarks'. The watermark is embedded in the background of the image without changing the overall appearance of the image. An agent, sometimes called a "spider" because of the way it crawls the web, can be used to scan the Internet for the presence of the image or identifier and report unauthorized URL's. The watermark will stay with the image, even if it is downloaded.

Digital Object Identifier (DOI)—This method would associate a unique identifier with the digital content. The identifier would be permanently associated and could potentially be as low level as a paragraph. The DOI concept is only a building block and would still need to be incorporated into a rights management system.

Digital Fingerprints—A digital fingerprint is an invisible record of who "touched" an electronic document. Services would be needed to determine who first misused the document (such as by improperly copying or distributing it). Fingerprinting electronic documents is content-dependent and is easiest for document types with a large number of bits.

Secure Packaging—This concept prevents the use of the information by placing the item in a logical security envelope. The user may gain access to the information based on the requirements of the security envelope. The security will allow the user to see the abstract, price, rules for use, and other pertinent information. Upon agreement of payment and/or rules by the end user, the user will obtain a key to unlock the document contained within the security envelope.

Customer Services 1012

Figure 29:
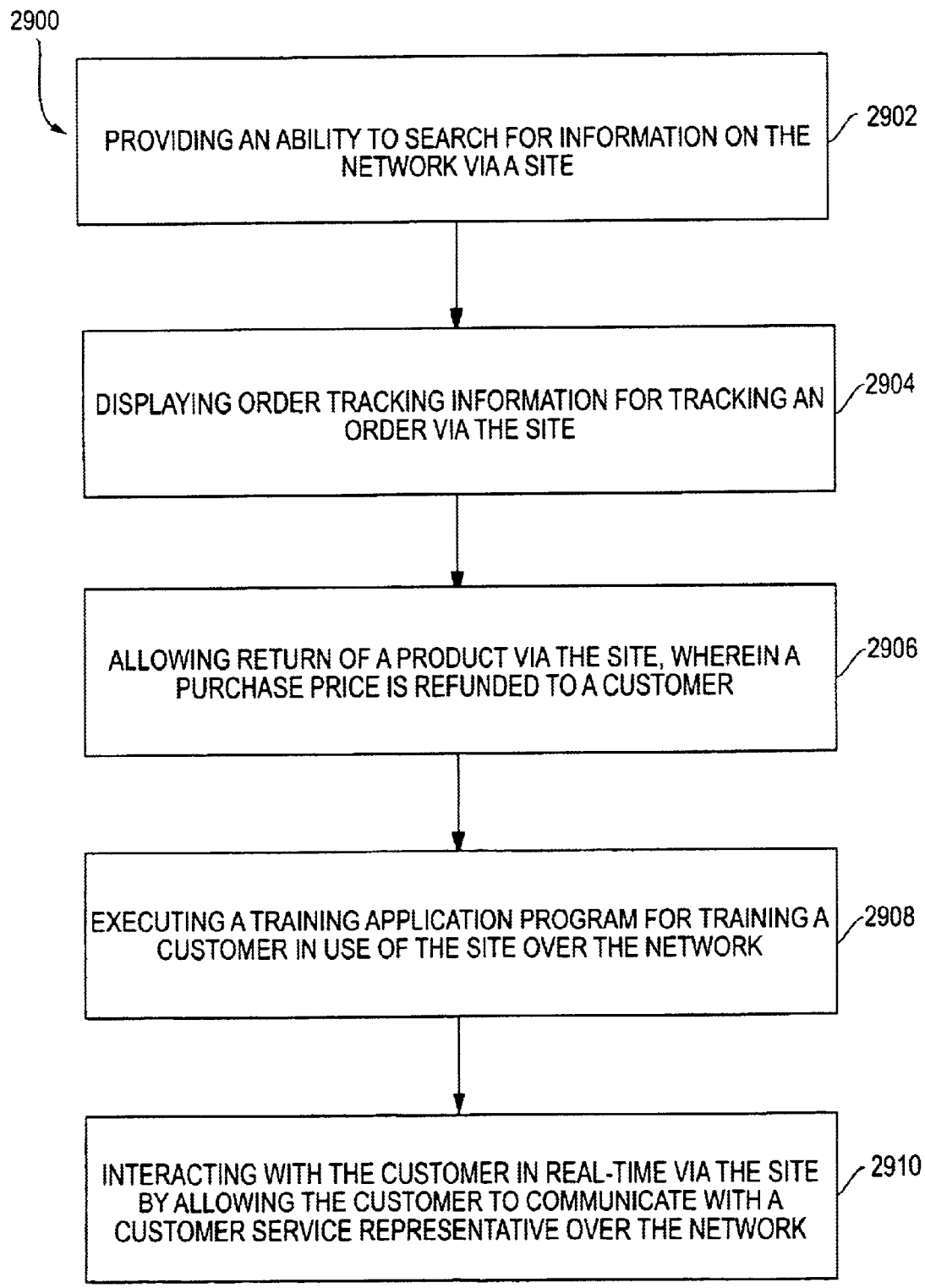
FIG. 29 illustrates a flowchart for a method for electronically serving a customer over a network in accordance with an embodiment of the present invention.
Figure 30:
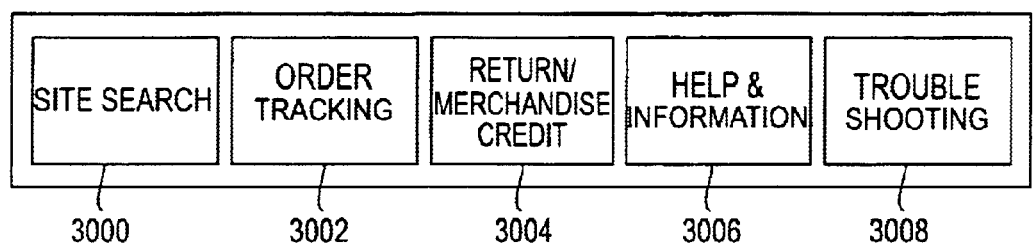
FIG. 30 illustrates key customer services of the Customer Services portion of the eCommerce Application Framework.

FIG. 29 illustrates a flowchart for a method 2900 for electronically serving a customer over a network. An ability to search for information on the network is provided via a site in operation 2902. Order tracking information for tracking an order is displayed via the site in operation 2904. Return of a product is allowed via the site with a purchase price refunded to a customer in operation 2906. A training application program is executed in operation 2908 for training a customer in use of the site over the network. Interaction with the customer occurs in real-time via the site by allowing the customer to communicate with a customer service representative over the network in operation 2910.

The information capable of being searched may include product information and also a status of the order. Also, the customer may communicate with the customer service representative by way of a chat room.

As an option, the purchase history information may also be compiled and displayed. As another option, information including policy documentation may also be provided. As an additional option, an on-line bulletin board may be provided for allowing input from a plurality of customers.

This category includes any component of the solution meeting a user's need normally filled by a human customer service representative. These services fall across the marketing, merchandising, order processing, and other categories. The customer service aspect of eCommerce is as important as selling the actual products. Just as in the world of the paper bill, a lack of customer service, or poor customer service, can destroy any relationship the user has established with the electronic business.

The business drivers for customer service are:
increased customer satisfaction
reduction of support personnel
increased functionality
timely information and service Conducting commerce on the Internet means allowing direct access to the system and its data. New users may have a much lower tolerance for hard to understand interfaces and site layout and may require considerable help understanding what information exists on the site and how to find it. Customer service will continue to be a key component in maintaining customer relationships.

There are a variety of different services to enhance customer service. Which services should be implemented are dependent on the goals and characteristics of the site. Below are listed the key customer services, which are also found in FIG. 30.

Site Search 3000

Search engines have become a popular component of any information-intensive site. The ability to lead a user to the type of information he is looking for will not only make the interaction more efficient but enhance the customer relationships. "Search" is a generic term and may be used for searching for a specific product or may be implemented to search for a specific customer's order or other information.

Order Tracking (Order Management) 3002

Providing customers the ability to track their orders can provide tremendous benefits in reduction of support personnel and building customer relationships. Applications of this nature can range from simple to complex depending on the level of detail. The order tracking system should be integrated within the order processing's innate workflow system. Purchase history functions may also be provided.

Return Merchandise/Credit 3004

If the site sells goods, there is always the possibility of the customer returning the merchandise. As with most exception processing, this can create numerous problems, though the return should be allowed. Actually crediting a smartcard or replacing digital currency may be very difficult. The legalities and procedures should be thought out and documentation provided.

Help & Information 3006 and Troubleshooting 3008

There is a tremendous amount of help and information features a site may provide. Listed below are some of the more common examples.

Policy Documents—Documentation stating the policies of the site. In some cases this is required for legal reasons. In general it is important to layout the site's policies and procedures.

Email/Comments/Contact Merchant—Providing mechanisms where the user can easily contact the site is a good practice. Valuable input and comments can be gained from the actual users. Some implementations may allow users to rate site content. This functionality can be thought of as a virtual suggestion box.

Online Help and Training (Site navigation)—Whether the site is Intranet or Internet, the users should have the ability to gain help on navigation and usage of the site. In more robust cases, interactive training may be offered if it will improve site performance and utilization.

Store Locator—Many customers may use a site for pricing and product research and may not be comfortable purchasing items over an electronic medium. If the site has brick and mortar store locations, provide a facility for the tentative consumer to find them.

Trouble Help Desk—Most help desk functions can be provided through a web site. These services can range from simple documents, such as trouble shouting guides and FAQs, to complex applications.

Collaboration Services

Behind security, one of the leading reasons a customer will not 'transact' online is the lack of human contact.

Although unbelievable to most technologists, there is still an underlying fear of computers hidden in a large percentage of the potential consumer base. Currently, most seller-centric sites do not provide a truly two-way, interactive, or collaborative environment. The site may have a complex form of personalization which will filter and deliver content geared to the specific user, but in most cases will not provide real-time customer interaction. Interaction may be delivered in the following methods:

Customer Service Chat—Service provided to interact directly with the customers through the site. In the simplest form this may be a real time, textual chat function letting hesitant shoppers ask questions to either a service or sales representative. Technology and bandwidth considerations would have to be reviewed before audio or video type solutions could be considered.

Community—An online community of interest for customers. The purpose of a community is to build an interest in the site so the customers will return simply to interact and gain information (and potentially purchase items). This may include additional information about the products or industry not normally included in the traditional merchandising approach.

For additional detail on collaboration services, please refer to the Collaboration Delivery Vehicle in DAF, found above.

Security 1014

Figure 31:
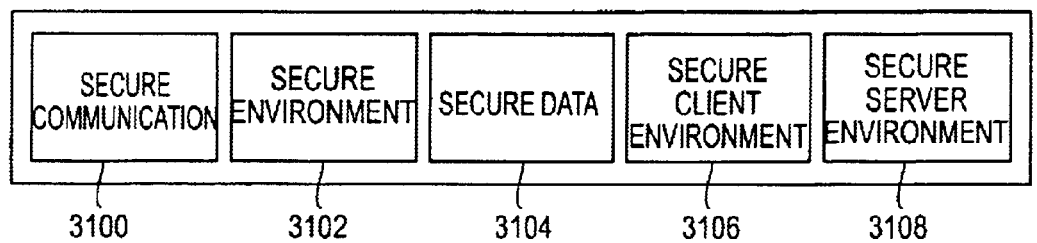
FIG. 31 illustrates the Security component of the eCommerce Application Framework in accordance with one embodiment of the present invention.

FIG. 31 illustrates the Security component 1014 of the eCommerce Application Framework in accordance with one embodiment of the present invention. Its various subcomponents are discussed below.

Figure 32:
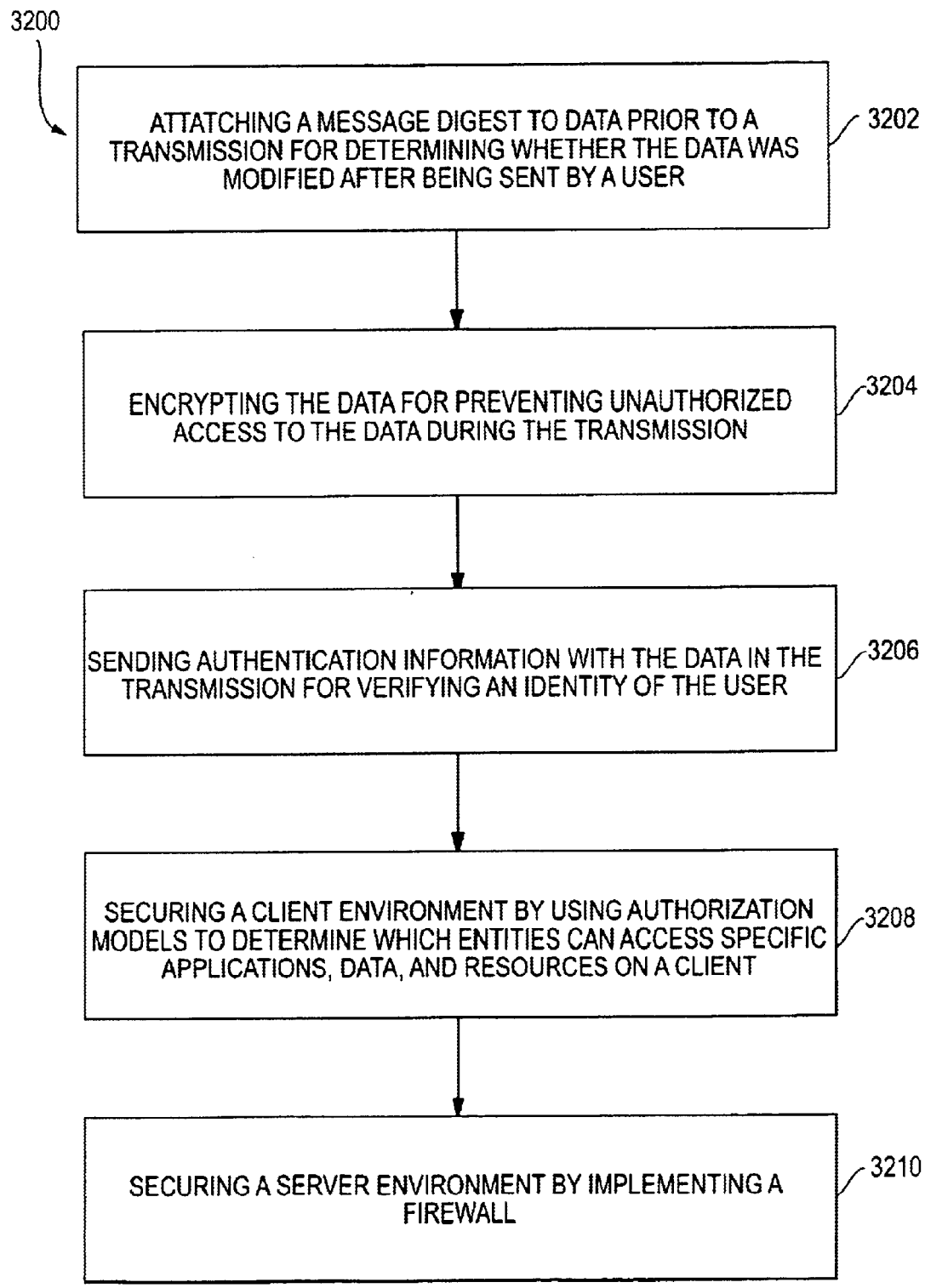
FIG. 32 illustrates a flowchart for a method for ensuring security of an e-Commerce system on a network in accordance with an embodiment of the present invention.

FIG. 32 illustrates a flowchart for a method 3200 for ensuring security of an e-Commerce system on a network. In operation 3202, a message digest is attached to data prior to a transmission for determining whether the data was modified after being sent by a user. The data is also encrypted in operation 3204 for preventing unauthorized access to the data during the transmission. Authentication information is sent with the data in the transmission for verifying an identity of the user in operation 3206. A client environment is secured by using authorization models to determine which entities can access specific applications, data, and resources on a client in operation 3208. A server environment is secured by implementing a firewall in operation 3210.

The message digest may include a log of times when modifications to the data occurred. The authentication information may also include a digital signature. In addition, the authentication information may further include a certification. Further, the certification may include a user identifier, a service identifier, a public key which is used to verify the digital signature, a name of an issuer of the certification, a period which the certification is valid, and an email address.

In the last few years, computer crimes have exploded—hackers have defaced the web site of the CIA, stolen information and software from NASA and the Pentagon, and made unauthorized wire transfers causing banks to lose millions. According to WarRoom Research, financial losses from computer crime run at $10 billion a year. Historically, 80% of security problems have been internal ones—either from employees exceeding their level of authorization or ones that are disgruntled. Netcentric computing and eCommerce are increasing the risks due to rapidly evolving technology infrastructures. As access to corporate systems is extended virtually and new security holes are discovered daily, security issues become complex.

eCommerce, while providing immense potential business advantages, may also expose businesses to significant risks. If their systems are broken into, they are at risk to financial loss, embarrassment, lost customers, and potential legal liability. Businesses often hesitate to take advantage of eCommerce because they fear security problems. Although security technologies are continually evolving to mitigate these eCommerce security risks, security breeches occur because businesses fail to implement an appropriate mixture of security solutions.

The problems associated with connecting the network to the vast Internet are widely published. Hackers abound, and new methods for compromising networks are published almost daily. However, what about connecting the network to a partner for project collaboration, or perhaps a supplier for automatic inventory control? One might trust their supplier, however, does one really know how well their network is secured? Contracts and Service Levels can and should deal with many of these issues, however, technology can also be used to enforce security policies.

Once the correct mixture of security solutions has been implemented, the company will experience many benefits besides peace of mind that their site is secure. Security also allows people to conduct business functions over the Internet which previously could only be done in person or with a more private connection. This allows expansion into new markets and new business capabilities, increases efficiency, and reduces the cost of doing business. For example, in the typical electronic storefront scenario, security is enabling an unknown buyer and seller to exchange goods with a reasonable assurance that the transaction will be honored on both ends. Security can also be a selling point for a company's eCommerce services. By demonstrating an increased level of trust and reduced exposure to fraud, a customer may choose one merchant's services over another's. Furthermore, eCommerce technologies rely on electronic automated security rather than imprecise procedural security. This can result in more reliable processing and fewer errors.

Unless customers and users feel the system is secure and there is little to no risk involved with using the system, the implementation will not be successful. Depending on the system, the amount of security in the different security areas will vary. By securing all aspects of the site, it will make it extremely difficult for an intruder to work their way into the system without being detected. There are a number of different approaches which can be employed to provide system security. Among the most common, are firewalling, encryption, and authentication. Each provides a particular type and degree of security, and in many instances it makes sense to use multiple technologies together to achieve the desired result. Security must be built into a system extremely carefully in order to be effective.

The details of security in eCommerce will be discussed in terms of five eCommerce cross-component application types. The five application types discussed are:

Advertise Product Online

Collaboration

Interactive Customer Service

Internet Home Banking

Online Storefront/Product Sales

FIGS. 33–42 illustrate these five application types. The Figures are grouped in consecutive pairs in which a sample architecture will be shown in a first Figure and the following Figure will be a security architecture that may or may not be created by modifying the immediately previous sample architecture. The organization of the pairs of Figures is as follows: FIGS. 33–34, 35–36, 37–38, 39–40, 41–42.

Secure Communication 3100

Visa® and MasterCard® have jointly developed the Secure Electronic Transaction (SET) protocol to allow secure, cost-effective bank-card transactions over open networks. SET includes facilities for:

- Purchasing goods and services electronically
- Requesting payment authorization
- Requesting certificates for authentication Consumers get their encryption keys using a specific program integrated into their browser. This program automatically converts a consumer's credit card number into a certificate given by Visa or MasterCard. This certificate contains a key and will be attached permanently to the browser of the consumer.

Then, for every transaction the consumer asks the merchant to send his certificate, and the merchant can ask the consumer's bank for authentication with the customer's certificate.

Full implementation of SET requires certificates be issued for each credit card a consumer wishes to use on the Internet. This raises enormous administrative challenges, as well as the problems involved in achieving this level of universal adoption.

Secure Environment 3102

There are different technical approaches for Internet security. The end goal of the security technologies is the same. It is important to pay attention to the approach and questions that they try to answer. For example Secure Socket Layer (SSL) and Secure HTTP (SHTTP) have been viewed as competing technology. SSL uses the TCPI/IP protocol to provide transaction security at the transport level. Security properties are linked to the channel of communication between the two parties. The issue they are addressing is channel privacy for a conversation or transaction. SHTTP provides transaction security at the document level. Each document is designated as private by the sender. This approach is addressing the question of authentication and authorization of web transactions.

Secure Data 3104

The first area to secure is data. It has to be ensured information is protected from unauthorized access. This is mostly important when sensitive data, such as credit card numbers or business figures, are transmitted. Data usually passes a long way before reaching its final destination and can easily be read by a third party. Data, therefore, has to be encrypted before transmission. Today several encryption techniques are used which ensure the data is unusable if intercepted.

In addition to encrypting the data, the parties involved in an electronic transaction need to know that the data received or sent is secure. Authentication techniques require the identities of the sender and receiver are known and the information sent arrives unaltered. Authentication can be accomplished with both the use of a message digest and a digital signature. Details on some of these techniques are discussed below.

Cryptography

Cryptography is an essential component in securing data. In the most basic sense, cryptography is encrypting and decrypting data using an algorithm(s) or key of some sort. Encrypted data is useless without the key to decrypt it. Today several encryption standards exist utilizing a wide variety of algorithms and keys. Details on some of the different methods can be found in the Security for Internet Electronic Commerce Security Technology Handbook.

Message Digest

A message digest is used to make sure no one has altered the message between transmission and reception. It is used to provide data-integrity. A digest is associated with a sent message. The recipient can re-compute the digest and compare the new one with the sent one. If they match, the message has not been tampered during transmission. The algorithm used to compute digest must be the same for the sender and the recipient. A message digest is a short, fixed-length digital code derived in a one-way fashion from a longer variable-length message. As a result, it is impossible to determine the original message on the basis of the digest or to find a different message with the same digest.

Digital Signature

Digital signatures ensure the message recipient only the sender of the message could have sent it. The sender signs a message by encrypting a digest of the message with their private key. No one but the particular sender could have generated the digest corresponding to the message. This provides authentication of the sender as well as non-repudiation of the origin. Encrypting a message digest also links the signature with the message content. The sender can't claim they did not send the message or the message is not the one they sent.

Certification

Some security techniques may require the use of a public key for encrypting data. When using a public keys, issues may arise with key management and verification. Often a trusted third party will be needed to issue a Certification Authority (CA) for keys and signatures. Certification Authority declares which public key and signatures belongs to which users and services. Because a user needs the CA public key to check validity of certificates, CA must provide a way to safely deliver its own public key.

A certificate typically contains:

- User and service identifier
- Actual public keys
- A public key, which can be used to verify the digital signature of a message sender
- The name of the issuer, or Certification Authority
- The certificate's validity period
- Other identifying information such as email address

Secure Client Environment 3106

The client environment should also be secured. Since systems may be open to public use, and accessible to a large audience, it could be subject to new types of attacks. An environment must have security mechanisms in place to control who can access it as well as controls on the actions these users may perform. This may be achieved using authorization models. Authorization models are used to determine which entities (for example, people or applications) can access specific applications, data, or resources.

With the onset on Netcentric computing, entire applications or other forms of executable content may be downloaded across a network. This style of computing introduces a variety of security concerns. Downloads may come in the form of applications, applets, ActiveX controls, scripts and a variety of other software. It is important to understand the different security concerns with the downloads.

Java Applets

Java is designed for developing programs to run on many different kinds of computers connected together in a network. A Java Applet is a special kind of Java program attached to a Web page. Applets are embedded into a Web page's HTML definition and interpreted by Java-enabled browser. It is possible to have users download the applet from the Web and run the program locally.

Running some unknown person's untrusted code is also inherently dangerous. For this reason, Java restricts the behavior of Applets to a set of safe actions (Safe applets are labeled as trusted applets). The Java security model restricts an Applet as follows:

Applets cannot make direct system calls

Applets are forbidden to:

1. access the file system
2. open sockets (except on the originating server)
3. interfere with other applets
4. spy on the local environment Because of its built-in security model, Java addresses these risks head-on. Unfortunately, there are still holes in Java's security model which allow some risks. For example, applets could be created to perform various harmful acts:

Denial of service; This kind of hostile applet takes all the available system resources of the user's machine Invasion of privacy; These Applets can publicize private information.

Annoyance; These types of Applets play sound files, display graphics, or create endless windows.

ActiveX

ActiveX is a technology developed by the Microsoft Corporation for distributing software over the Internet. Like Java Applets, an ActiveX "control" can be embedded in a Web page, where it typically appears as a smart interactive graphic. Unlike Java, which is a platform-independent programming language, ActiveX controls are distributed as executable binaries, and must be separately compiled for each target machine and operating system.

The ActiveX security model is considerably different from Java Applets. ActiveX places no restrictions on what a control can do. Instead, each ActiveX control can be digitally "signed" by its author in such a way that the signature cannot be altered or repudiated. The digital signatures can then be certified by a trusted "certifying authority", such as VeriSign, to create the equivalent of a shrink-wrapped software package. If downloading a signed ActiveX control causes a machine to crash, the responsible party will be identifiable.

This security model places the responsibility for the computer system's security on the user. Before the browser downloads an ActiveX control that has not been signed at all, or has been signed but certified by an unknown certifying authority, the browser presents a dialog box warning the user this action may not be safe. The user can abort the transfer, or may continue the transfer and take his chances.

Scripting Languages

Internet scripting languages are programming languages embedded in HTML pages and are interpreted by the user's browser (for example, Netscape Navigator or Microsoft Explorer). Typically, they are dedicated to control the user's interaction with an HTML document, for example when:

Processing mouse events

Opening new windows

Checking forms

Interacting with other active content

As scripts are pieces of code from a foreign source executed on the user system, they raise security issues. Indeed, a user must be sure a downloaded script will not perform malicious actions against his system. Scripting languages designers have to manage the balance between security achieved through restriction, and language capabilities.

Secure Server Environment 3108

Securing the server environment will depend upon the technology and architecture of the implementation. Techniques and security models exist for the different methods of server-side computing. Included below is basic security information for some of the different technologies.

Internet Firewall

A firewall is used to protect a trusted network from an untrusted network. Typically, the two networks in question are an organization's internal network (trusted) and the Internet (untrusted). A firewall is a system or group of systems that enforces an access control policy between two networks. A firewall is a collection of components or a system placed between two networks and possesses the following properties:

All traffic from inside to outside, and vice-versa, must pass through it;

Only authorized traffic, as defined by the local security policy, is allowed to pass through it;

The system itself is immune to penetration.

Common Gateway Interface (CGI)

Common Gateway Interface (CGI) scripts are a way of processing information submitted to the web server using a form. A CGI script can be written in any language able to use standard IN and OUT streams (usually Perl or C shell). To process a form, the client first submits the information content to the server. On the server, a CGI script reads the form contents, then uses it to write a new HTML page, which is sent back from the server to the client. Security problems with CGI scripts occur on both the client and the server sides.

CGI Client Side

Submitting a form to a CGI script, which is located on a server, implies the sending of the contents of this form over the Network. If the channel used is not safe, form content can easily be read and perverted. Any way of securing the channel, such as SSL, PCT, or S-HTTP, can be used to achieve confidentiality of submitted information. As these protocols must be implemented by both client and server, a user must check the server is able to secure the channel. Current popular browsers are able to warn the user if information is being submitted in an unsafe fashion.

CGI Server Side

Processing a form on the server, using server resources, such as system commands, can lead to security holes. Indeed, forms can be full of malicious content causing the server to perform confidential information delivery, server crashes, or unauthorized accesses.

The only way to protect a server from attacks through CGI script is to be very careful when writing, testing, and using CGI scripts. As far as possible, CGI scripts should avoid executing system commands. Each submitting entry should be checked and analyzed before being processed. Script sources must be hidden as analyzing the source of a script is the best way to find an efficient attack through it. On multiple user systems, the right to install CGI scripts should only be granted to the administrator or trustworthy users.

Common Object Request Broker (CORBA)

The Common Object Request Broker architecture is an open distributed object computing infrastructure standardized by the Object Management Group. CORBA specifies the interfaces, structures and policies used by distributed objects (components) to communicate independently of the language, operating systems, machine, or network.

The CORBA 2.0 specification presents a good set of security policies which provide authentication, data integrity, confidentiality and non-repudiation. The standard leaves to the applications the problem of handling the non-repudiation policies without conforming to the ISO specifications. The standard does not thoroughly solve the problem of interoperability between different security domains.

Distributed Component Object Model (DCOM)

The Microsoft Component Object Model (COM) provides a model based on Object Technology, to manage inter-process communication on a local computer. Microsoft's Distributed Component Object Model is an extension of COM, supporting the distribution of collaborative processes over a network.

Security issues in DCOM concern:

Security for communication; Inter-process communication messages are sent on potentially unsecured networks like the Internet.

System administration considerations; Using a DCOM-aware application involves the possibility for a user to manage processes on others systems. This must not conflict with the user's rights on each system.

Remote Method Invocation (RMI)

The Remote Method Invocation allows a programmer to create distributed Java-to-Java applications. This allows remote Java objects to be invoked from other Java virtual machines, even those on different hosts. A Java program can call a remote object only when it has obtained a reference to that remote object. This can be done by:

Searching for the remote object using the bootstrap naming service provided by RMI.

Receiving the reference as an argument or a return value.

A client can call a remote object on a server, and that server can also act as a client when calling other remote objects. As RMI both implies execution of foreign code and communication over a network, deploying RMI requires a secured environment and secured communication.

The RMI specification does not define any security features for distributed transactions. In order to secure the transfer of information between hosts located in different address spaces, some security features need to be added to the specification.

Advertise Products Online

Figure 33:
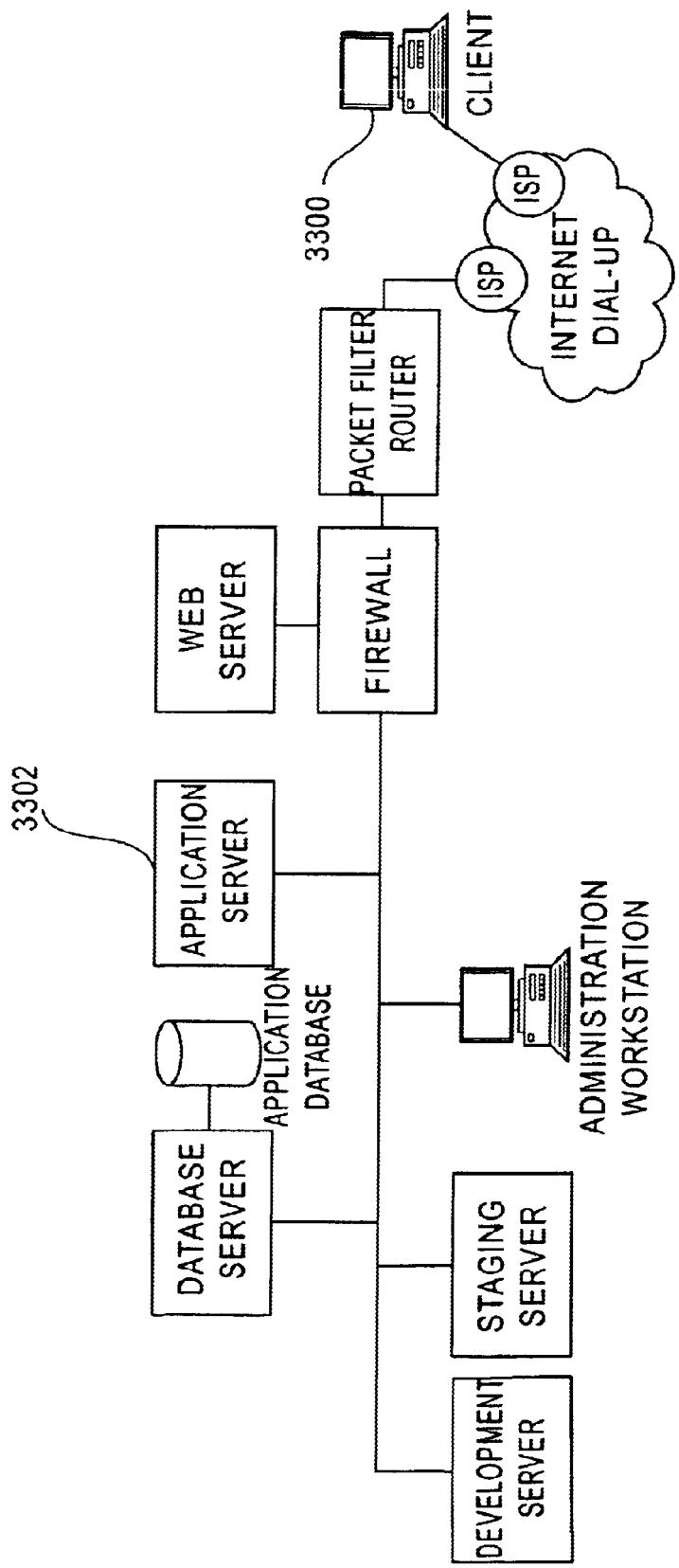
FIG. 33 shows a sample architecture in an online advertising scenario.

In the sample architecture shown in FIG. 33, a potential customer 3300 will access a corporate web site for some sales information. This is an information source only, no transactions (exchanges of value) can be performed. Internet users will surf to the advertising site, and click on various links within the page to get more information on particular products. The web server can make requests from the application server to serve dynamic pages to the user. The application server can pull information from the database if detailed product information is requested. Site administrators develop content on the development server and test it on the staging server.

Functional Description

1. Customer launches a web browser and goes to the retail venue's web site
2. With a cookie, the retailer's application server 3302 can identify the customer and choose a merchant to display on the front page. In addition it can tailor the merchant's interactive catalog of products to highlight those products which would be of interest to the customer
3 Customer selects items and gets a detailed description of the item including its price and nearest store location or a phone number to order online.

Security Business Priorities

Preventing the web site from being vandalized

Assuring the web site is available to potential customers at all times

Figure 34:
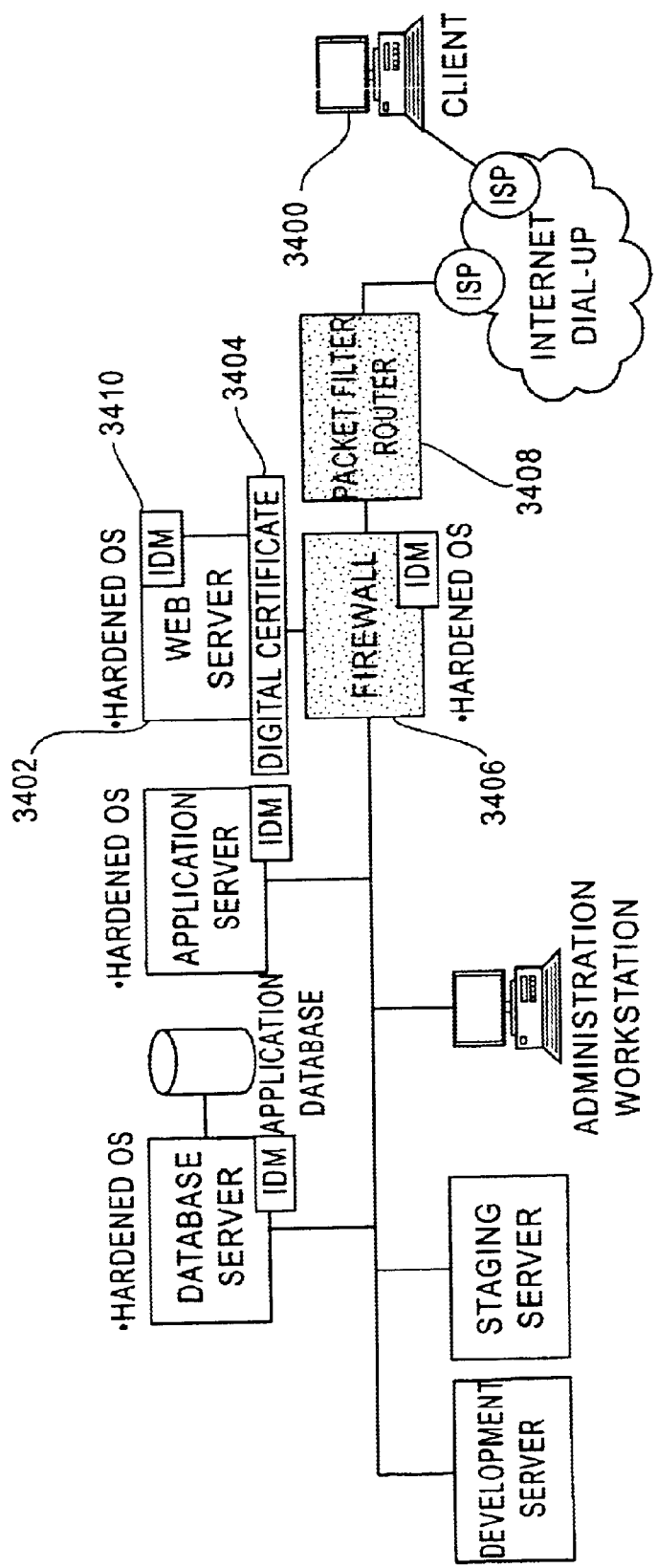
FIG. 34 illustrates an exemplary security architecture in an online advertising scenario.

Public perception that the company and web site is providing proper and effective security An exemplary security architecture is illustrated in FIG. 34. This architecture is superior to the architecture of FIG. 33.

Security Technical Description

Encryption services are not implemented in this architecture because no confidential information is sent between the customer 3400 and the web site.

Authentication services are provided at the company's web server 3402 with a server side certificate 3404 signed by a leading CA provider. Customers are not authenticated. Internal users (i.e. administrators) are authenticated with their NT domain logon.

Access control is provided by a firewall 3406 at the entry point into the company's internal network. A packet filter router 3408 is located before the web resources to limit traffic to HTTP only. In addition all sensitive servers in the architecture (firewall, web, application, database) have hardened operating systems implemented either with a specific secure server or an add on software package.

Auditing services are provided in real time with Intrusion Detection Modules (IDM) 3410 on all critical services. Off line auditing is provided with operating system security scanning tools to identify vulnerabilities.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)

A security policy is necessary to provide direction on what assets should be secured and what threats are of most concern.

Security standards are necessary to assure a consistent, secure configuration across multiple platforms and applications.

Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individuals fulfilling security roles in the architecture. User training information should also be developed and distributed in an easy to read and implement manner. Special attention should be paid to the legal requirements for any disclaimer or policy statements which must be presented to the customer when accessing the site.

Collaboration

Figure 35:
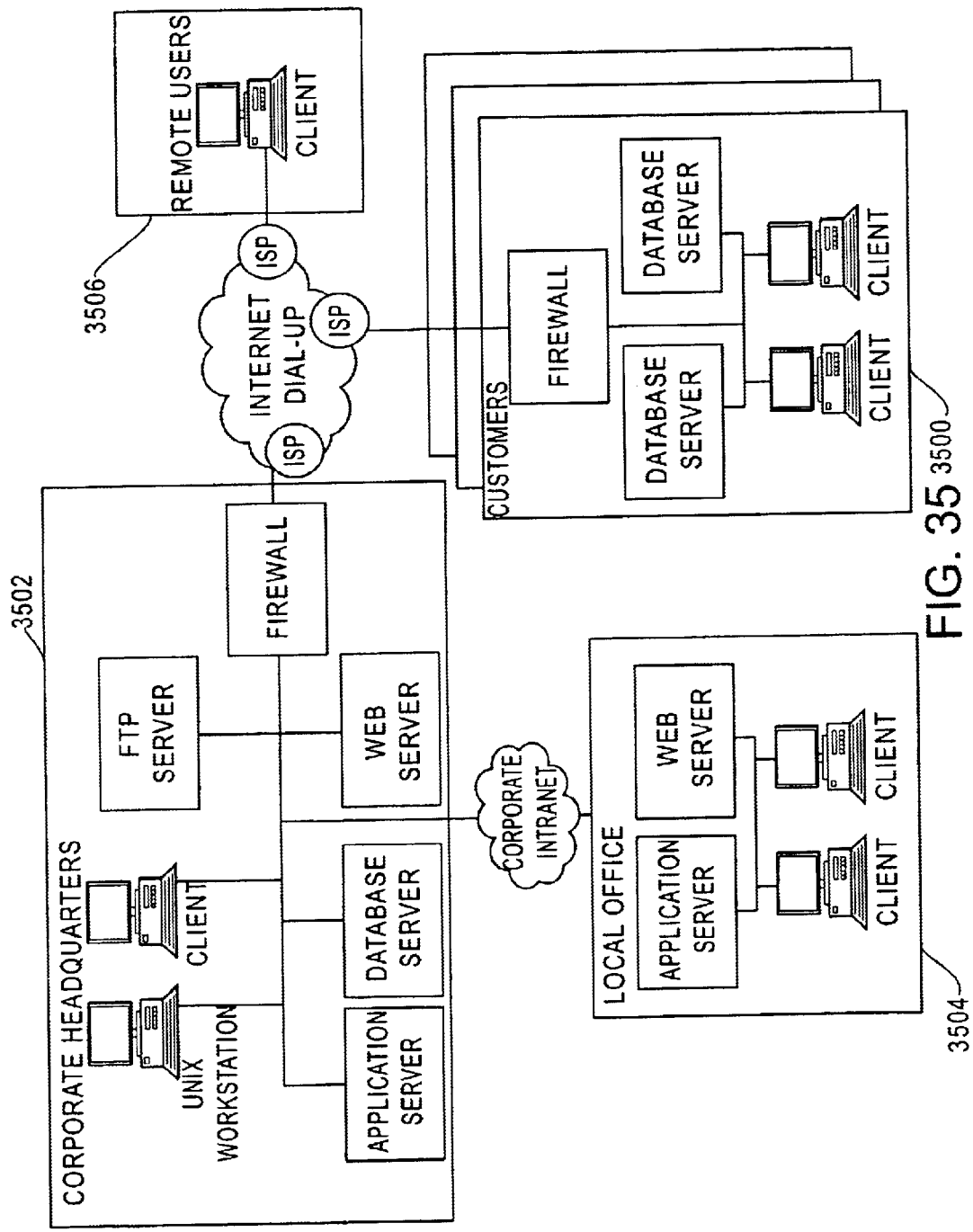
FIG. 35 depicts a sample architecture providing direct network access to several of customers in order to share specifications, distribute engineering designs, and collaborate on works in progress.

In the sample architecture shown in FIG. 35, a silicon chip designer wishes to have direct network access to several of their customers 3500 in order to share specifications, distribute engineering designs, and collaborate on works in progress. Corporate employees from headquarters 3502, local offices 3504, or from a remote location 3506 can access information stored on the web server or the back end database server. Employees also have the ability to access the simulation application which is web enabled. Customers may access design information that is posted on the web server, but cannot access back end systems. The customer may also post information on their own web server or database server to provide detailed specifications or information to the chip manufacturer.

Security Business Priorities

Figure 36A:
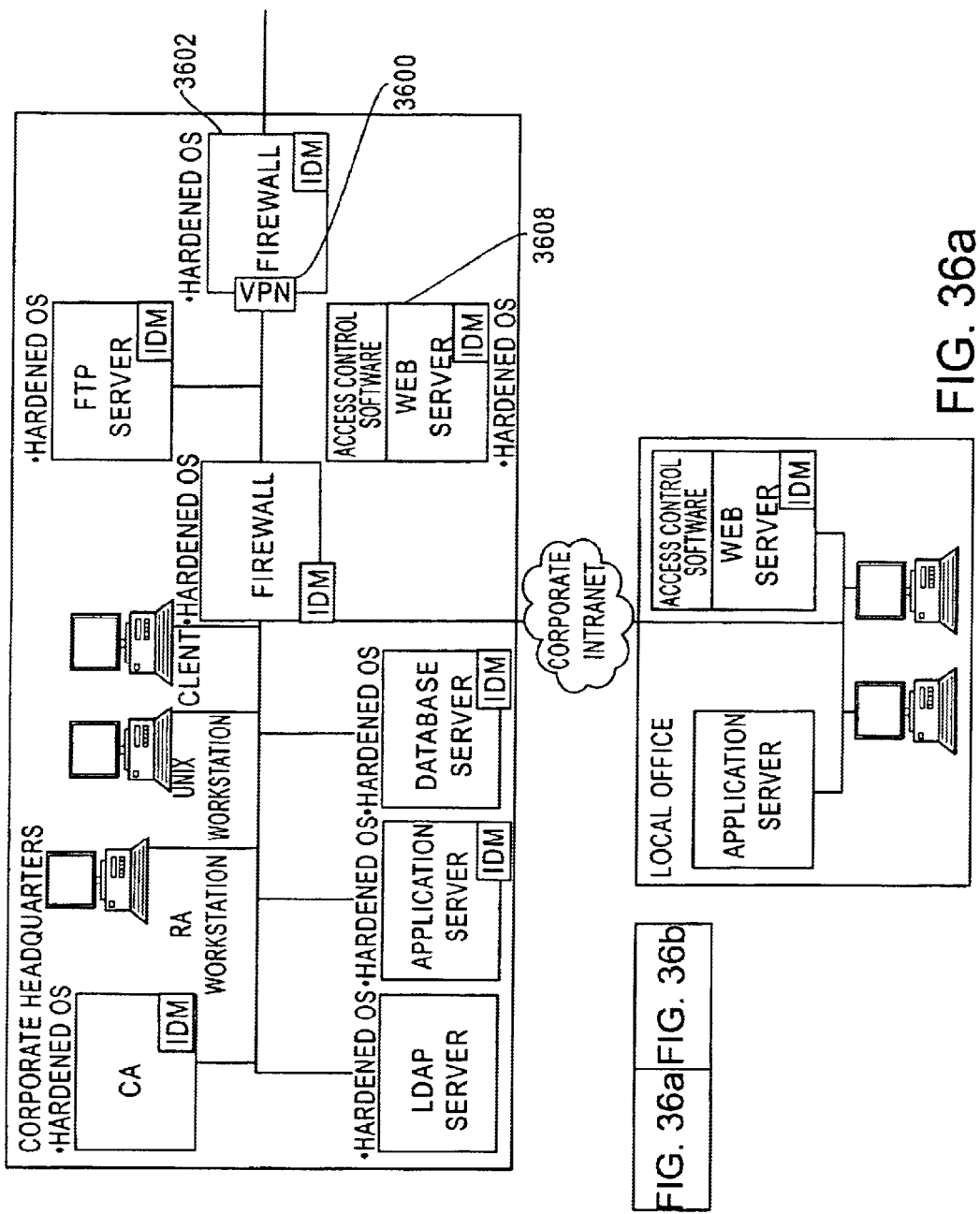
FIG. 36 depicts another exemplary Security Architecture in the scenario of FIG. 35.
Figure 36B:
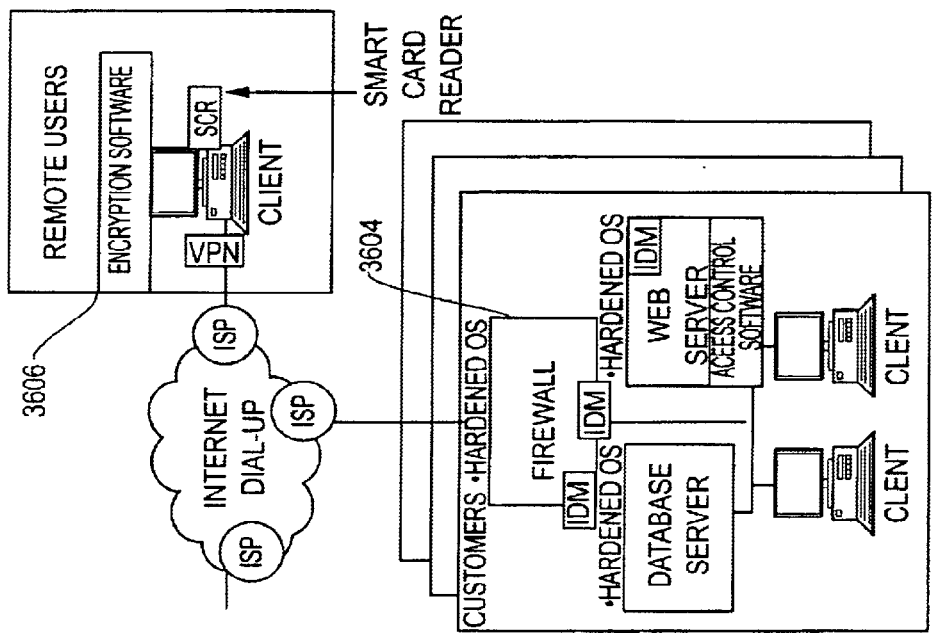

Protecting sensitive resources on the internal network from unauthorized external access Protecting customer design information from access by hackers or competitors Allowing a customer to access only their own information, not another customer's information Assuring design information maintains proper integrity FIG. 36 depicts another exemplary Security Architecture which is superior to the security architecture of FIG. 35.

Security Technical Description

Encryption services are provided in the security architecture of FIG. 36 with Virtual Private Networking (VPN). The central corporate firewall 3600 has a server VPN module 3602, and all remote customer locations are required to implement a VPN module on their firewall 3604 as well. Remote users 3606 will need client VPN software installed on their PCs. Remote users should also implement a local encrypting application that will encrypt the contents of sensitive directories on their hard drive.

Authentication services are provided to users at customer locations with digital certificates. The central corporate headquarters will maintain a CA (Certificate Authority) to administer the certificates. The CA is integrated with an LDAP server to store directory information. An RA (Registration Authority) is used to process certificate requests. For users at customer locations, the authentication occurs at the corporate web server and is managed by the web server access control software. Stronger authentication is required for remote users because they have increased access in the internal network. Remote users therefore will be issued smart cards on which they will store their private key. Each remote user will need a smart card reader for their PC.

Access control is provided by firewalls at entry points into both the corporate headquarters network and the customer location. A secondary firewall is located behind the web server at corporate headquarters to further restrict access to more sensitive servers on the internal network. An access control software package 3608 is used on the web servers to restrict access to specific web pages, files, and directories. In addition, all sensitive servers at corporate headquarters (database, ftp, application, firewall, web) have hardened operating systems implemented either with a specific secure server or an add on software package.

Integrity is provided with digital fingerprint technology at the ftp server. As a user downloads a file to their PC, it is stamped with a digital fingerprint which uniquely identifies the time and the user that downloaded that file.

Auditing services are provided in real time with Intrusion Detection Modules (IDM) on all critical services. Off line auditing is provided with operating system security scanning tools to identify vulnerabilities.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)

A security policy is necessary to provide direction on what assets should be secured and what threats are of most concern.

Security standards are necessary to assure a consistent, secure configuration across multiple platforms and applications.

Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individuals fulfilling security roles in the architecture. User training information should also be developed and distributed in an easy to read and implement manner.

Interactive Customer Service

Figure 37:
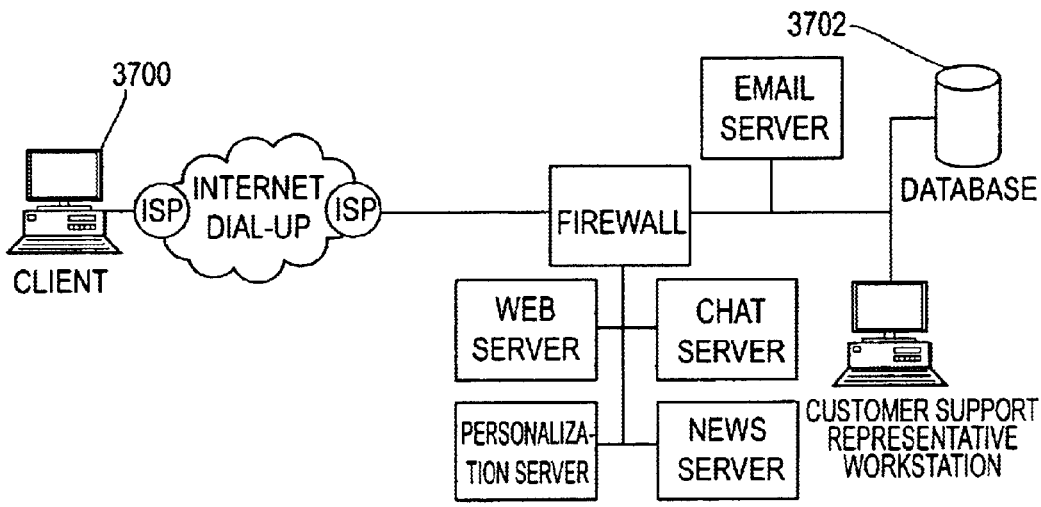
FIG. 37 shows a sample architecture in an interactive customer support scenario.

In the sample architecture shown in FIG. 37, customers 3700 of a software vendor are able to access the vendor's web site and attempt to solve their technical problems without directly burdening the vendor customer support personnel. If an answer is not found, the customer can send an email to the support organization, which can be responded to by a support representative. This architecture serves three different applications: 1) a customer client application, which produces a web interface for accessing personalized and product specific online help resources, including email, chat rooms, news groups, and full text searches, 2) a customer support representative application which can be used to respond to a client user's request via email, chat, or news, and 3) an administration application which enables the corporate web master to easily change the look and feel of the support site for a company.

Functional Description

1. Customer launches a web browser and goes to the company's web site and clicks on customer service
2. Web page has a menu of options including online technical support, chat room and upgrades/patches.
3. Online technical support consists of the ability to email a technical support representative and get a reply by email or access an interactive database 3702 of problems and solutions.
4. When the user clicks on the interactive support he will be asked a series of questions to pinpoint the problem.
5. Another option at this point is for the user to enter the serial number of the product and for the web server to customize the help page based on what product the user has.
6. If the user is not satisfied with the help he receives there is a chat room and or newsgroup to talk to a live customer support representative and other customers.

Security Business Priorities

Figure 38:
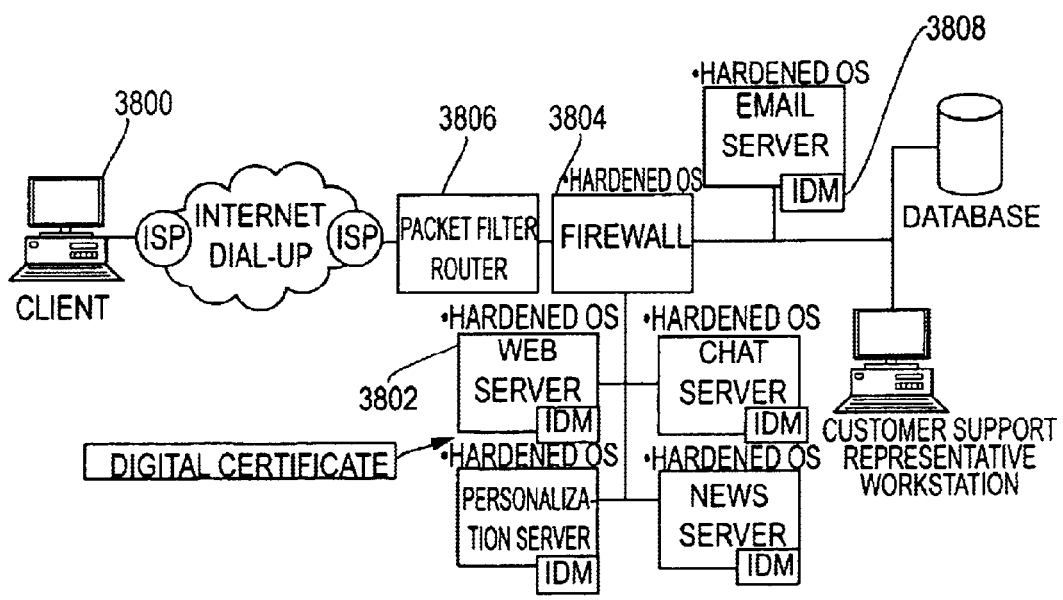
FIG. 38 illustrates an exemplary security architecture in a customer support scenario.

Public perception that the company and web site is providing proper and effective security Protecting access to any information on the internal network, specifically customer-related information Protecting the integrity of their web site and ensuring that it is not vandalized An exemplary security architecture is illustrated in FIG. 38. This architecture provides more security than the architecture of FIG. 37.

Security Technical Description

Encryption services are not implemented in this architecture because no confidential information is sent between the customer 3800 and the web site.

Authentication services are provided at the company's web server 3802 with a server side certificate signed by a leading CA provider. Customers are not authenticated. Internal users (i.e. administrators) are authenticated with their NT domain logon.

Access control is provided by a firewall 3804 at the entry point into the company's internal network. A packet filter router 3806 is located before the web resources to limit traffic to HTTP and NNTP only. In addition all sensitive servers in the architecture (firewall, web, personalization, news, chat, email) have hardened operating systems implemented either with a specific secure server or an add on software package.

Auditing services are provided in real time with Intrusion Detection Modules (IDM) 3808 on all critical services. Off line auditing is provided with operating system security scanning tools to identify vulnerabilities.

Content filtering is provided at the chat server and the news server in software. This software will filter posted content based on a pre-defined rule base to prohibit inappropriate material.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)

A security policy is necessary to provide direction on what assets should be secured and what threats are of most concern.

Security standards are necessary to assure a consistent, secure configuration across multiple platforms and applications.

Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individuals fulfilling security roles in the architecture. User training information should also be developed and distributed in an easy to read and implement manner. Special attention should be paid to the legal requirements for any disclaimer or policy statements which must be presented to the customer when accessing the service.

Internet Home Banking

Figure 39:
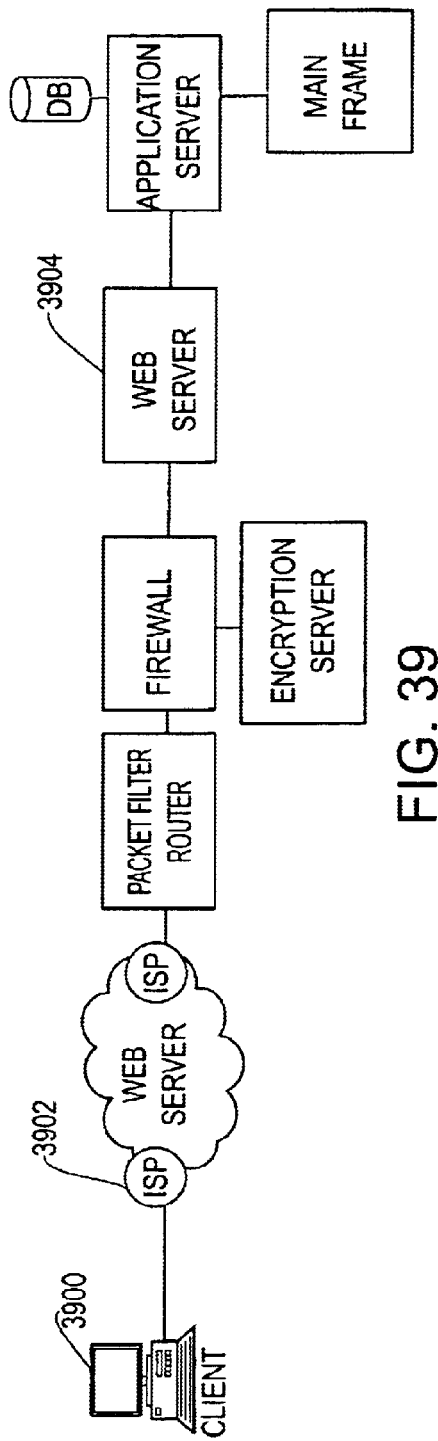
FIG. 39 depicts a sample architecture in an online banking scenario.

FIG. 39 illustrates an exemplary architecture. In this sample architecture, customers 3900 are provided with the capability to access account information, pay bills, order checks, and transfer funds between their multiple accounts. The customer will use a PC to dial their ISP 3902 and access the bank's web site. The client PC will be equipped with standard HTML browser software, and HTTP communications capability for connectivity to the server 3904 at the bank. An encrypted session is established between the client and the server using SSLv3. Once a connection is established, the customer can request a service from the bank's web site. This request consists of the recall of an ASP or HTML page, using a secure SSL3/PCT session over TCP/IP.

Upon arrival of the request at the web server, VB Scripts or JScripts are run as requested in the Active Server Pages. These scripts interact with OLE/COM objects which reside on the application server. These objects run application services to handle the information requested by the user. The application services are in turn handled by transaction services, which control object operations and data transactions on local and remote databases. The answer to the request is then sent back to the client where it is translated from ASP to HTML, or handled by ActiveX.

Functional Description

1. Customer launches a web browser and goes to the bank's web site.
2. The encryption server creates a secure SSL session and requests a login name and password.
3. Authentication is passed to the application server and verified.
4. The main page provides user with different options such as account information, funds transfer, bill payments, portfolio management and a loan service center.
5. Customer wants to pay bills but first clicks on account information to check his balance.
6. The web server requests the account information from the application server which accesses the mainframe for the data.
7. Account information including balance, recent deposits and cleared checks are returned to the web server and displayed on the user's computer.
8. User decides to pay bills and clicks on bill payment
9. User enters the name of the payee and the application server queries the mainframe for the payee's address and information about previous checks written to this payee by the user.
10. User enters an amount and the date it should be paid.
11. Data is transferred to the application server and executed on the assigned date.
12. Money is then transferred out of the user's account and cleared with the payee's bank through the banks clearing house.
13. User logs out and the SSL session ends.

Security Business Priorities

Figure 40:
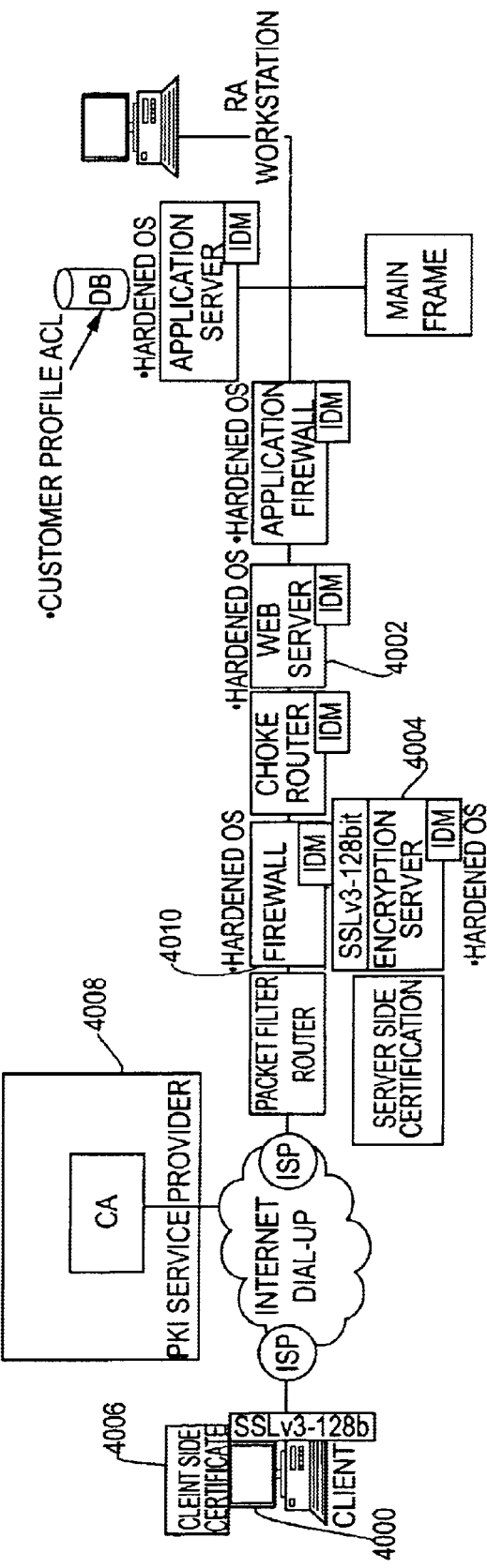
FIG. 40 shows an exemplary security architecture in an online banking scenario.

Public perception that the company and web site is secure and their money is safe Protecting access to any financial information on the internal network, specifically account and customer information Preventing major financial losses involving multiple customer accounts FIG. 40 depicts another exemplary Security Architecture which is superior to the security architecture of FIG. 39.

Security Technical Description

Encryption services are provided between the client 4000 and the server 4002 with SSLv3 using 128 bit session keys. The encrypted session is between the client PC and the encryption server 4004. Note that this requires clients to have browsers which support SSLv3.

Authentication services are provided with digital certificates. Customers will be issued personal digital certificates 4006, signed by the root key for the bank. The encryption server will have a server side certificate signed by a leading PKI provider. Certificate management services will be outsourced, so that the bank will approve and deny certificate requests at the RA (Registration Authority), but certificate revocation and management services will be provided by a PKI service vendor 4008.

Access control is provided by a firewall 4010 at the entry point into the bank's network. A packet filter router is placed in front of the firewall server, and a choke router is placed behind the firewall in order to provide some redundancy at this critical juncture. The firewall should implement Network Address Translation (NAT) to protect configuration information of the bank's internal network. Customer profiles which limit customer's access to the application and the mainframe are maintained on a database off of the application server. Users are given unique IDs and privileges to access the application and the mainframe. In addition all sensitive servers at the bank (firewall, encryption, application, web) have hardened operating systems implemented either with a specific secure server or an add on software package.

Integrity is provided with digital signatures on the transaction messages sent from the client PC to the application server.

Auditing services are provided in real time with Intrusion Detection Modules (IDM) on all critical services. Off line auditing is provided with operating system security scanning tools to identify vulnerabilities. In addition, a single transaction ID is logged at each point in the architecture to provide the ability to trace a single transaction through multiple audit logs.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)

A security policy is necessary to provide direction on what assets should be secured and what threats are of most concern.

Security standards are necessary to assure a consistent, secure configuration across multiple platforms and applications.

Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individuals fulfilling security roles in the architecture. User training information should also be developed and distributed in an easy to read and implement manner. Special attention should be paid to the legal requirements for any disclaimer or policy statements which must be presented to the customer when accessing the home banking site.

Online Storefront/Product Sales

Figure 41:
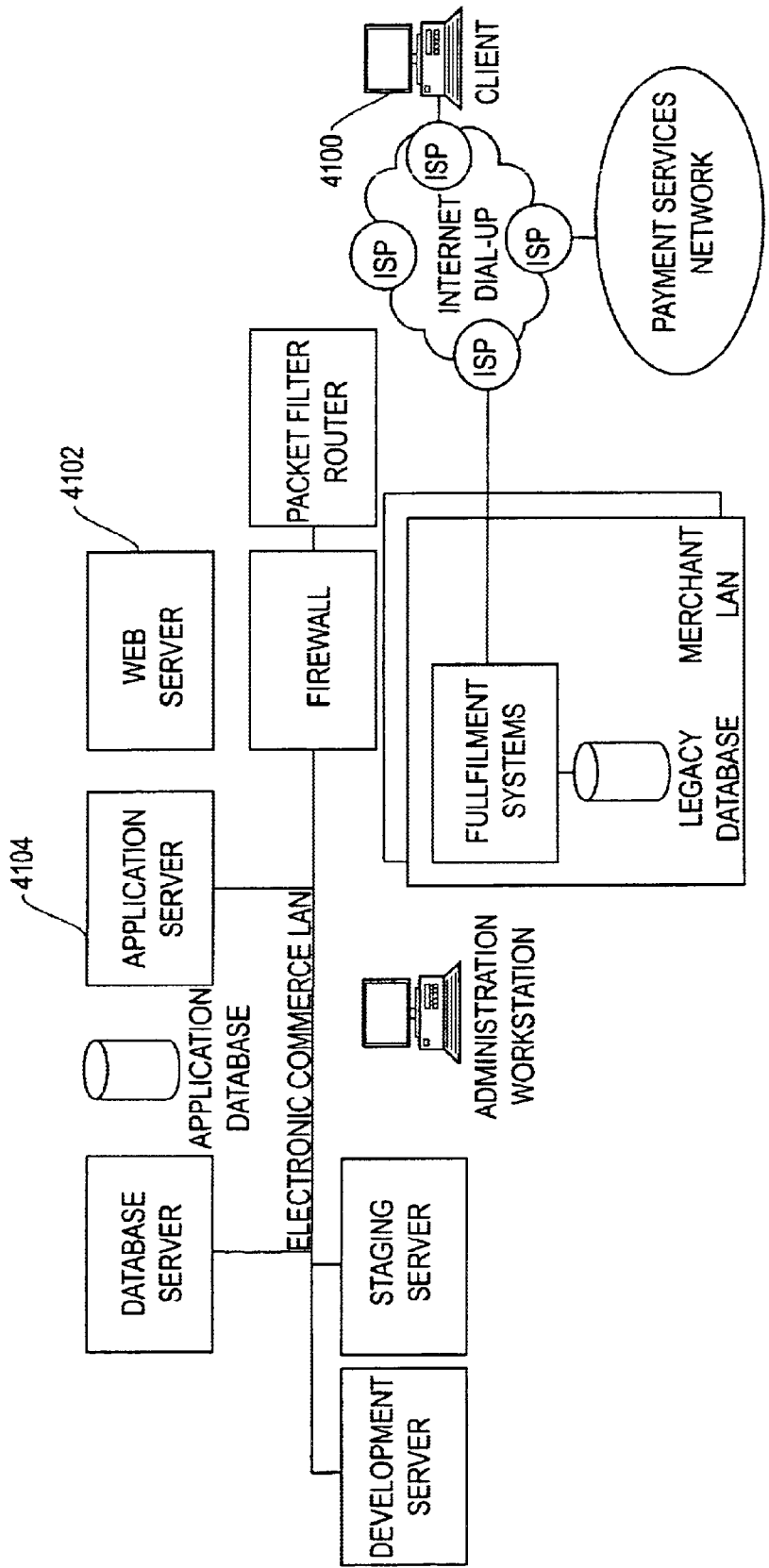
FIG. 41 illustrates a sample architecture in an online shopping scenario.

In the sample architecture illustrated in FIG. 41, all visitors 4100 will be provided access to a retail venue selling a variety of goods encompassing many merchants. Users will see a different default store depending on their particular interests and corresponding profiles. The customer is able to view all products in an encapsulated format where limited product information is shown. When a product is selected, descriptions, pricing, incentives, and other details can be shown. The customer can place items in a shopping basket, as well as viewing and deleting items already in the basket. To purchase all the items in a basket, the users shipping and billing information, credit card information, and an email address.

In a sample transaction, the customer will dial into their ISP and surf to the shopping mall site. The web server 4102 will then request a cookie from the user's web browser to determine if they have used the service before, and if they have a personalization profile. If the user has a cookie, the web server will request the personalization profile from the application server 4104 and present it to the user. The user then can browse through the site, selecting different objects from each merchant's page and placing those objects in a shopping cart. The shopping cart is maintained at the application server. If the user decides to purchase the items in the shopping cart, he will click the Buy Now button, and will be prompted for shipping and payment information. This information is gathered by the web server and sent back to the application server. The application server then routes it to the payment services function at the bottom of the picture. Payment services will validate the credit card, and send back a positive or negative response. Once the payment has been approved, an entry is made in a payment file for each merchant whose goods were purchased. This payment file is transferred hourly to each merchant for order processing.

Functional Description

1. Customer launches a web browser and goes to the retail venue's web site
2. With a cookie, the retailer's application server can identify the customer and choose a merchant to display on the front page. In addition it can tailor the merchant's interactive catalog of products to highlight those products which would be of interest to the customer
3. Customer selects items and gets a detailed description of the item including its price.
4. When customer likes an item a button is pressed and it is added to a virtual shopping cart
5. Customer clicks on check out which transfers the customer to a secure web server and asks for a password or the creation of one for a first time shopper
6. Secure web server authenticates user and displays order and credit card information
7. Customer has the opportunity to change order, credit card or shipping information then accepts the order.
8. Information is passed from the web server to the application server which then routes it to a payment services function.
9. When the purchase is approved the web server sends an email to the customer to confirm the order.
10. The application server now routes the order/payment information to the merchant's fulfillment system for shipment.
11. Another email is sent to the customer when the product is shipped.

Security Business Priorities

Figure 42:
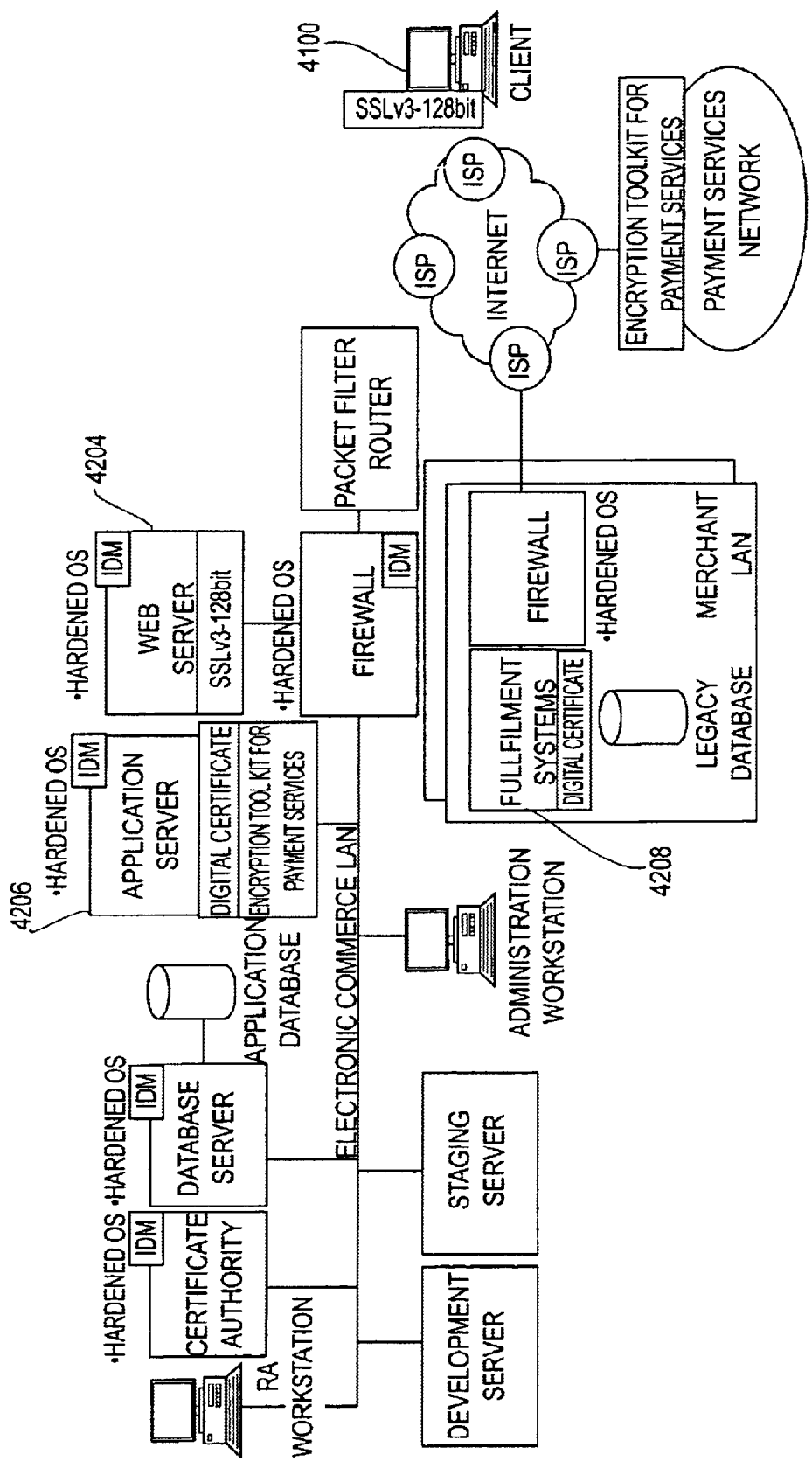
FIG. 42 shows an exemplary security architecture in an online shopping scenario.

Public perception that the company and web site is providing proper and effective security Protecting their customer transactions and profile information from being captured or read Preventing fraudulent transactions Providing timely, confidential order files to member merchants An exemplary security architecture is illustrated in FIG. 42. Though having a similar function, this architecture is superior to the architecture of FIG. 41.

Security Technical Description

Encryption services are provided between the client 4200 and the web server 4202 at the storefront with SSLv3 using 128 bit session keys 4204. Note that this requires clients to have browsers which support SSLv3. To secure file transfer between the storefront and the merchants, a toolkit is used to implement encryption services at application server 4206 (storefront) and the fulfillment server 4208 (merchant).

Authentication services are provided between the merchant and storefront with digital certificates, implemented with the same security toolkit as the encryption services. Certificate management will be performed by the storefront with a leading CA (Certificate Authority) product. An RA (Registration Authority) is used to process certificate requests. Customers will not be uniquely authenticated. The storefront web server will have a server side certificate signed by a leading CA provider to authenticate itself to customers.

Access control is provided by a firewall at the entry point into the storefront network. A packet filter router is located before the web server to limit traffic to the web server to HTTP only. In addition all sensitive servers at the storefront (firewall, database, application, web) have hardened operating systems implemented either with a specific secure server or an add on software package.

Integrity is provided on the file transfer between the merchant and storefront with digital signatures implemented at the application server and fulfillment server.

Auditing services are provided in real time with Intrusion Detection Modules (IDM) on all critical services. Off line auditing is provided with operating system security scanning tools to identify vulnerabilities.

Fraud Services are provided by a separate company that specializes in secure payment technologies. The storefront will collect order and payment information from the customers, and will pass this information to the payment/fraud services company to check the credit card numbers for fraud attempts, and to approve and process the transactions. An encryption toolkit is used between the application server and the payment services architecture to secure the transactions between the two networks.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)

A security policy is necessary to provide direction on what assets should be secured and what threats are of most concern.

Security standards are necessary to assure a consistent, secure configuration across multiple platforms and applications.

Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individuals fulfilling security roles in the architecture. User training information should also be developed and distributed in an easy to read and implement manner. Special attention should be paid to the legal requirements for any disclaimer or policy statements which must be presented to the customer when accessing the storefront.

Decision Support 1016

Figure 43:
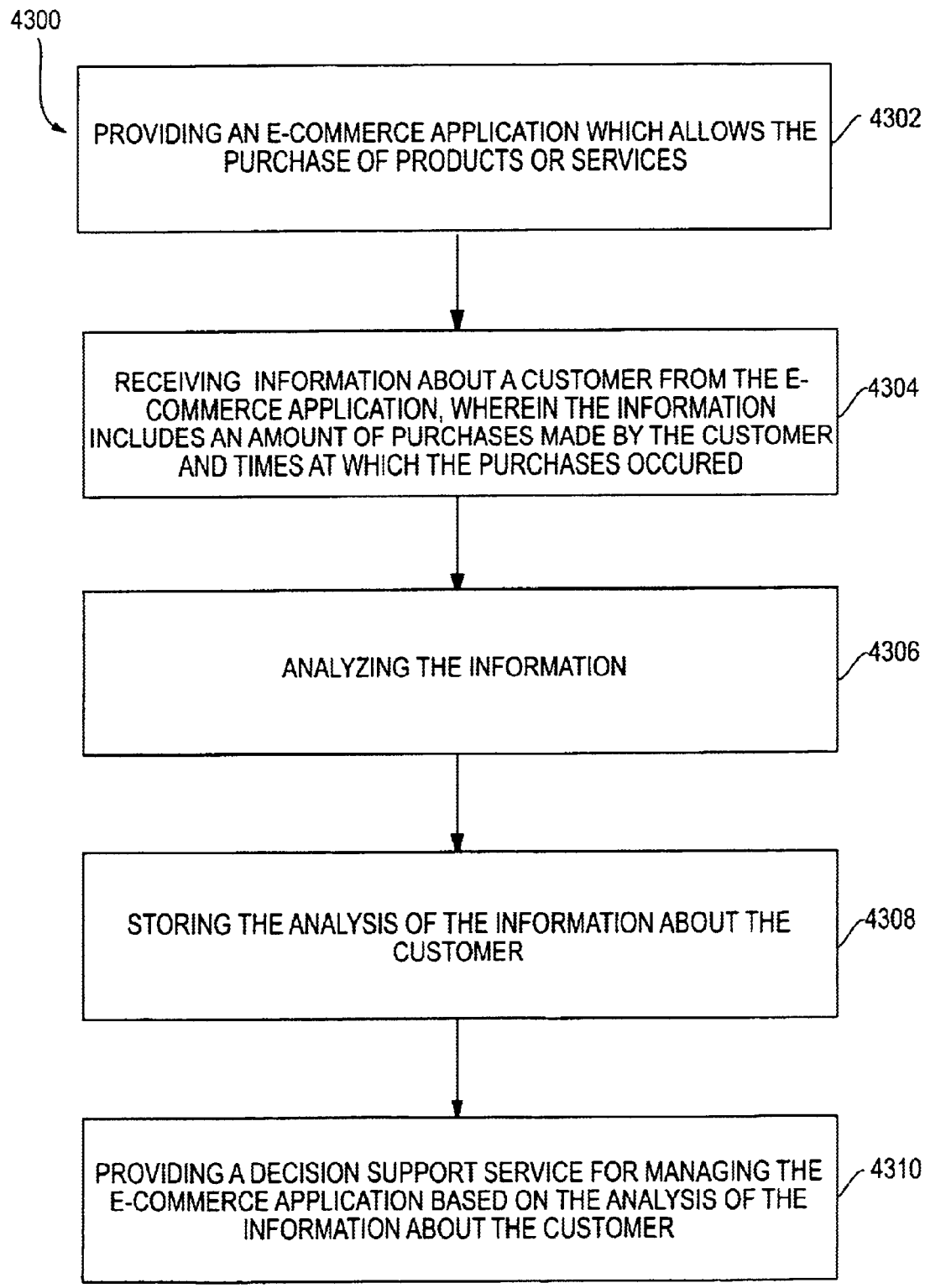
FIG. 43 illustrates a flowchart for a method for manipulating data about a customer in an e-Commerce environment in accordance with an embodiment of the present invention.

FIG. 43 illustrates a flowchart for a method 4300 for manipulating data about a customer in an e-Commerce environment. In operation 4302, an e-Commerce application is provided which allows the purchase of products or services. Information about a customer is received from the e-Commerce application and analyzed (see operations 4304 and 4306). This information includes an amount of purchases made by the customer and times at which the purchases occurred. The analysis of the information about the customer is stored in operation 4308 and a decision support service for managing the e-Commerce application is provided in operation 4310 based on the analysis of the information about the customer.

The information about the customer may be analyzed to identify a frequency and magnitude of purchases made by the customer. The decision support service may be designed to manage advertisements included with the e-Commerce application.

As an option, the decision support service may be designed to manage promotions included with the e-Commerce application. As an additional option, the information may also include demographics of the customer. Further, reporting tools may also be provided for reporting unfulfilled merchandise, sales tax, goods sold, back order items, sales forecasting, and activity on the e-Commerce application.

Figure 44:
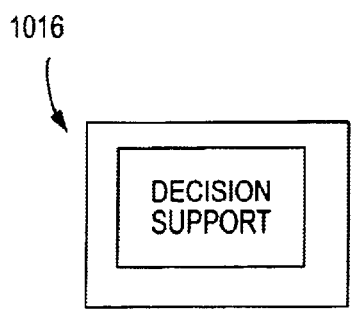
FIG. 44 illustrates the Decision Support component of the eCommerce Application Framework in accordance with one embodiment of the present invention.

An optimized eCommerce implementation will allow the integration of eCommerce-related data to be used by a company's decision support system, shown in FIG. 44. ECommerce applications will generate an enormous amount of data about customer spending habits and other customer information. To leverage this information to its fullest extent, information systems should be integrated to allow the manipulation and evaluation of this data by the appropriate user groups.

The decision support services for an eCommerce solution are consistent with any other implementation. Listed below are some specific decision support services to consider in the context of an eCommerce application.

Customer Data Services

Services can be designed for capturing, analyzing, and storing customer behaviors. The information gathered would be very similar to a profiling services described in complex personalization.

Market Data Services

Market Data Services are designed to analyze customer data. This data is used to accurately target promotions and advertising to the appropriate user groups. For example, marketing may be interested to know the demographics of the people browsing the eCommerce site to more effectively sell advertising.

Site Reporting

Site reports may enhance the overall efficiency of the site. Reporting tools and procedures should be put in place to at least cover the basic site needs. Some basic reporting needs may include transaction report, unfulfilled merchandise, sales tax, goods sold, back order items, sales forecasting and site activity.

Integration 1018

Figure 45:
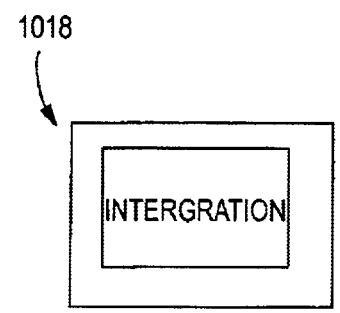
FIG. 45 illustrates the Integration component of the eCommerce Application Framework in accordance with one embodiment of the present invention.

FIG. 45 illustrates the Integration component 1018 of the eCommerce Application Framework in accordance with one embodiment of the present invention. Integration will be a critical factor in the success and advancement of eCommerce. The topic of integration may be related to many aspects of eCommerce, each of which should be considered when assessing the enterprise's overall strategy.

Figure 46:
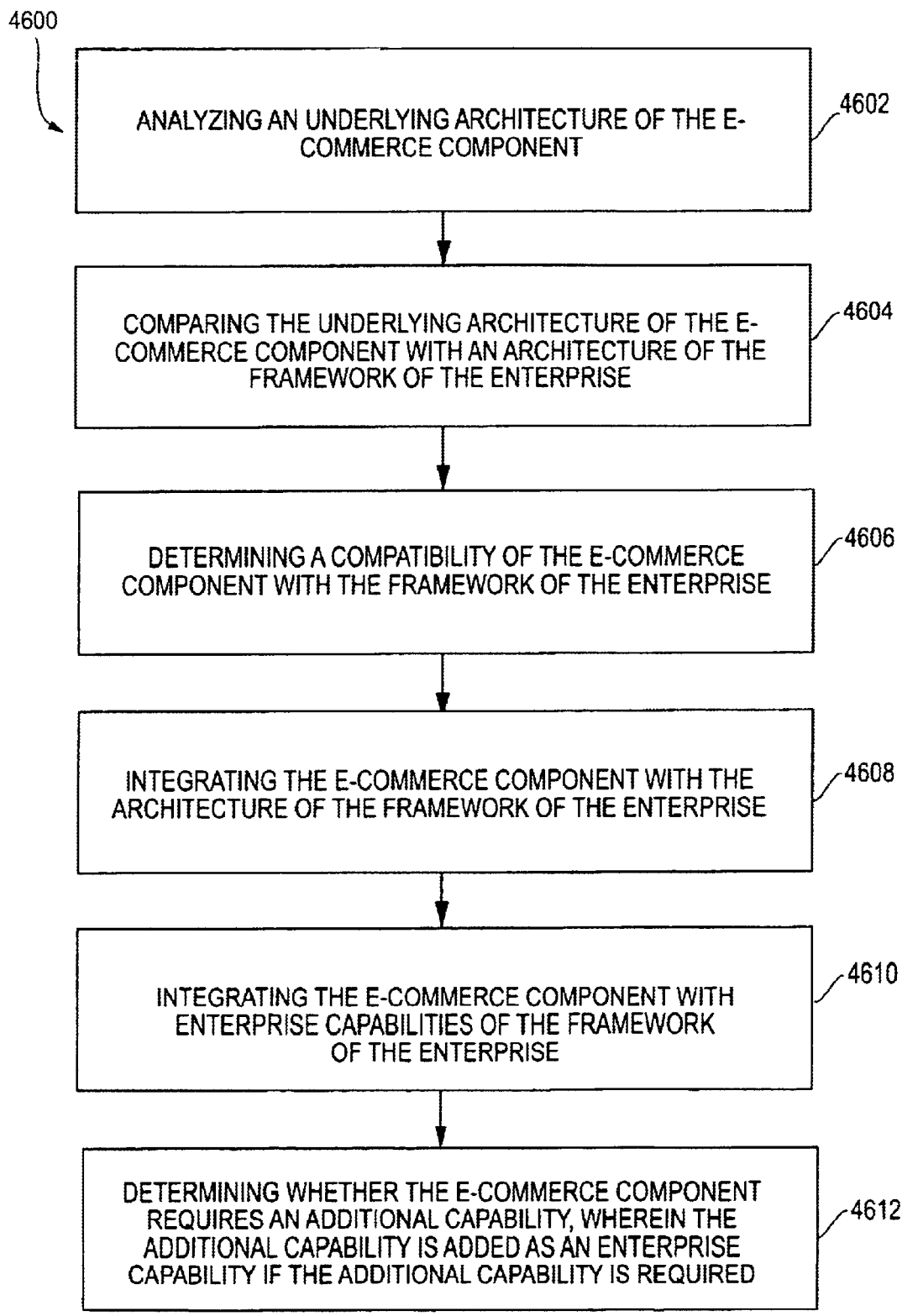
FIG. 46 illustrates a flowchart for a method for integrating an e-Commerce component into an existing framework of an enterprise in accordance with an embodiment of the present invention.

FIG. 46 illustrates a flowchart for a method 4600 for integrating an e-Commerce component into an existing framework of an enterprise. An underlying architecture of the e-Commerce component is analyzed and compared with an architecture of the framework of the enterprise in operations 4602 and 4604. A determination is made in operation 4606 as to whether the e-Commerce component is compatible with the framework of the enterprise. The e-Commerce component is integrated with both the architecture of the framework of the enterprise and with capabilities of the framework of the enterprise in operations 4608 and 4610. A determination is also made as to whether the e-Commerce component requires an additional capability in operation 4612. If so, the additional capability is added as an enterprise capability. Preferably, other applications of the framework of the enterprise can utilize the additional capability.

Custom HTML tags may be provided for enhancing a presentation of the e-Commerce component. Also, templates and/or wizards may be provided for creating e-Commerce applications and/or interfaces. Preferably, an integration of the e-Commerce component with data of the framework of the enterprise is performed.

Ideally, a business's eCommerce strategy should integrate into the business's enterprise strategy. Following the same logic, the eCommerce systems should also be integrated into the enterprise's architecture and systems. In most cases, eCommerce implementations are a separate entity, added in a furious haste with little consideration of integration with the enterprise. As a result, numerous integration patches need to be implemented to synch data (such as order, customer, and product) with the enterprise. Furthermore, this will result in additional maintenance as the enterprise strategy and eCommerce evolve. If the eCommmerce strategy requires an immediate presence, a concurrent effort should be made to understand how the eCommerce systems should be integrated into the enterprise's overall strategy.

Ideally, the eCommerce strategy should be implemented as an enterprise system, integrated with the existing enterprise architecture, capabilities, and data. If the eCommerce system needs additional capabilities, these should be assessed and potentially added as enterprise capabilities. For example, if the enterprise does not support complex personalization, these capabilities should be introduced as an enterprise capability rather than just an eCommerce capability. Other enterprise applications could utilize these capabilities in the future.

External Enterprise Integration

In many cases the eCommerce implementation will span multiple enterprises. Implementing a buyer-centric or trading partner type solution will involve multiple enterprises. In these cases, the integration aspect will often prove to be the key factor to the success of the implementation. Some of the key hurdles for a multi-enterprise system are:

Data model compatibility
Technical infrastructure
Messaging formats
Adoption hurdle; The addition of new trading partners should be a quick and easy process
Collaborative environment promoting interactivity
Implementation Considerations An eCommerce system can be added as a package or one component at a time. Here are some key considerations concerning package integration.

Underlying Architecture

The package's underlying architecture should be analyzed and compared with the enterprise's system.

Data Model

Does the package introduce a proprietary data model?

Commerce Capabilities

How much of the commerce capabilities does it provide? For example, in merchandising and transaction processing, how different are the commerce capabilities offered from those desired? Does it provide open API's?

Component Integration

The commerce package itself may need to integrate components such as payment systems, tax software or other components. Research on what options can be integrated may be important. Some packages may not be compatible with any other components and require use of their proprietary components.

Custom HTML Tags

Some packages will provide custom HTML tags in order to enhance the presentation. Utilization of these tags may result in a less open and more proprietary system. Be sure to understand the impacts using these tags may have (Will they work with all browsers? How will these be changed in future release?).

Templates and Wizards

Many of the eCommerce packages provide templates and wizards to create some of the basic eCommerce applications and interfaces. The templates and wizards may reduce some development time by providing this base. They should only be considered a starting point for the development of robust eCommerce applications. In most cases, creating an interface to the implementation's specific needs will require considerable additional customization.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for improving an existing application infrastructure of an application service provider, comprising the steps of:

prompting a user to identify at least one aspect of an existing application infrastructure of an application service provider utilizing a network;

receiving the identification of the at least one aspect of the existing application infrastructure utilizing the network;

translating the at least one aspect of the existing application infrastructure into a common structure, such that the common structure is stored in a knowledge base;

analyzing the common structure using a spreadsheet stored in a database, wherein the spreadsheet includes predefined rules and wherein the predefined rules are used to identify upgrades to the existing application infrastructure of the application service provider; and displaying the upgrades to the existing application infrastructure of the application service provider based on the analysis utilizing the network.

2. The method as recited in claim 1, wherein the at least one aspect includes an ability of the application service provider to deliver applications over the network.

3. The method as recited in claim 1, wherein the step of analyzing compares the at least one aspect of the existing application infrastructure against the predefined rules.

4. The method as recited in claim 1, and further comprising the step of assessing results of the analysis, and providing the user with the assessment.

5. The method as recited in claim 1, wherein the user is prompted to identify the at least one aspect of the existing application infrastructure by querying the user.

6. The method as recited in claim 1, wherein the upgrades include adding components of the existing application infrastructure that are currently absent therefrom.

7. A computer program embodied on a computer readable medium for improving an existing application infrastructure of an application service provider, comprising:

a code segment for prompting a user to identify at least one aspect of an existing application infrastructure of an application service provider utilizing a network;

a code segment for receiving the identification of the at least one aspect of the existing application infrastructure utilizing the network;

a code segment for translating the at least one aspect of the existing application infrastructure into a common structure, such that the common structure is stored in a knowledge base;

a code segment for analyzing the common structure using a spreadsheet stored in a database, wherein the spreadsheet includes predefined rules and wherein the predefined rules are used to identify upgrades to the existing application infrastructure of the application service provider; and a code segment for displaying the upgrades to the existing application infrastructure of the application service provider based on the analysis utilizing the network.

8. The computer program as recited in claim 7, wherein the at least one aspect includes an ability of the application service provider to deliver applications over the network.

9. The computer program as recited in claim 7, wherein the code segment for analyzing compares the at least one aspect of the existing application infrastructure against the predefined rules.

10. The computer program as recited in claim 7, and further comprising a code segment for assessing results of the analysis, and providing the user with the assessment.

11. The computer program as recited in claim 7, wherein the user is prompted to identify the at least one aspect of the existing application infrastructure by querying the user.

12. The computer program as recited in claim 7, wherein the upgrades include adding components of the existing application infrastructure that are currently absent therefrom.

13. A system for improving an existing application infrastructure of an application service provider, comprising:

logic for prompting a user to identify at least one aspect of an existing application infrastructure of an application service provider utilizing a network;

logic for receiving the identification of the at leas one aspect of the existing application infrastructure utilizing the network;

logic for translating the at least one aspect of the existing application infrastructure into a common structure, such that the common structure is stored in a knowledge base;

logic for analyzing the common structure using a spreadsheet stored in a database, wherein the spreadsheet includes predefined rules and wherein the predefined rules are used to identify upgrades to the existing application infrastructure of the application service provider; and logic for displaying the upgrades to the existing application infrastructure of the application service provider based on the analysis utilizing the network.

14. The system as recited in claim 13, wherein the at least one aspect includes an ability of the application service provider to deliver applications over the network.

15. The system as recited in claim 13, wherein the logic for analyzing compares the at least one aspect of the existing application infrastructure against the predefined rules.

16. The system as recited in claim 13, and further comprising logic for assessing results of the analysis, and providing the user with the assessment.

17. The system as recited in claim 13, wherein the user is prompted to identify the at least one aspect of the existing application infrastructure by querying the user.

18. The system as recited in claim 13, wherein the upgrades include adding components of the existing application infrastructure that are currently absent therefrom.

* * * * *

UNITED STATES PATENT AND TRADEMARK OFFICE
CERTIFICATE OF CORRECTION

PATENT NO.     : 6,904,449 B1
DATED          : June 7, 2005
INVENTOR(S)    : David B. Quinones It is certified that error appears in the above-identified patent and that said Letters Patent is hereby corrected as shown below:

<u>Title page, Item [54] and Column 1, line 2,</u>
Title, insert after "APPLICATION," -- SERVICE --.

<u>Column 114,</u>
Line 4, delete "leas" and insert -- least --.

Signed and Sealed this

Twenty-third Day of August, 2005

JON W. DUDAS
*Director of the United States Patent and Trademark Office*